United States Patent
Lofy et al.

(10) Patent No.: US 10,647,232 B2
(45) Date of Patent: *May 12, 2020

(54) CLIMATE CONTROL ASSEMBLY

(71) Applicant: GENTHERM INCORPORATED, Northville, MI (US)

(72) Inventors: John D. Lofy, Claremont, CA (US); Masahiko Inaba, Chino Hills, CA (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,104

(22) Filed: Dec. 19, 2018

(65) Prior Publication Data
US 2019/0202327 A1    Jul. 4, 2019

Related U.S. Application Data

(63) Continuation of application No. 15/309,749, filed as application No. PCT/US2015/029701 on May 7, 2015, now Pat. No. 10,160,356.

(60) Provisional application No. 61/991,310, filed on May 9, 2014.

(51) Int. Cl.
   *B60N 2/56*   (2006.01)
(52) U.S. Cl.
   CPC ............. *B60N 2/5692* (2013.01); *B60N 2/56* (2013.01); *B60N 2/565* (2013.01); *B60N 2/5635* (2013.01); *B60N 2/5642* (2013.01); *B60N 2/5657* (2013.01)

(58) Field of Classification Search
   CPC .... B60N 2/5692; B60N 2/5635; B60N 2/565; B60N 2/5642; B60N 2/5657; B60N 2/56
   See application file for complete search history.

(56) References Cited

U.S. PATENT DOCUMENTS

| | | |
|---|---|---|
| 3,136,577 A | 6/1964 | Richard |
| 3,137,523 A | 6/1964 | Karner |
| 4,152,094 A | 5/1979 | Honda et al. |
| 4,373,861 A | 2/1983 | Papst et al. |
| 4,413,857 A | 11/1983 | Hayashi |

(Continued)

FOREIGN PATENT DOCUMENTS

| | | |
|---|---|---|
| CN | 1513699 | 7/2004 |
| CN | 102 019 866 | 4/2011 |

(Continued)

OTHER PUBLICATIONS

Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.

(Continued)

*Primary Examiner* — Emmanuel E Duke
(74) *Attorney, Agent, or Firm* — Knobbe, Martens, Olson & Bear, LLP

(57) ABSTRACT

A climate controlled seat assembly includes a thermoelectric device having a main side and a waste side for generating a conditioned fluid stream and a waste fluid stream respectively, a fluid distribution system for distributing the conditioned fluid stream towards an occupant seated on the climate controlled seat assembly and for gathering and pulling fluid from around the occupant and directed this gathered fluid away from the occupant.

21 Claims, 34 Drawing Sheets

(56) References Cited

U.S. PATENT DOCUMENTS

| | | |
|---|---|---|
| 4,671,567 A | 6/1987 | Frobose |
| 4,685,727 A | 8/1987 | Cremer et al. |
| 4,806,081 A | 2/1989 | Harmsen et al. |
| 4,923,248 A | 5/1990 | Feher |
| 5,002,336 A | 3/1991 | Feher |
| 5,028,216 A | 7/1991 | Harmsen et al. |
| 5,077,709 A | 12/1991 | Feher |
| 5,106,161 A | 4/1992 | Meiller |
| 5,117,638 A | 6/1992 | Feher |
| 5,385,382 A | 1/1995 | Single, II et al. |
| 5,449,275 A | 9/1995 | Gluszek et al. |
| 5,524,439 A | 6/1996 | Gallup et al. |
| 5,597,200 A | 1/1997 | Gregory et al. |
| 5,626,021 A | 5/1997 | Karunasiri et al. |
| 5,850,741 A | 12/1998 | Feher |
| 5,887,304 A | 3/1999 | Von der Heyde |
| 5,888,261 A | 3/1999 | Fortune |
| 5,921,314 A | 7/1999 | Schuller et al. |
| 5,924,766 A * | 7/1999 | Esaki ............... A47C 7/74 297/180.13 |
| 5,927,817 A | 7/1999 | Ekman et al. |
| 5,934,748 A * | 8/1999 | Faust ............... B60N 2/5635 297/180.1 |
| 6,003,950 A | 12/1999 | Larsson |
| 6,019,420 A * | 2/2000 | Faust ............... B60N 2/5635 297/180.12 |
| 6,048,024 A | 4/2000 | Wallman |
| 6,059,018 A * | 5/2000 | Yoshinori ........ B60H 1/00285 165/41 |
| 6,062,641 A * | 5/2000 | Suzuki ............... A47C 7/74 297/180.1 |
| 6,079,485 A | 6/2000 | Esaki et al. |
| 6,085,369 A | 7/2000 | Feher |
| 6,119,463 A | 9/2000 | Bell |
| 6,145,925 A | 11/2000 | Eksin et al. |
| 6,166,905 A | 12/2000 | Oyamada et al. |
| 6,186,592 B1 | 2/2001 | Orizakis et al. |
| 6,189,966 B1 * | 2/2001 | Faust ............... B60N 2/5635 297/180.13 |
| 6,196,627 B1 * | 3/2001 | Faust ............... B60N 2/5635 297/180.1 |
| 6,206,465 B1 | 3/2001 | Faust et al. |
| 6,223,539 B1 | 5/2001 | Bell |
| 6,263,530 B1 | 7/2001 | Feher |
| 6,509,704 B1 | 1/2003 | Brown |
| 6,541,737 B1 | 4/2003 | Eksin et al. |
| 6,552,464 B1 | 4/2003 | Rahbar et al. |
| RE38,128 E | 6/2003 | Gallup et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,626,488 B2 | 9/2003 | Pfahler |
| 6,644,735 B2 | 11/2003 | Bargheer et al. |
| 6,676,207 B2 | 1/2004 | Rauh et al. |
| 6,700,052 B2 | 3/2004 | Bell |
| 6,761,399 B2 | 7/2004 | Bargheer et al. |
| 6,786,541 B2 | 9/2004 | Haupt et al. |
| 6,786,545 B2 | 9/2004 | Bargheer et al. |
| 6,808,230 B2 | 10/2004 | Buss et al. |
| 6,828,528 B2 | 12/2004 | Stowe et al. |
| 6,841,957 B2 | 1/2005 | Brown |
| 6,855,880 B2 | 2/2005 | Feher |
| 6,857,697 B2 | 2/2005 | Brennan et al. |
| 6,892,807 B2 | 5/2005 | Fristedt et al. |
| 6,893,086 B2 | 5/2005 | Bajic et al. |
| 6,907,739 B2 | 6/2005 | Bell |
| 6,954,944 B2 | 10/2005 | Feher |
| 6,976,734 B2 * | 12/2005 | Stoewe ............... B60N 2/5635 297/180.1 |
| 7,040,710 B2 | 5/2006 | White et al. |
| 7,070,232 B2 | 7/2006 | Minegishi et al. |
| 7,071,587 B2 | 7/2006 | Lopatinsky et al. |
| 7,108,319 B2 | 9/2006 | Hartwich et al. |
| 7,114,771 B2 | 10/2006 | Lofy et al. |
| 7,124,593 B2 | 10/2006 | Feher |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,272,936 B2 | 9/2007 | Feher |
| 7,273,981 B2 | 9/2007 | Bell |
| 7,425,034 B2 | 9/2008 | Bajic et al. |
| 7,462,028 B2 | 12/2008 | Cherala et al. |
| 7,475,464 B2 | 1/2009 | Lofy et al. |
| 7,480,950 B2 | 1/2009 | Feher |
| 7,506,938 B2 | 3/2009 | Brennan et al. |
| 7,587,901 B2 | 9/2009 | Petrovski |
| 7,591,507 B2 | 9/2009 | Giffin et al. |
| 7,640,754 B2 | 1/2010 | Wolas |
| 7,665,803 B2 | 2/2010 | Wolas |
| 7,708,338 B2 | 5/2010 | Wolas |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,937,789 B2 | 5/2011 | Feher |
| 7,963,594 B2 | 6/2011 | Wolas |
| 7,966,835 B2 | 6/2011 | Petrovski |
| 7,996,936 B2 | 8/2011 | Marquette et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,653,763 B2 | 2/2014 | Lin et al. |
| 8,732,874 B2 | 5/2014 | Brykalski et al. |
| 8,777,320 B2 | 7/2014 | Stoll et al. |
| 8,782,830 B2 | 7/2014 | Brykalski et al. |
| 8,893,329 B2 | 11/2014 | Petrovksi |
| 9,105,808 B2 | 8/2015 | Petrovksi |
| 9,105,809 B2 | 8/2015 | Lofy |
| 9,121,414 B2 | 9/2015 | Lofy et al. |
| 9,125,497 B2 | 9/2015 | Brykalski et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,603,459 B2 | 3/2017 | Brykalski et al. |
| 9,622,588 B2 | 4/2017 | Brykalski et al. |
| 9,651,279 B2 | 5/2017 | Lofy |
| 9,685,599 B2 | 6/2017 | Petrovski et al. |
| 9,814,641 B2 | 11/2017 | Brykalski et al. |
| 9,989,267 B2 | 6/2018 | Brykalski et al. |
| 10,005,337 B2 | 6/2018 | Petrovski |
| 10,160,356 B2 | 12/2018 | Lofy et al. |
| 10,288,084 B2 | 5/2019 | Lofy et al. |
| 10,457,173 B2 | 10/2019 | Lofy et al. |
| 2002/0092308 A1 | 7/2002 | Bell |
| 2003/0039298 A1 | 2/2003 | Eriksson et al. |
| 2003/0145380 A1 | 8/2003 | Schmid |
| 2004/0090093 A1 * | 5/2004 | Kamiya ............... B60N 2/5628 297/180.14 |
| 2004/0139758 A1 | 7/2004 | Kamiya et al. |
| 2004/0164594 A1 * | 8/2004 | Stoewe ............... B60N 2/5635 297/180.14 |
| 2004/0255364 A1 | 12/2004 | Feher |
| 2005/0285438 A1 | 12/2005 | Ishima et al. |

(56) References Cited

U.S. PATENT DOCUMENTS

| | | |
|---|---|---|
| 2006/0053529 A1 | 3/2006 | Feher |
| 2006/0087160 A1 | 4/2006 | Dong et al. |
| 2006/0137099 A1 | 6/2006 | Feher |
| 2006/0214480 A1 | 9/2006 | Terech |
| 2006/0244289 A1 | 11/2006 | Bedro |
| 2006/0254284 A1* | 11/2006 | Ito .................. B60N 2/5635 62/3.3 |
| 2006/0273646 A1 | 12/2006 | Comiskey et al. |
| 2007/0069554 A1 | 3/2007 | Comiskey et al. |
| 2007/0086757 A1 | 4/2007 | Feher |
| 2007/0101729 A1 | 5/2007 | Aoki et al. |
| 2007/0193279 A1* | 8/2007 | Yoneno ............. B60N 2/5635 62/3.3 |
| 2007/0194668 A1 | 8/2007 | Teshima et al. |
| 2007/0200398 A1 | 8/2007 | Wolas et al. |
| 2007/0214956 A1 | 9/2007 | Carlson et al. |
| 2007/0234742 A1* | 10/2007 | Aoki .................. B60H 1/00285 62/3.3 |
| 2007/0251016 A1 | 11/2007 | Feher |
| 2007/0262621 A1 | 11/2007 | Dong et al. |
| 2008/0000025 A1 | 1/2008 | Feher |
| 2008/0087316 A1 | 4/2008 | Inaba et al. |
| 2008/0124234 A1 | 5/2008 | Echazarreta |
| 2008/0164733 A1 | 7/2008 | Giffin et al. |
| 2008/0166224 A1 | 7/2008 | Giffin et al. |
| 2009/0000031 A1 | 1/2009 | Feher |
| 2009/0026813 A1 | 1/2009 | Lofy |
| 2009/0031742 A1 | 2/2009 | Seo et al. |
| 2009/0033130 A1 | 2/2009 | Marquette et al. |
| 2009/0121524 A1* | 5/2009 | Abe .................. A47C 7/748 297/180.1 |
| 2009/0126110 A1 | 5/2009 | Feher |
| 2009/0211619 A1 | 8/2009 | Sharp et al. |
| 2009/0218855 A1* | 9/2009 | Wolas .................. A47C 7/74 297/180.14 |
| 2009/0250980 A1* | 10/2009 | Major .................. B60N 2/5635 297/180.15 |
| 2009/0263242 A1 | 10/2009 | Winkler et al. |
| 2010/0303647 A1 | 12/2010 | Ida et al. |
| 2011/0017421 A1* | 1/2011 | Esaki .................. B60H 1/00285 165/41 |
| 2011/0061400 A1 | 3/2011 | Park et al. |
| 2011/0061401 A1* | 3/2011 | Jun .................. B60N 2/5657 62/3.3 |
| 2011/0061403 A1* | 3/2011 | Jun .................. B60N 2/5657 62/3.61 |
| 2011/0271994 A1 | 11/2011 | Gilley |
| 2012/0080911 A1 | 4/2012 | Brykalski et al. |
| 2012/0144844 A1* | 6/2012 | Park .................. B60N 2/5692 62/3.3 |
| 2012/0256451 A1 | 10/2012 | Sahashi |
| 2012/0261399 A1 | 10/2012 | Lofy |
| 2013/0097777 A1 | 4/2013 | Marquette et al. |
| 2013/0239592 A1 | 9/2013 | Lofy |
| 2014/0026320 A1 | 1/2014 | Marquette et al. |
| 2014/0030082 A1 | 1/2014 | Helmenstein |
| 2014/0090513 A1 | 4/2014 | Zhang et al. |
| 2014/0131343 A1 | 5/2014 | Walsh |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0250918 A1 | 9/2014 | Lofy |
| 2014/0260331 A1 | 9/2014 | Lofy et al. |
| 2014/0305625 A1 | 10/2014 | Petrovski |
| 2014/0338366 A1 | 11/2014 | Adldinger et al. |
| 2015/0165865 A1 | 6/2015 | Park et al. |
| 2016/0053772 A1 | 2/2016 | Lofy et al. |
| 2016/0137110 A1 | 5/2016 | Lofy et al. |
| 2016/0325657 A1* | 11/2016 | Zhang .................. B60N 2/5692 |
| 2019/0331130 A1 | 10/2019 | Lofy et al. |

FOREIGN PATENT DOCUMENTS

| | | |
|---|---|---|
| DE | 102 38 552 | 8/2001 |
| DE | 101 15 242 | 10/2002 |
| EP | 2 098 733 | 9/2009 |
| JP | 05-147423 | 6/1993 |
| JP | 10-297274 | 10/1998 |
| JP | 10-297243 | 11/1998 |
| JP | 2002-227798 | 8/2002 |
| JP | 2002-234332 | 8/2002 |
| JP | 2003-254636 | 9/2003 |
| JP | 2004-017855 | 1/2004 |
| JP | 2006-069376 | 3/2006 |
| JP | 2007-506523 | 3/2007 |
| JP | 2007-506526 | 3/2007 |
| JP | 2007-126047 | 5/2007 |
| JP | 2008-529894 | 8/2008 |
| JP | 2009-077760 | 4/2009 |
| JP | 2011-189764 | 9/2011 |
| JP | 2013-203196 | 10/2013 |
| WO | WO 96/005475 | 2/1996 |
| WO | WO 99/058907 | 11/1999 |
| WO | WO 02/011968 | 2/2002 |
| WO | WO 03/014634 | 2/2003 |
| WO | WO 03/051666 | 6/2003 |
| WO | WO 2005/065987 | 7/2005 |
| WO | WO 2005/073021 | 8/2005 |
| WO | WO 2006/078394 | 7/2006 |
| WO | WO 2006/117690 | 11/2006 |
| WO | WO 2009/015235 | 1/2009 |
| WO | WO 2009/036077 | 3/2009 |
| WO | WO 2012/061777 | 5/2012 |
| WO | WO 2015/171901 | 11/2015 |
| WO | WO 2017/083308 | 5/2017 |

OTHER PUBLICATIONS

Lofy et al., "Thermoelectrics for Environmental Control in Automobiles", Proceeding of Twenty-First International Conference on Thermoelectrics (ICT 2002), 2002, pp. 471-476.

Photographs and accompanying description of climate control seat assembly system components publicly disclosed as early as Jan. 1998.

Photographs and accompanying description of a component of a climate control seat assembly system sold prior to Nov. 1, 2005.

Photographs and accompanying description of a component of a climate control seat assembly system sold prior to Dec. 20, 2003.

International Search Report and Written Opinion received in PCT Application No. PCT/US2015/029701, dated Aug. 14, 2015.

International Preliminary Report on Patentability received in PCT Application No. PCT/US2015/029701, dated Nov. 24, 2016.

International Search Report and Written Opinion received in PCT Application No. PCT/US2016/060999, dated Feb. 17, 2017.

International Preliminary Report on Patentability received in PCT Application No. PCT/US2016/060999, dated May 24, 2018.

* cited by examiner

CLIMATE CONTROL ASSEMBLY

CROSS-REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Field

This disclosure relates to climate control, and, more particularly, to a climate control assembly.

Background

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there have been various types of individualized climate control systems for vehicle seats. Climate control systems can include a distribution system comprising a combination of channels and passages formed in the cushion of the seat. A thermal module thermally conditions the air and delivers the conditioned air to seat channels and passages. The conditioned air flows through the channels and passages to cool or heat the space adjacent the surface of the vehicle seat.

SUMMARY

In some embodiments, the climate controlled seat assembly can include a thermoelectric device having a main side and a waste side. The climate controlled seat assembly can include a main heat exchanger coupled to the main side of the thermoelectric device for generating a conditioned fluid stream from a first fluid stream. The climate controlled seat assembly can include a waste heat exchanger coupled to the waste side of the thermoelectric device for generating a waste fluid stream from a second fluid stream. The climate controlled seat assembly can include a first fluid path in the seat assembly that directs the first fluid stream and the conditioned fluid stream to a seating surface designed to contact an occupant. The climate controlled seat assembly can include a second fluid path that directs a second fluid stream from a location proximate the seating surface to the waste heat exchanger and the waste fluid stream away from the occupant.

In some embodiments, the first fluid path can draw the first fluid stream from a location spaced from the seating surface. In some embodiments, the first fluid path can draw the first fluid stream from a location opposite the occupant. In some embodiments, the second fluid path can exhaust the waste fluid stream to location spaced from the seating surface. In some embodiments, the second fluid path can exhaust the waste fluid stream to a location opposite the occupant.

In some embodiments, the climate controlled seat assembly can include a first pumping device fluidically coupled to at least one of the conditioned fluid path and the waste fluid path. In some embodiments, the climate controlled seat assembly can include a second pumping device, wherein the first pumping device is fluidically coupled to the conditioned fluid path and the second pumping device is fluidically coupled to the waste fluid path. In some embodiments, the first pumping device can include a rotor having a plurality of fins and a motor coupled to the rotor, a first inlet in fluid communication with a first outlet, and a second inlet in fluid communication with a second outlet.

In some embodiments, the first inlet and the first outlet of the first pumping device can be fluidically coupled to the conditioned fluid path and the second inlet and second outlet can be fluidically coupled to the waste fluid path. In some embodiments, the main heat exchanger can be positioned between the first inlet and the first outlet. In some embodiments, the waste heat exchanger can be positioned between the second inlet and the second outlet. In some embodiments, a direction of flow through the first inlet and a direction of flow through the first outlet can be generally parallel. In some embodiments, the first outlet can be positioned at a top side of the first pumping device. In some embodiments, a direction of flow through the second inlet and a direction of flow through the second outlet can be generally orthogonal. In some embodiments, the second outlet can be positioned at a left and/or right side of the first pumping device.

In some embodiments, the first pumping device can include a first ducting fluidically coupling the first inlet and the first outlet, wherein a direction of flow through the first outlet can be generally orthogonal to a direction of flow through the first ducting. In some embodiments, the first pumping device can include a second ducting fluidically coupling the second inlet and the second outlet, wherein a direction of flow through the second outlet can be generally orthogonal to a direction of flow through the second ducting.

In some embodiments, the seating surface designed to contact an occupant can be a top surface of a seat. In some embodiments, the first pumping device can be positioned below the top surface of the seat. In some embodiments, the seating surface designs to contact an occupant can be a front surface of a backrest. In some embodiments, the first pumping device can be positioned behind the front surface of the backrest.

In some embodiments, the climate controlled seat assembly can include channels along the top surfaces of the side bolsters from which the second fluid stream is withdrawn. In some embodiments, the second fluid stream can be withdrawn at or proximate a seat area of the seat. In some embodiments, the conditioned fluid stream can be directed to the occupant at or proximate a thigh area of the seat. In some embodiments, the seat can include a first fluid distribution system at or proximate a seat area of the seat. In some embodiments, the first fluid distribution system can include channels extending laterally outwards towards sides of the seat. In some embodiments, the first fluid distribution system can include an intermediate layer positioned between the channels and an overlying layer of the seat, the layer designed to maintain a gap between the channels and the overlying layer. In some embodiments, the overlying layer can be a spacer fabric positioned between the intermediate layer and a cushion of the seat. In some embodiments, the seat can include a second fluid distribution system at or proximate a thigh area of the seat. In some embodiments, the second fluid distribution system can include channels extending laterally outwards towards sides of the seat. In some embodiments, the second fluid distribution system can include an intermediate layer positioned between the channels and an overlying layer, the layer designed to maintain a gap between the channels and the overlying layer. In some embodiments, the overlying layer can be a cushion of the seat.

In some embodiments, the second fluid stream can be withdrawn at or proximate a lumbar region of the backrest. In some embodiments, the conditioned fluid stream can be directed to the occupant at or proximate an upper back area of the backrest. In some embodiments, the backrest can include a first fluid distribution system at or proximate a lumbar region of the backrest. In some embodiments, the first fluid distribution system can include channels extending laterally outwards towards sides of the backrest. In some embodiments, the backrest can include a second fluid distribution system at or proximate an upper back area of the backrest. In some embodiments, the second fluid distribution system can include channels extending laterally outwards towards sides of the backrest. In some embodiments, the second fluid distribution system can include an intermediate layer positioned between the channels and an overlying layer, the layer designed to maintain a gap between the channels and the overlying layer. In some embodiments, the overlying layer can be a cushion of the seat In some embodiments, the climate controlled seat assembly can include a thermoelectric device having a main side and a waste side. The climate controlled seat assembly can include a main heat exchanger coupled to the main side of the thermoelectric device for generating a conditioned fluid stream from a first fluid stream. The climate controlled seat assembly can include a waste heat exchanger coupled to the waste side of the thermoelectric device for generating a waste fluid stream from a second fluid stream. In some embodiments, the conditioned fluid stream can be directed to a location proximate a seating surface designed to contact an occupant. In some embodiments, the second fluid stream can be withdrawn from a location proximate the seating surface designed to contact an occupant.

In some embodiments, the climate controlled seat assembly can include channels along the top surfaces of the side bolsters from which the second fluid stream is withdrawn. In some embodiments, the seating surface designed to contact an occupant is a top surface of the seat. In some embodiments, the seating surface designed to contact an occupant is a front surface of the backrest. In some embodiments, the first fluid stream is withdrawn from a location opposite the occupant.

In some embodiments, the second fluid stream can be withdrawn at or proximate a seat area of the seat. In some embodiments, the conditioned fluid stream can be directed to the occupant at or proximate a thigh area of the seat. In some embodiments, the seat can include a first fluid distribution system at or proximate a seat area of the seat. In some embodiments, the first fluid distribution system can include channels extending laterally outwards towards sides of the seat. In some embodiments, the first fluid distribution system can include an intermediate layer positioned between the channels and an overlying layer of the seat, the layer designed to maintain a gap between the channels and the overlying layer. In some embodiments, the overlying layer can be a spacer fabric positioned between the intermediate layer and a cushion of the seat. In some embodiments, the seat can include a second fluid distribution system at or proximate a thigh area of the seat. In some embodiments, the second fluid distribution system can include channels extending laterally outwards towards sides of the seat. In some embodiments, the second fluid distribution system can include an intermediate layer positioned between the channels and an overlying layer, the layer configured to maintain a gap between the channels and the overlying layer. In some embodiments, the overlying layer can be a cushion of the seat.

In some embodiments, the second fluid stream can be withdrawn at or proximate a lumbar region of the backrest. In some embodiments, the conditioned fluid stream can be directed to the occupant at or proximate an upper back area of the backrest. In some embodiments, the backrest can include a first fluid distribution system at or proximate a lumbar region of the backrest. In some embodiments, the first fluid distribution system can include channels extending laterally outwards towards sides of the backrest. In some embodiments, the backrest can include a second fluid distribution system at or proximate an upper back area of the backrest. In some embodiments, the second fluid distribution system can include channels extending laterally outwards towards sides of the backrest. In some embodiments, the second fluid distribution system can include an intermediate layer positioned between the channels and an overlying layer, the layer designed to maintain a gap between the channels and the overlying layer. In some embodiments, the overlying layer can be a cushion of the seat.

In some embodiments, the climate controlled seat assembly can include a pumping device. In some embodiments, the pumping device can include a rotor having a plurality of fins, a motor coupled to the rotor, a first inlet in fluid communication with a first outlet, and a second inlet in fluid communication with a second outlet.

In some embodiments, the main heat exchanger can be positioned between the first inlet and the first outlet of the pumping device and the waste heat exchanger can be positioned between the second inlet and the second outlet of the pumping device. In some embodiments, a direction of flow through the first inlet and a direction of flow through the first outlet can be generally parallel. In some embodiments, the first outlet can be positioned at a top side of the pumping device. In some embodiments, a direction of flow through the second inlet and a direction of flow through the second outlet can be generally orthogonal. In some embodiments, the second outlet can be positioned at a left and/or right side of the first pumping device. In some embodiments, the first pumping device can include a first ducting fluidically coupling the first inlet and the first outlet, wherein a direction of flow through the first outlet can be generally orthogonal to a direction of flow through the first ducting. In some embodiments, the first pumping device can include a second ducting fluidically coupling the second inlet and the second outlet, wherein a direction of flow through the second outlet can be generally orthogonal to a direction of flow through the second ducting.

In some embodiments, the first inlet of the pumping device can be fluidically coupled one of the main heat exchanger and the waste heat exchanger and the second outlet can be fluidically coupled to the other of the main heat exchanger and the waste heat exchanger.

In some embodiments, the thermal module can include a thermoelectric device comprising a main side and a waste side. The thermal module can include a main heat exchanger having a plurality of fins coupled to the main side of the thermoelectric device for generating a conditioned fluid. The thermal module can include a waste heat exchanger having a plurality of fins coupled to the waste side of the thermoelectric device. In some embodiments, the plurality of fins of the main heat exchanger and the plurality of fins of the waste heat exchanger can be designed such that flow through the main heat exchanger and the waste heat exchanger is oblique or perpendicular. In some embodiments, the flow through the main heat exchanger and the waste heat exchanger can be substantially perpendicular. In some embodiments, the flow through the main heat exchanger and the waste heat exchanger can be perpendicular.

In some embodiments, a method of conditioning a seat assembly can include the step of producing a conditioned fluid stream from a first fluid stream. The method can include the step of directing the conditioned fluid stream to a support surface designed to contact an occupant. The method can include the step of withdrawing a second fluid stream from a location proximate the support surface.

In some embodiments, the method can include the step of producing a waste fluid stream from the second fluid stream. In some embodiments, the method can include exhausting the waste fluid stream to a location spaced from the seating surface. In some embodiments, the step of producing a conditioned fluid stream includes passing the first fluid stream through a first heat exchanger. In some embodiments, the method can include pulling the first fluid stream from a location spaced from the seating surface.

In some embodiments, directing the conditioned fluid stream to a support surface designed to contact an occupant can include directing the conditioned fluid stream at or proximate a thigh area of a seat of the seat assembly. In some embodiments, directing the conditioned fluid stream to a support surface designed to contact an occupant can include directing the conditioned fluid stream at or proximate an upper back area of a backrest of the seat assembly. In some embodiments, withdrawing a second fluid stream from a location proximate the support surface can include withdrawing the second fluid stream at or proximate a seat area of a seat of the seat assembly. In some embodiments, withdrawing a second fluid stream from a location proximate the support surface can include withdrawing the second fluid stream at or proximate a lumbar region of a backrest of the seat assembly.

DETAILED DESCRIPTION

Figure 1:
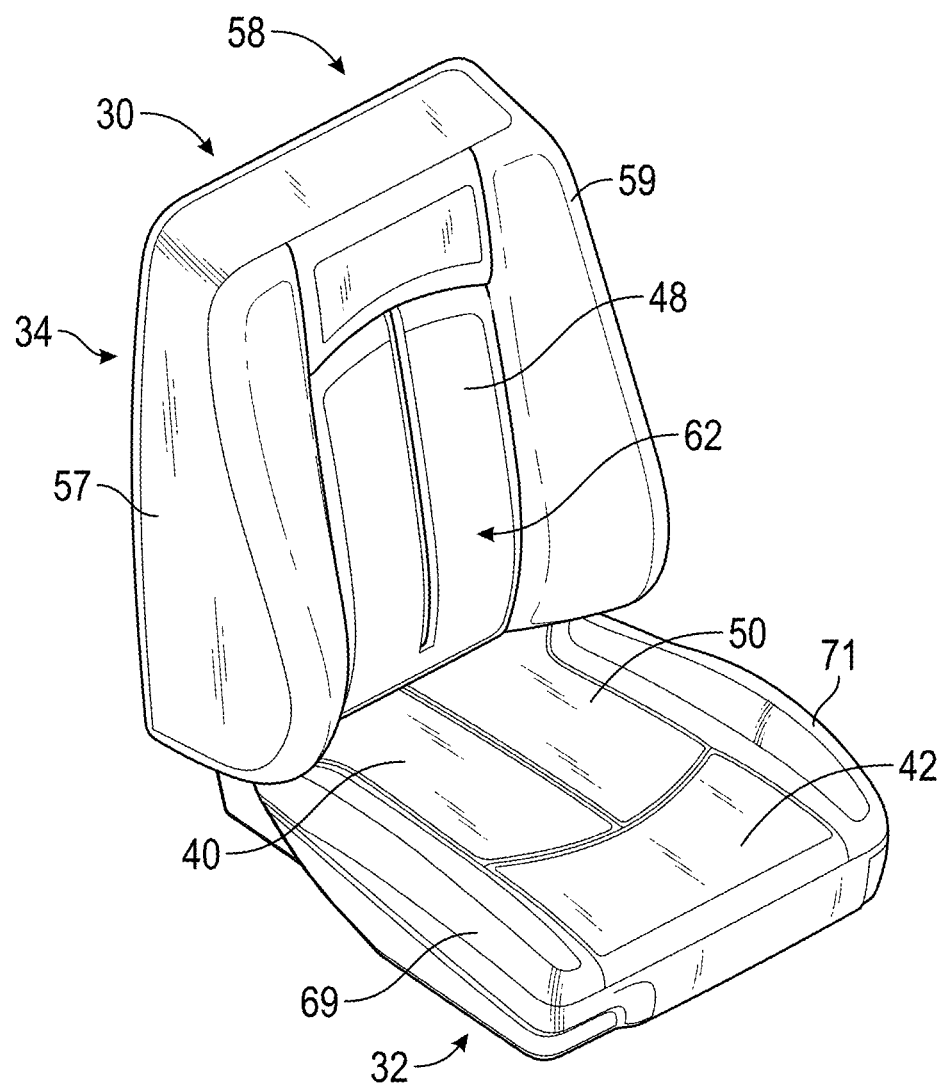
FIG. 1 is a perspective view of a vehicle seat assembly that can include a climate control system according to the present disclosure.
Figure 2:
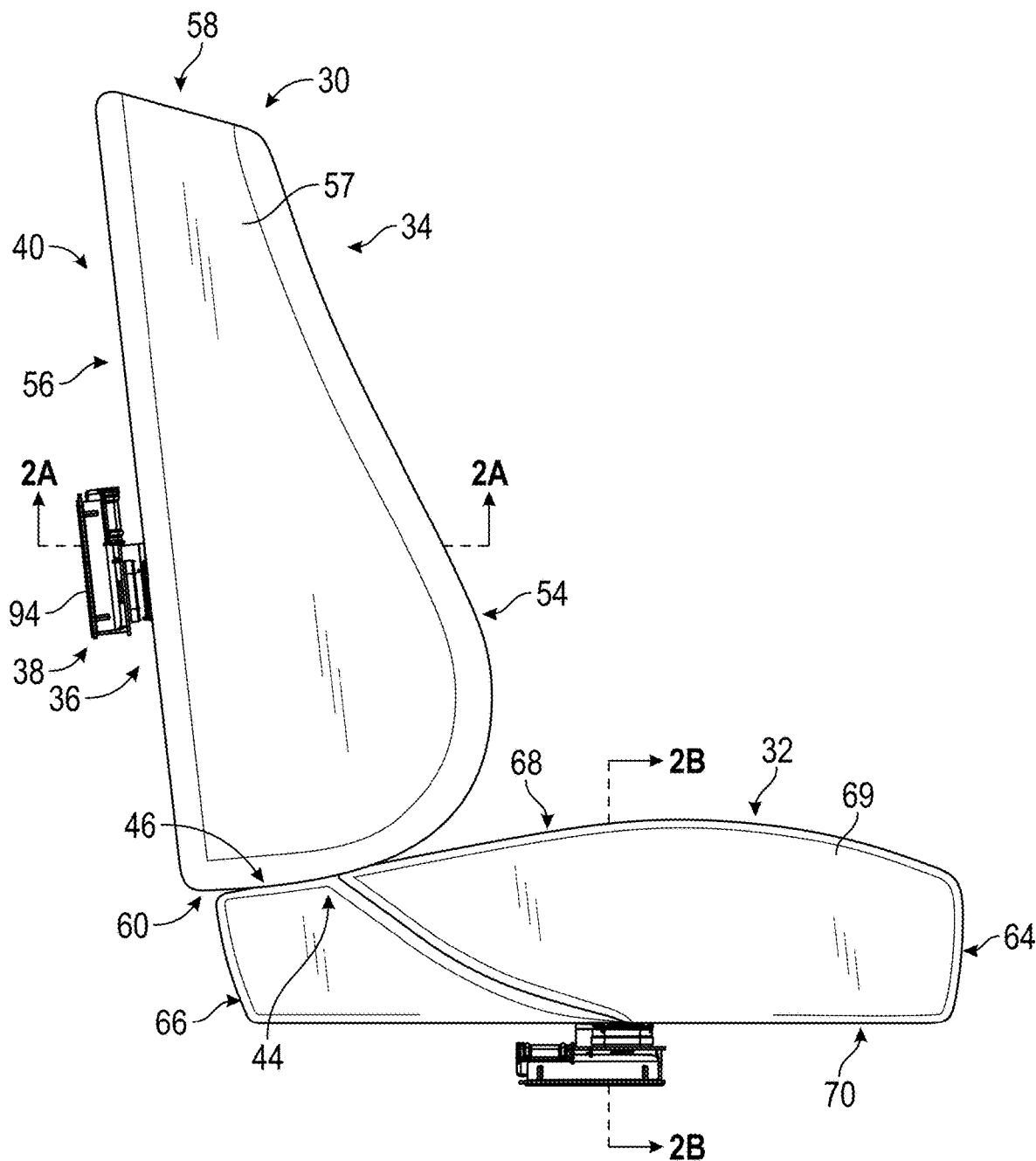
FIG. 2 is a side view of the vehicle seat assembly of FIG. 1.

FIGS. 1 and 2 are front perspective and side views a climate controlled seat assembly 30 can in certain arrangements be used with one or more of the features and arrangements described with reference to FIGS. 6-22 below. As shown, the seat assembly 30 comprises a seat portion 32 and a backrest 34. The seat assembly 30 also includes a climate control system 36, which will be described in more detail below with reference to FIG. 4.

When an occupant sits in the seat assembly 30, the occupant's seat is located generally in a seat area 40 of the seat or seat portion 32 and at least a portion of their legs are supported by a thigh area 42 of the seat portion 32. In this embodiment, a rear end 44 of the seat portion 32 is coupled to a bottom end 46 of the backrest or backrest portion 34. When the occupant sits in the seat assembly 30, the occupant's back contacts a front surface 48 of the backrest portion 34 and the occupant's seat and legs contact a top surface 50 of the seat portion 32. The surfaces 48, 50 cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the embodiments and arrangements of this disclosure may also be used in a variety of other applications and environments. For example, certain features and aspects of the seat assembly 30 and the embodiments and arrangements of this disclosure may be adapted for use in other vehicles, such as, for example, an airplane, a boat, or the like. Further, certain features and aspects of the of the embodiments and arrangements of this disclosure can also be adapted for use in stationary environments, such as, for example, a chair, a sofa, a theater seat, a mattress, topper for a mattress, and/or an office seat that is used in a place of business and/or residence and/or any other surface on which an occupant can be supported and on which thermal conditioning can be desirable. Certain features and aspects of the of the embodiments and arrangements of this disclosure can also be adapted for use in applications where it is desired to cool an enclosed or partially enclosed space, such as, for example, a cupholder or a heated and/or cooled bin.

With continued reference to FIGS. 1 and 2, the backrest 34 has a front side 54, a rear side 56, a top side 58 and a bottom side 60. The backrest 34 includes a pair of sides 57, 59 extending between the top side 58 and bottom side 60 for providing lateral support to the occupant of the seat assembly 30. A lumbar region 62 of the backrest 34 is generally positioned between the sides 57, 59 of the backrest 34 near the seat portion 32.

In a similar manner, the seat portion 32 has a front side 64, a rear side 66, a top side 68 and a bottom side 70. The seat portion 32 also includes a pair of sides 69, 71, which extending from the rear side 66 and the front side 64 for providing lateral support to the occupant of the seat assembly 30. In one embodiment, the seat assembly 30 is secured to a vehicle by attaching the bottom side 70 of the seat portion 32 to the floor of a vehicle.

Figure 2A:
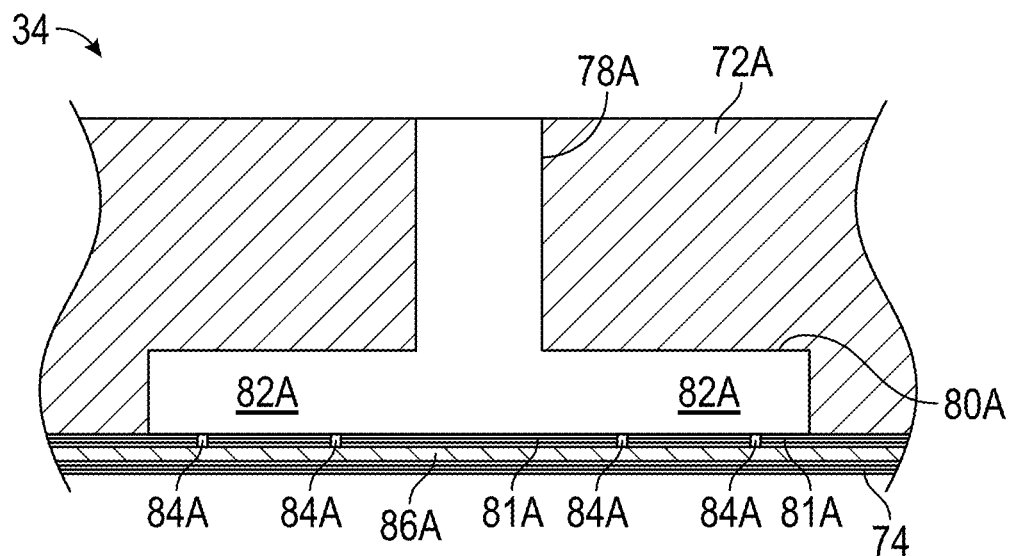
FIG. 2A is a cross-sectional view of the vehicle seat assembly of FIG. 1 taken along line 2A-2A of FIG. 2.
Figure 2B:
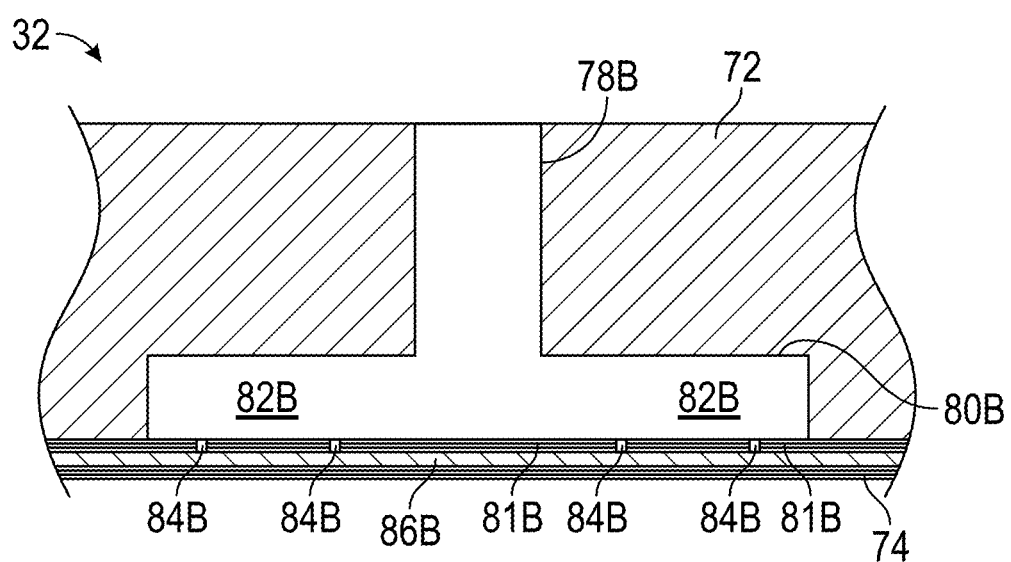
FIG. 2B is a cross-sectional view of the vehicle seat assembly of FIG. 1 taken along line 2B-2B of FIG. 2.

FIGS. 2A and 2B are cross-sectional views of a portion of the backrest 34 and seat portion 32 respectively. As shown, the backrest 34 and seat portion 32 are generally formed by a cushion 72, which is covered with an appropriate covering material 74 (e.g., upholstery, leather or leather like materials). The cushion 72 is typically supported on a metallic frame (not shown) although other materials, such as plastics and composites, can also be used. In some embodiments, springs may be positioned between the frame and the cushion 72. The frame provides the seat assembly 30 with structural support while the cushion 72 provides a soft seating surface. The covering material 74 provides an aesthetic appearance and soft feel to the surface of the seat assembly 30.

Figure 3:
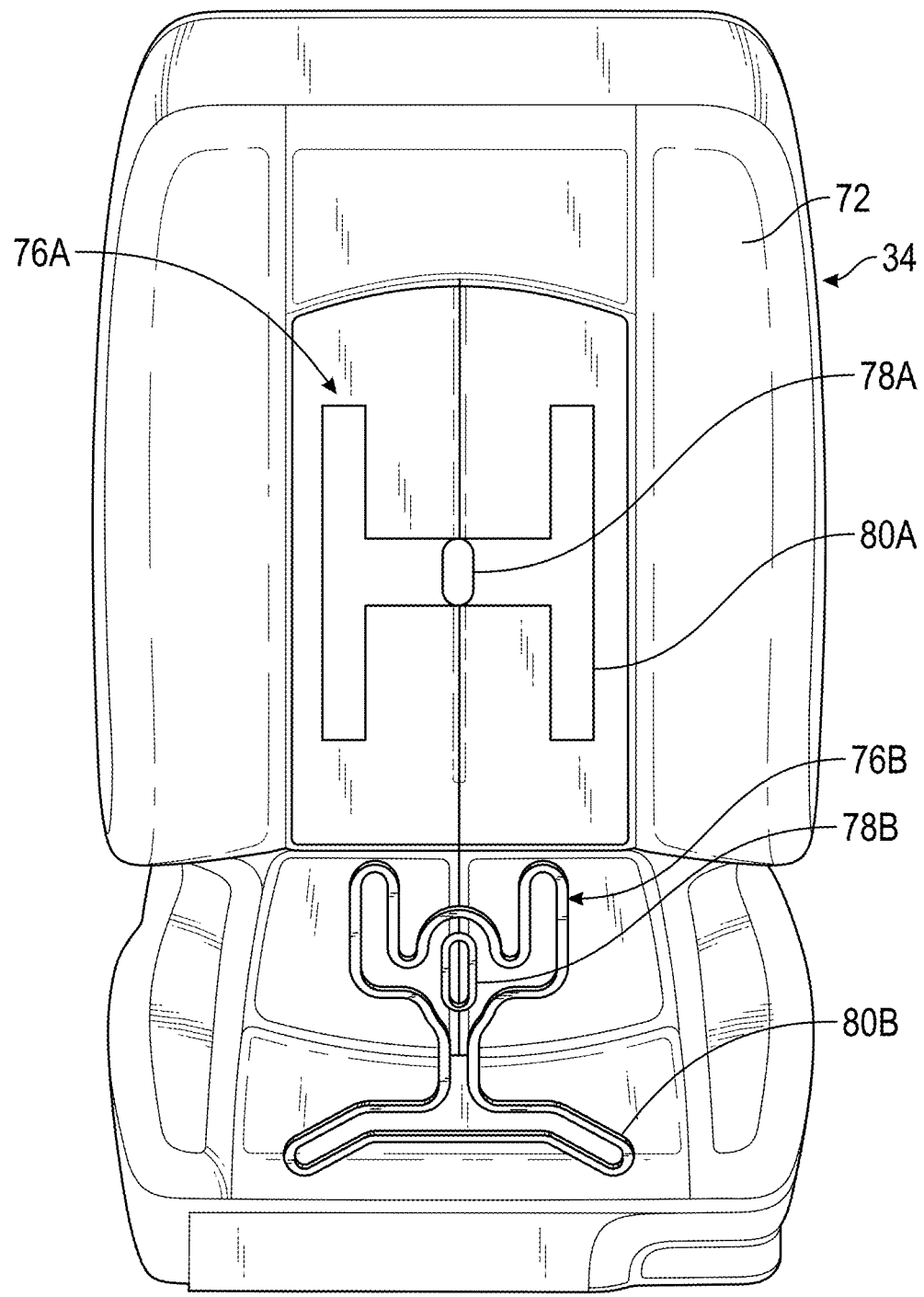
FIG. 3 is a front view of the vehicle seat assembly of FIG. 1 with a covering of the seat assembly removed.

FIG. 3 illustrates the seat assembly 30 of FIGS. 1 and 2 with the covering 74 removed thereby exposing the cushion 72. The cushion 72 can be a typical automotive seat cushion foam or other types of materials with suitable characteristics for providing support to an occupant. Such materials include, but are not limited to, closed or open-celled foam.

As shown in FIG. 3, the backrest 34 of the seat assembly 30 is provided with a backrest fluid distribution system 76A. The distribution system 76A comprises an inlet passage 78A through from the front side 54 to the rear side 56 of the seat cushion 72. (See also FIG. 2A). The distribution system 76A also includes at least one, and often, a plurality of channels 80A, which extend from the inlet passage 78A.

As mentioned above, the cushion 72 may be formed from a typical automotive cushion material, such as, for example, an open or closed cell foam. In one embodiment, the cushion 72 is made of foam that is pre-molded to form the passage 78A and/or the channels 80A. In some embodiments, portions of the cushion 72 can have structural characteristics which differ from the structural characteristics of other portions of the cushion 72. For example, certain portions of the cushion 72 can be more compliant than other portions of the cushion 72. In some embodiments, portions of the cushion 72 positioned between channels 80A and the covering material 74 can be a porous material which can desirably facilitate the ventilation function of the seat, that is, allows air to be pushed or pulled through the top surface into the channels within the seat assembly 30. In some embodiments, portions of the cushion 72 positioned between channels 80A and the covering material 74 can be a smoothing layer. The portions of the cushion 72 positioned between channels 80A and the covering material 74 can be attached to the covering layer 74, for example by adhesive and/or sewing. In another embodiment, the passage 78A and/or the channels 80A may be formed by cutting foam out of the seat cushion 72. In another embodiment, the passage 78A and/or channels 80A can be formed using a plenum or other similar device having one or more air passageways for distributing the air flow through the cushion 72. The channels can be filled with air permeable material e.g., spacer fabric that can provide support while still allowing the flow of air through the material.

With reference back to FIG. 2A, the channels 80A can be covered by a scrim 81A to define distribution passages 82A for transporting air through the seat assembly 30. The scrim 81A includes one or more openings 84A for delivering air to and/or from the distribution passages 82A. The scrim 81A may be formed of a material similar to the cushion 72. In the illustrated embodiment, the scrim 81A is attached to the cushion 72 in a manner that limits leakage between the scrim 81A and cushion 72 thereby directing the flow of air through the openings 84A. In one embodiment, an adhesive is used to attach the scrim 81A to the cushion 72. In other embodiments, a heat stake or fasteners may be used.

With continued reference to FIG. 2A, a distribution layer 86A can be disposed between the scrim 81A and the seat covering 74. The distribution layer 86A can spread the air flowing through the openings 84A along the lower surface of the covering 74. To permit airflow between the distribution layer 86A and the spaces proximal to the front surface 48 of the backrest 34, the covering 74 may be formed from an air-permeable material. For example, in one embodiment, the covering 74 comprises an air-permeable fabric made of natural and/or synthetic fibers. In another embodiment, the covering can be formed from a leather, or leather-like material that is provided with small openings or apertures.

With reference to FIGS. 2B and 3, the seat 32 of the seat assembly 30 can be provided with a seat cushion fluid distribution system 76B. The seat distribution system 76B also comprises an inlet passage 78B through from the top side 68 to the bottom side 70 of the seat cushion 72. As with the backrest distribution system 76A, the seat distribution system 76B also includes at least one, and often, a plurality of channels 80B, which extend from the inlet passage 78B. These channels 80B may be configured as described above.

In the seat distribution system 76B, the channels 80B are also covered by a scrim 81B to define distribution passages 82B for transporting air through the seat assembly 30. The scrim 81B includes one or more openings 84B for delivering air to and/or from the distribution passages 82B. As described above, the scrim 81B may be formed of a material similar to the cushion 72 and is preferably attached to the cushion 72 in a manner that limits leakage between the scrim 81B and cushion 72. A distribution layer 86B can be disposed between the scrim 81B and the seat covering 74.

As will be explained in more detail below, in one embodiment, conditioned air can be delivered to the distribution passages 82A, 82B through the inlet passages 78A, 78B. The air then flows through the openings 84A, 84B and into the distribution layer 86A, 86B. The air can then be directed through the covering 74 to a space adjacent to the front surface 48 of the backrest 34 or the top surface 50 of the seat 32.

As will be described below, the climate control system 36 can also be to remove air, which is adjacent to the front surface 48 of the backrest 34 and/or the top surface 50 of the seat 32. In one arrangement, the air can be withdrawn through the covering 74 and into the distribution layers 86A, 86B. The air can then be withdrawn through the openings, distribution passages and/or outlet passages (not shown) provided in the seat 32. In some embodiments described below, conditioned air is delivered to at least portions of the seat assembly 30 and air is removed from other portions of the seat assembly 30. For example, conditioned air can be delivered to the distribution passages 82A, 82B through the inlet passages 78A, 78B. The conditioned air then flows through the openings 84A, 84B and into the distribution layer 86A, 86B where it is directed through the covering 74 to a space adjacent to the front surface 48 of the backrest 34 and/or the top surface 50 of the seat 32. In arrangements described below, air can be subsequently or simultaneously removed from another set of distribution passages through a set of outlet passages. The air can be withdrawn through the covering 74 and into another set of distribution layers.

In some embodiments, the distribution layer from which air is withdrawn can be the same distribution layer 86A, 86B to which conditioned air is delivered. This can be advantageous in removing conditioned air which has been heated, or cooled, by the occupant thus ensuring a constant stream of freshly conditioned air to the occupant. In some embodiments, the distribution layer from which air is withdrawn can be fluidically separated from the distribution layer 86A, 86B. For example, the distribution layer used for withdrawal of air can be located along or proximate an outer periphery of the seating surfaces (e.g., the seat bolsters such as sides 57, 59, 69, 71, an area proximate the front side 64 and/or rear side 66 of the seat portion 32, an area proximate the top side 58 and/or bottom side 60 of the backrest 34).

Given the goal of distributing air through the cushion 72 and along the covering 74, the distribution systems 76A, 76B for the backrest 34 and the seat 32 may be modified in several different manners. For example, the shape and/or number of channels 80A, 80B may be modified or combined. In other embodiments, the scrim 81A, 81B and/or distribution passages 82A, 82B may be combined and/or replaced with other components configured for similar functions. In yet another embodiment, a separate insert may be positioned within the channels 80A, 80B for distributing the air. See e.g., U.S. Pat. No. 7,114,771, filed May 25, 2004, the entire contents of which are hereby incorporated by reference herein. In other embodiments, the distribution systems 76A, 76B or portions thereof may be combined with each other. A spacer fabric or spacer layer can also be positioned within the channels 80A, 80B in certain arrangements.

Figure 4:
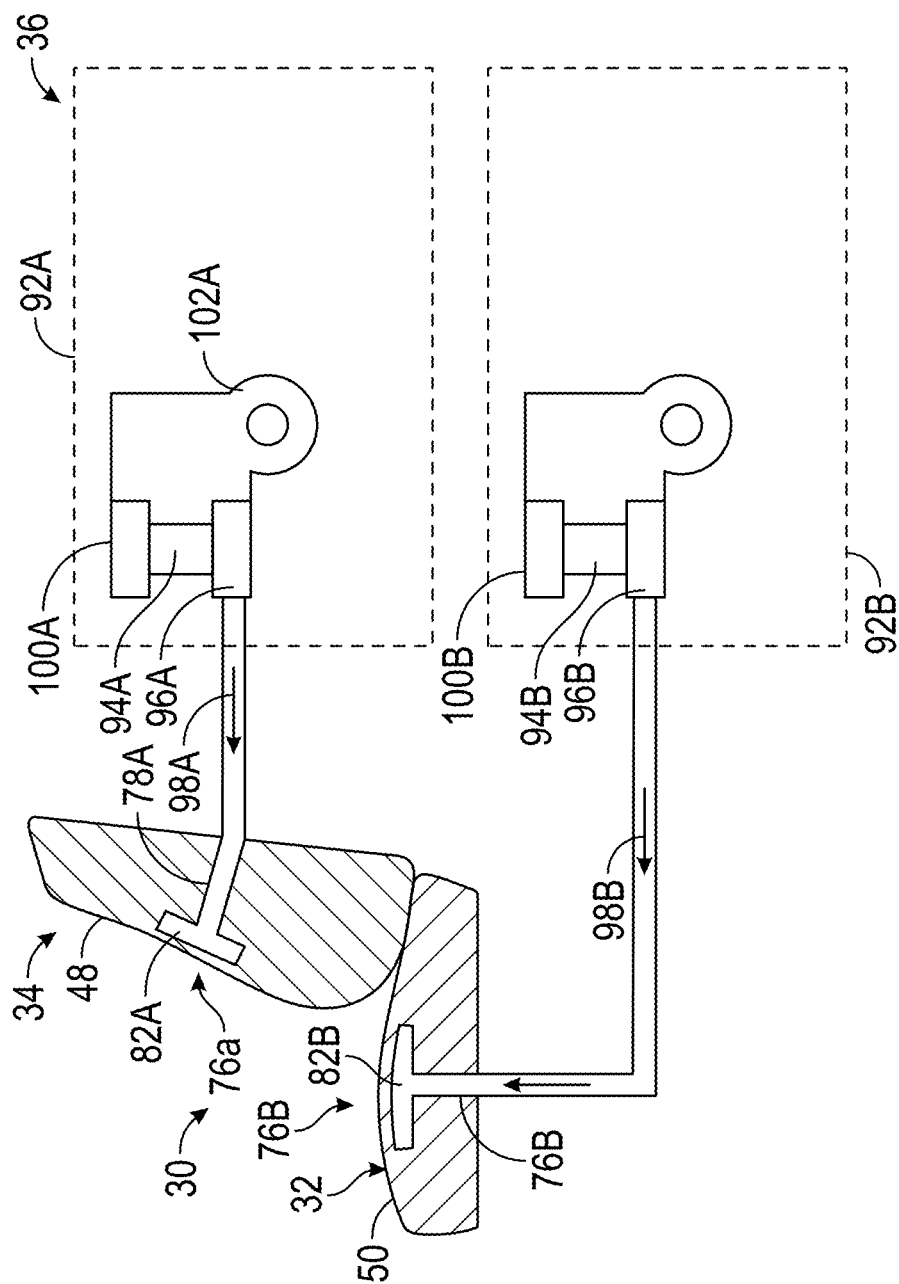
FIG. 4 is a schematic illustration of the vehicle seat assembly and climate control system of FIG. 1.

FIG. 4 is a schematic illustration of an example climate control system 36 that can be used with or in combination, sub-combinations or in modifications with the embodiments and arrangements disclosed herein. In the illustrated embodiment, the climate control system includes a back thermal module 92A and seat thermal module 92B. As will be explained below, both thermal modules 92A, 92B can be configured to provide conditioned air (and/or to remove air in some embodiments) to the distribution systems 76A, 76B described above. In this manner, the thermal modules 92A, 92B provide a fluid flow to either warm or cool the front surface 48 of the backrest 34 and the top surface 50 of the seat portion 32 respectively. The climate control apparatus 36 can provides conditioned air that is either heated or cooled relative to the temperature of the front surface 48 of the back rest 32 and the top surface 50 of the seat 32.

In the illustrated embodiment, the thermal modules 92A, 92B can each include a thermoelectric device 94A, 94B for temperature conditioning (i.e. selectively heating or cooling) the fluid flowing through the device 94A, 94B. In an arrangement, the thermoelectric device 94A, 94B is a Peltier thermoelectric module. The illustrated thermal modules 92A, 92B can also include a main heat exchanger 96A, 96B for transferring or removing thermal energy from the fluid flowing through the modules 92A, 92B and to the distribution systems 76A, 76B. Such fluid is transferred to the distribution systems 76A, 76B through ducting 98A, 98B (see e.g., U.S. Publication No. 2006/0087160, published Oct. 25, 2004, which is hereby incorporated by reference herein). The modules 92A, 92B can also include a secondary or waste heat exchanger 100A, 100B that extends from the thermoelectric device 94A, 94B generally opposite the main heat exchanger 96A, 96B. A pumping device 102A, 102B is can be associated with each thermal module 92A, 92B for directing fluid over the main and/or waste heat exchangers 96A, 96B, 100A, 100B. The pumping devices 102A, 102B can comprise an electrical fan or blower, such as, for example, an axial blower and/or radial fan. In the illustrated embodiment, a single pumping device 102A, 102B may be used for both the main and waste heat exchangers 96A, 96B, 100A, 100B. However, it is anticipated that separate pumping devices may be associated with the secondary and heat exchangers 96A, 96B, 100A, 100B.

It should be appreciated that the thermal modules 92A, 92B described above represents only one embodiment of a device that may be used to condition the air supplied to the distribution systems 76A, 76B. Any of a variety of differently configured thermal modules may be used to provide conditioned air. Other examples of thermal modules that may be used are described in U.S. Pat. Nos. 6,223,539, 6,119,463, 5,524,439 or 5,626,021, which are hereby incorporated by reference in their entirety. Another example of such a thermal module is currently sold under the trademark Micro-Thermal Module™ by Amerigon, Inc. In another example, the thermal module may comprise a pump device without a thermoelectric device for thermally conditioning the air. In such an embodiment, the pumping device may be used to remove or supply air to the distribution system 76A, 76B. In yet another embodiment, the thermal modules 92A, 92B, may share one or more components (e.g., pumping devices, thermoelectric devices, etc.) with the vehicles general climate control system.

With continued reference to FIG. 4, in operation, fluid in the form of air can be delivered from the thermal modules 92A, 92B, specifically through the main heat exchangers 96A, 96B and through the ducting 98A, 98B to the distribution systems 76A, 76B. As described above, the air flows through the passages 82A, 82B, into the openings 84A, 84B and then along the distribution layer 86A, 86B and through the covering 74. In this manner, conditioned air can be provided to the front surface 48 of the backrest 34 and the top surface 50 of the seat 32. Air can also pass through waste heat exchangers 100A, 100B and out to the surroundings.

In a modified embodiment, air from within the passenger compartment of the automobile can be drawn through the covering 74, into the distribution layer 86A, 86B and through the openings 84A, 84B. The air then can flow through the distribution passages 82A, 82B, into the inlet passage 78A, 78B and then into the ducting 98A, 98B. In this manner, the climate control system 36 can provide suction so that air near the surface of the seat assembly 30 is removed.

A suitable control system can be provided to control the climate control system 36 in response to various control routines and/or user inputs. See, e.g., U.S. Pat. No. 7,587,901, filed Jan. 31, 2005, the entire contents of which are hereby incorporated by reference herein.

In some embodiments such as that illustrated in FIG. 2, the thermal modules 92A, 92B can be coupled to the rear side 56 and the bottom side 70 of the backrest 34 and seat portion 32, respectively. In some embodiments, the thermal modules 92A, 92B can be integrated within the seat assembly 30 such that at least a portion of the thermal modules 92A, 92B are contained within the backrest 34 and seat portion 32, respectively. By integrating the thermal modules 92A, 92B into the seat assembly 30, the amount of ducting and the total size of the assembly can be significantly reduced.

Figure 5:
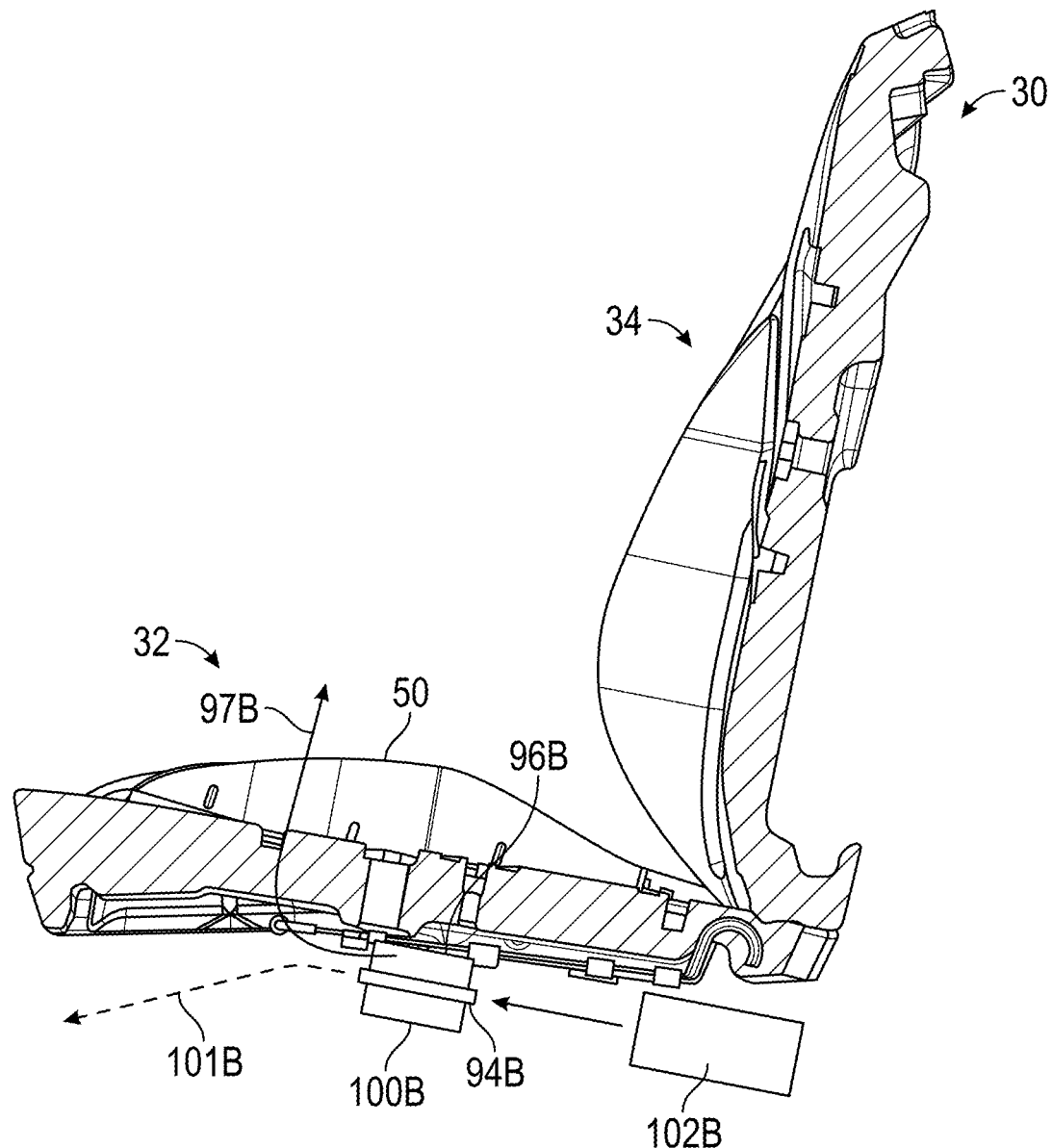
FIG. 5 is a schematic illustration of an embodiment of a vehicle seat assembly and climate control system according to the present disclosure.
Figure 13:
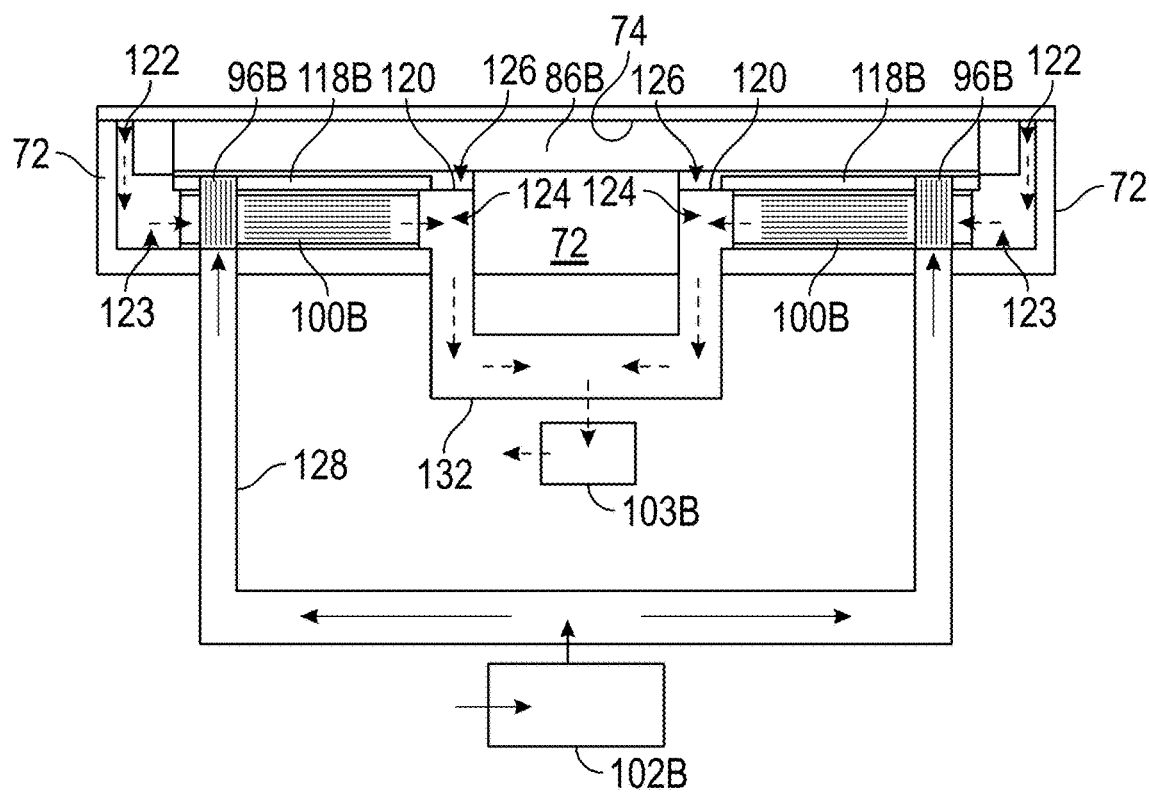
FIG. 13 is a schematic illustration of an embodiment of a seat assembly with climate control components contained therein according to the present disclosure.
Figure 14:
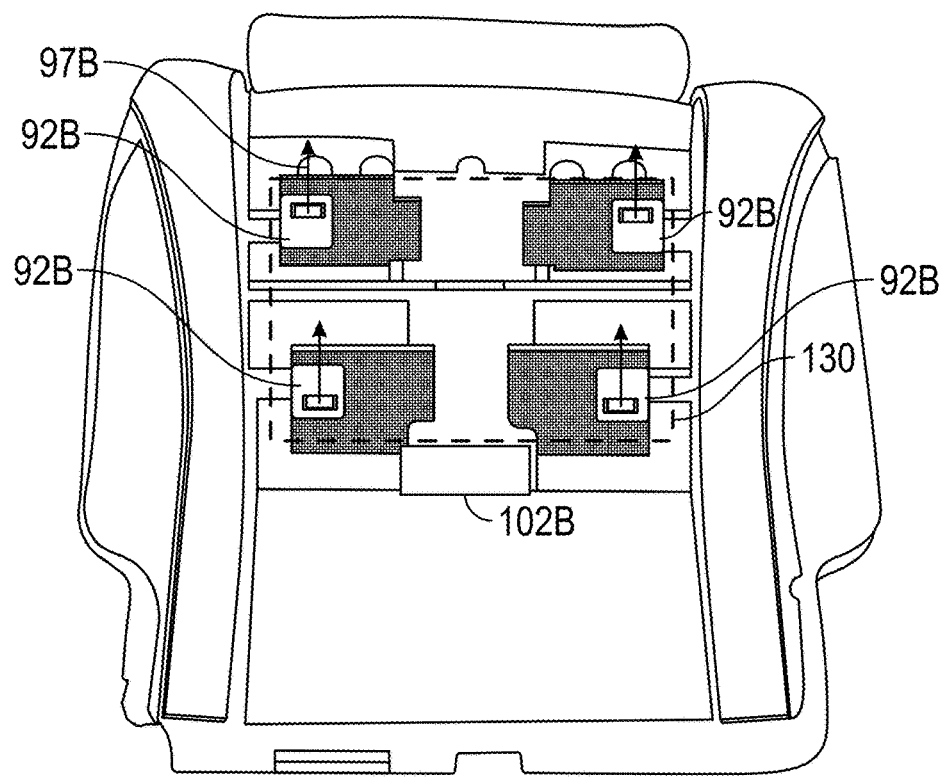
FIG. 14 is a top view of an embodiment of a seat assembly and climate control system having an embodiment of a fluid distribution unit according to the present disclosure.

For purposes of this disclosure, arrows having broken lines reflect airflow towards a waste side of a thermoelectric device and/or waste fluid. Arrows having solid lines reflect airflow towards a main side of a thermoelectric device and/or conditioned fluid. With reference now to FIG. 5, a schematic view of an embodiment of a climate controlled seat assembly is illustrated in which fluid flow through both the main heat exchanger 96B and the waste heat exchanger 100B attached to the thermoelectric device 94B occurs via a single pumping device 102B. While the embodiment is described with respect to the seat 32 and components of the seat 32, it should be understood that the system can also be applied to the backrest 34 and components of the backrest 34. With respect to the main heat exchanger 96B, the pumping device 102B can be designed to direct fluid, such as air, from a location that is spaced apart from the surface being cooled or heated through a conduit, such as ducting 98B of FIG. 4 and fluid distribution component 128 of FIG. 13 including, but not limited to, plenum or bag 130 as shown in FIG. 14, towards the main heat exchanger 96B. In the illustrated embodiment, the pumping device is located on a side opposite of the seat 32 from the surface that supports the occupant. The conditioned fluid 97B from the main heat exchanger 96B can then be directed via a conduit, such as seat distribution system 76B, towards the surface to be cooled or heated. With respect to the waste heat exchanger 100B, the pumping device 102B can be designed to direct fluid, such as air, from a location that is spaced apart from the surface being cooled or heated through a conduit towards the waste heat exchanger 100B where the waste fluid 101B can then be exhausted to the surrounding atmosphere. As noted above, in the illustrated embodiment, pumping device is located on a side of the seat opposite from the surface that supports the occupant.

As should be appreciated, the fluid passing through both the main heat exchanger 96B and the waste heat exchanger 100B is pulled from a location spaced apart from the surface being cooled or heated such that the fluid passing through both the main heat exchanger 96B and the waste heat exchanger 100B has not been immediately or recently conditioned by the heat exchangers. As shown in the illustrated embodiment, air can be pulled on a side of the seat assembly 30 opposite the occupant. Accordingly, the fluid passing through the waste heat exchanger 100B is generally fluid at atmospheric conditions or the general conditions within the vehicle. Moreover, the only flow of fluid towards or away from the occupant is the flow of conditioned fluid 97B.

Figure 6:
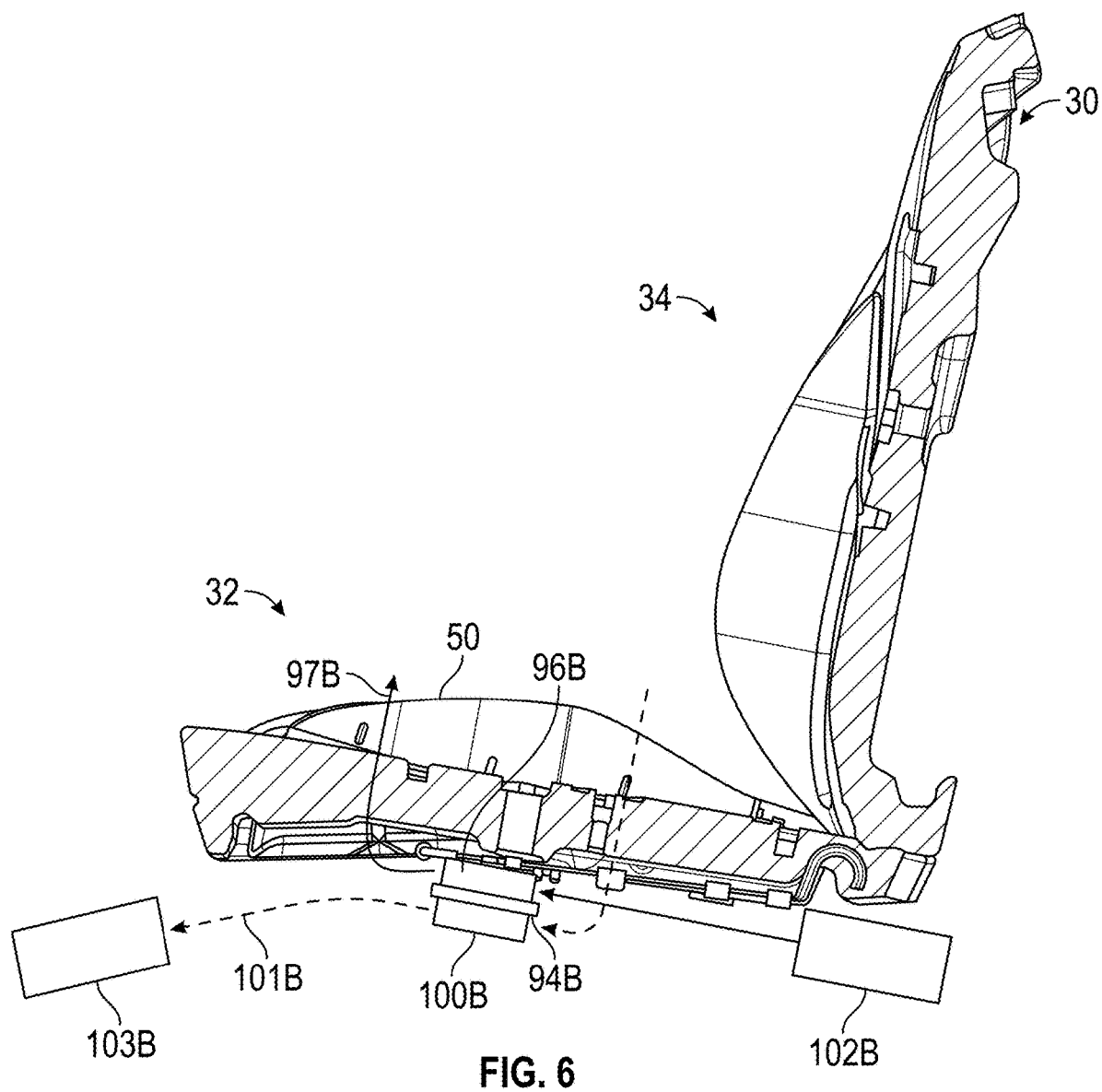
FIG. 6 is a schematic illustration of another embodiment of a vehicle seat assembly and climate control system according to the present disclosure.

With reference now to FIG. 6, a schematic view of an another embodiment of a climate controlled seat assembly 30 is illustrated in which fluid flow through both the main heat exchanger 96B and the waste heat exchanger 100B attached to the thermoelectric device 94B occurs via two or more pumping devices 102B, 103B. As will be appreciated, this "cross-flow" operation of the climate controlled seat assembly 30 can provide advantages over a non-"cross-flow" design. While the embodiment is described with respect to the seat 32 and components of the seat 32, it should be understood that the system can also be applied to the backrest 34 and components of the backrest 34. Moreover the embodiments described with respect to FIGS. 6-22 can be used in combination with a seat assembly and/or control system described above or a modified seat assembly and/or control system. In addition, as mentioned above, the arrangements of this disclosure may be adapted for use in other vehicles, such as, for example, an airplane, a boat, or the like other support assemblies such as, for example, a chair, a sofa, a theater seat, a mattress, topper for a mattress, and/or an office seat that is used in a place of business and/or residence and/or any other surface on which an occupant can be supported and on which thermal conditioning can be desirable and/or applications where it is desired to cool an enclosed or partially enclosed space, such as, for example, a cupholder or a heated and/or cooled bin As shown in the illustrated embodiment, pumping device 102B can be designed to push air towards main heat exchanger 96B and pumping device 103B can be designed to pull air through waste heat exchanger 100B. Similar to the embodiment illustrated in FIG. 5, with respect to the main heat exchanger 96B, the pumping device 102B can direct fluid, such as air, from a location that is spaced from the surface being conditioned (e.g., cooled and/or heated) and/or supporting the occupant such that a majority of the fluid has not been immediately conditioned by the thermal module 92B. The pumping device 102B can direct such fluid through a conduit, such as ducting 98B of FIG. 4 or fluid distribution component 128 of FIG. 13 including, but not limited to, plenum or bag 130 as shown in FIG. 14, towards the main heat exchanger 96B. The conditioned fluid 97B from the main heat exchanger 96B can then be directed via a conduit, such as seat distribution system 76B of FIGS. 2-3, towards the surface to be cooled or heated. With respect to the waste heat exchanger 100B, the pumping device 103B can direct fluid, such as air, from a location proximate and/or on a side of the surface being conditioned (e.g., cooled and/or heated) and/or supporting an occupant through a conduit, such as fluid distribution component 132 of FIG. 13 including, but not limited to, collection bag 134 of FIG. 15 or plenum 136 of FIG. 16, towards the waste heat exchanger 100B where the waste fluid 101B can then be exhausted to the surrounding atmosphere.

As should be appreciated in this embodiment, the fluid passing through the waste heat exchanger 100B is withdrawn from a location proximate the surface being cooled or heated or on a side of the of the support assembly being cooled or heated and thus such fluid is being withdrawn proximate the occupant and in the illustrated embodiment is transferred through at least a portion of the seat 32 before entering the waste heat exchange 100B. For example, in conditioning systems for the seat 32, the fluid for the waste heat exchanger 100B can be withdrawn from the top surface 50 of the seat 32 or proximate the top surface 50 and then, in the illustrated embodiment, drawn through a channel extending at least partially through or along the seat 32. In conditioning systems for the backrest 34, the fluid for the waste heat exchange 100B can be withdrawn from the front surface 48 of the backrest 34 or proximate the front surface 48 and then, in one embodiment, drawn through a then through a channel extending at least partially through or along the backrest 34. This can advantageously enhance the efficiency of the system by making use of the air flow through the waste heat exchanger 100B to further enhance the comfort of the occupant. For example, by withdrawing air proximate the occupant, one can increase circulation such that air does not stagnate around the occupant. This "vent" cooling can be used to supplement the "active" cooling from the conditioned fluid 97B.

In addition, the air withdrawn from the top surface 50 or front surface 48 can be at a lower or higher temperature (depending upon the mode) as compared to the air beneath the seat and/or a side of the support assembly opposite the support surface and/or to a side of the support surface. For example, it can be the case that the occupant is utilizing HVAC of the vehicle such that the fluid above the seat assembly 30 and/or on a side of the seat assembly supporting the occupant is at a lower or higher temperature than the temperature of fluid below, to the side and/or behind (e.g., opposite the support surface) the seat assembly 30. It can also be the case that at least a portion of the conditioned fluid 97B can be recirculated. In this manner, the thermoelectric unit can be operated more efficiently. For example, in the situation where the thermal module 92B is used to direct cooled fluid towards the occupant, the waste heat exchanger 100B will be at a higher temperature as a result of operation of the thermoelectric device 94B. Since the fluid withdrawn from the top surface 50 or the front surface 48 can be at a lower temperature than the surrounding fluid spaced from the occupant, use of this cooler fluid can more effectively remove heat from the waste heat exchanger 100B. In contrast, had the higher temperature fluid been used, a greater amount of fluid would have been needed to remove heat from the waste heat exchanger 100B to the same degree (i.e., the pump 103B would need to generate more flow and thus expend more energy). In the situation where the thermal module 92B is used to direct heated fluid towards the occupant, the waste heat exchanger 100B will be at a lower temperature as a result of operation of the thermoelectric device 94B. Since the fluid withdrawn from the top surface 50 or the front surface 48 can be at a higher temperature than the surrounding fluid spaced from the occupant, use of this hotter fluid can more effectively heat transfer to the waste heat exchanger 100B. In contrast, had the lower temperature fluid from the surroundings been used, a greater amount of fluid would have been needed to transfer heat to the waste heat exchanger 100B to the same degree (i.e., the pump 103B would need to generate more flow and thus expend more energy).

It can also be advantageous in certain embodiments, particularly those in which the thermal conditioning system is used to create a cooled conditioned fluid 97B, to have the pumping device 103B positioned downstream of the waste heat exchanger 100B. Due to inherent inefficiencies in pumping device 103B, there can be an increase in temperature in the fluid stream. By positioning the pumping device 103B downstream of the waste heat exchanger 100B, this increase in temperature does not detrimentally affect the ability to remove heat from the waste heat exchanger 100B.

In some embodiments, the location from which fluid is withdrawn can be adjacent the location at which conditioned fluid 97B is being introduced. In some embodiments, the location from which fluid is withdrawn can be partially spaced apart from the location at which conditioned fluid 97B is being introduced but still be on the same side of the seat assembly 30 or support assembly (e.g., bed, sofa and/or chair) as the occupant. For example, the fluid can be withdrawn along the outer periphery of the seat 32 and backrest 34, such as the side bolsters of the seat 32 such as sides 69, 71 and backrest 34 such as sides 57, 59, whereas conditioned fluid 97B can be introduced at a central location of the seat 32 such as the seat area 40 and a central location of the backrest 34 such as the lumbar region 62. Further separation can potentially enhance the efficiency of the system by reducing the likelihood that a substantial amount of conditioned fluid 97B is removed before cooling or heating the occupant.

It should be appreciated that the embodiment described above with reference to FIG. 6 can be used in other types of support assemblies and/or applications and need not be used in combination with the additional embodiments described herein.

Figure 7:
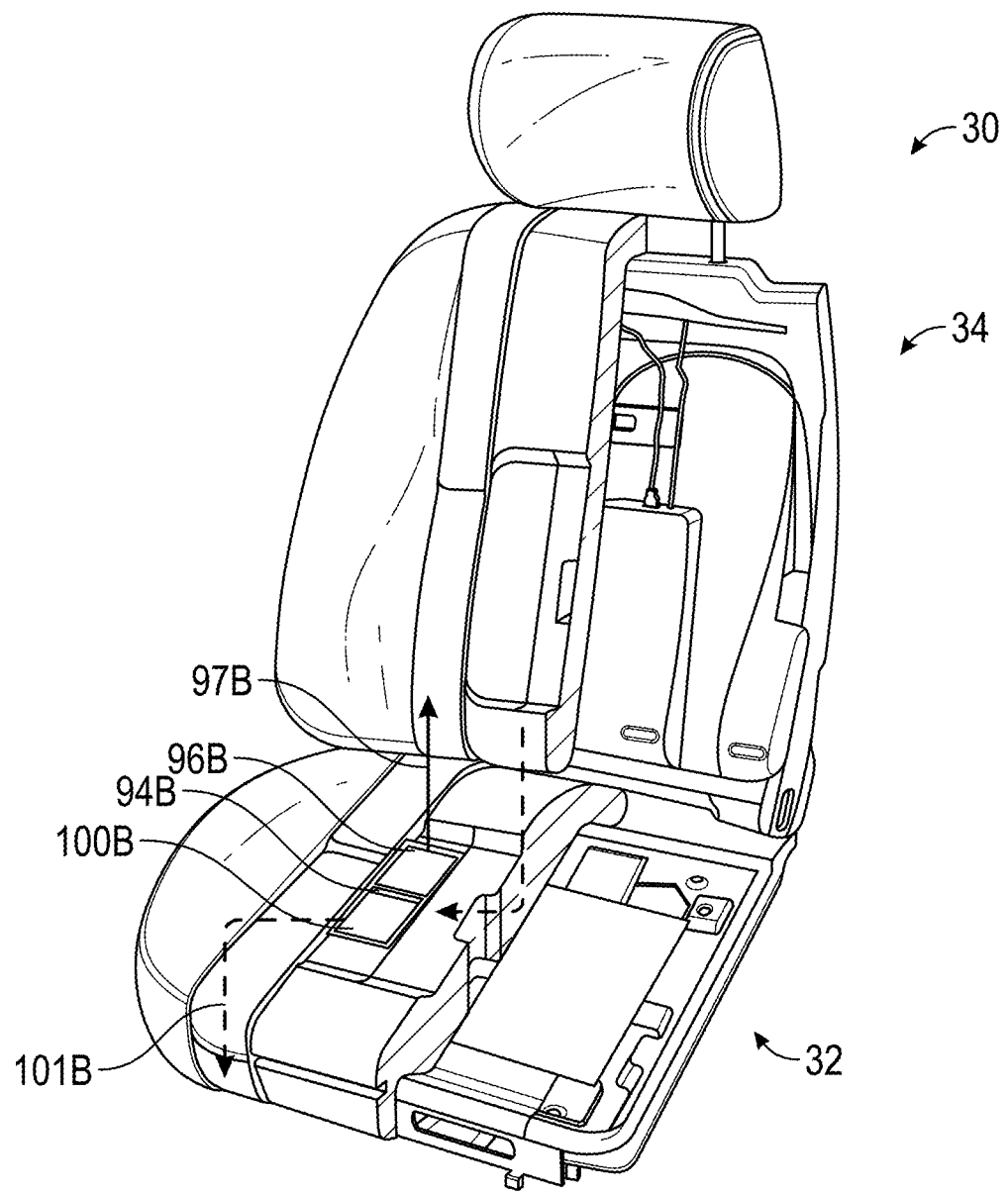
FIG. 7 is a schematic illustration of another embodiment of a vehicle seat assembly and climate control system according to the present disclosure.

FIG. 7 illustrates a schematic view of another embodiment of a climate controlled seat assembly 30 in which components of the thermal module 92B are contained within the seat 32, which can be used alone or in combination with the embodiments described above. As with other embodiments described herein, this embodiment can also be extended to other application and support assemblies, such as, for example, beds, topper members, and/or chairs. As will be appreciated, integration of components of the thermal module 92B can provide advantages including compact packaging and increased efficiency. While the embodiment is described with respect to the seat 32 and components of the seat 32, it should be understood that the system can also be applied to the backrest 34 and components of the backrest 34. As shown in the illustrated embodiment, the thermoelectric device 94B, main side heat exchanger 96B and the waste side heat exchange 100B are contained within the seat 32. Conditioned fluid 97B passing through the main side heat exchanger 96B can be directed towards the occupant whereas fluid passing through the waste heat exchanger 100B can be pulled from around the occupant and directed away from the occupant.

It should be appreciated that the embodiment described above with reference to FIG. 7 can be used in other types of support assemblies and/or applications and need not be used in combination with the additional embodiments described herein.

Figure 8:
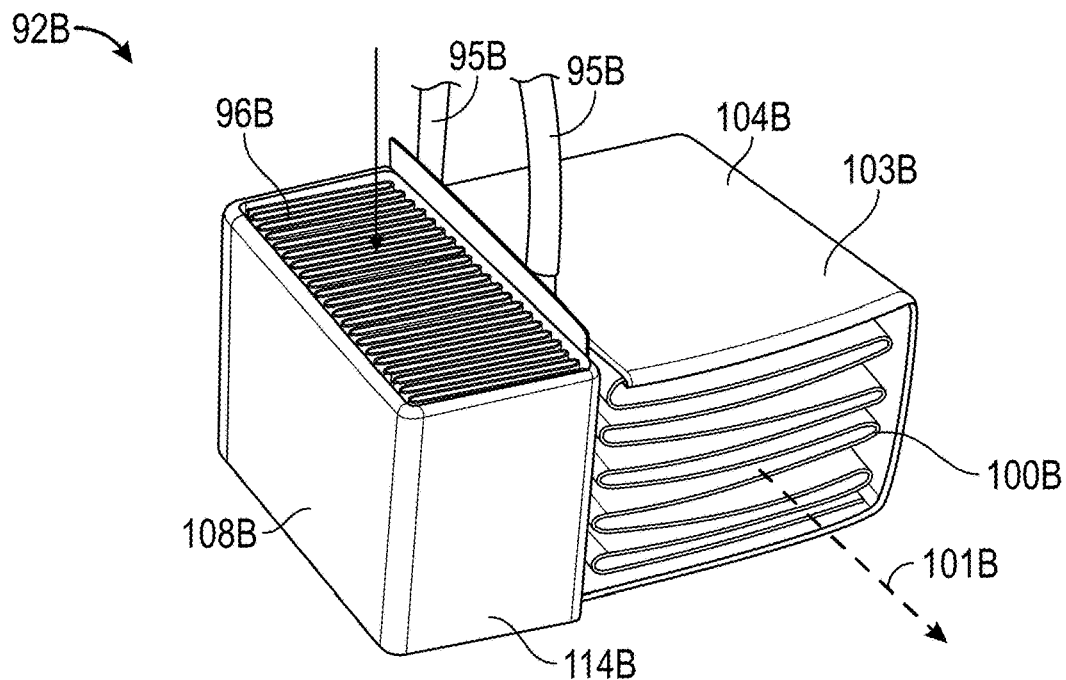
FIG. 8 is a perspective view of an embodiment of a thermal module without a housing according to the present disclosure.
Figure 9:
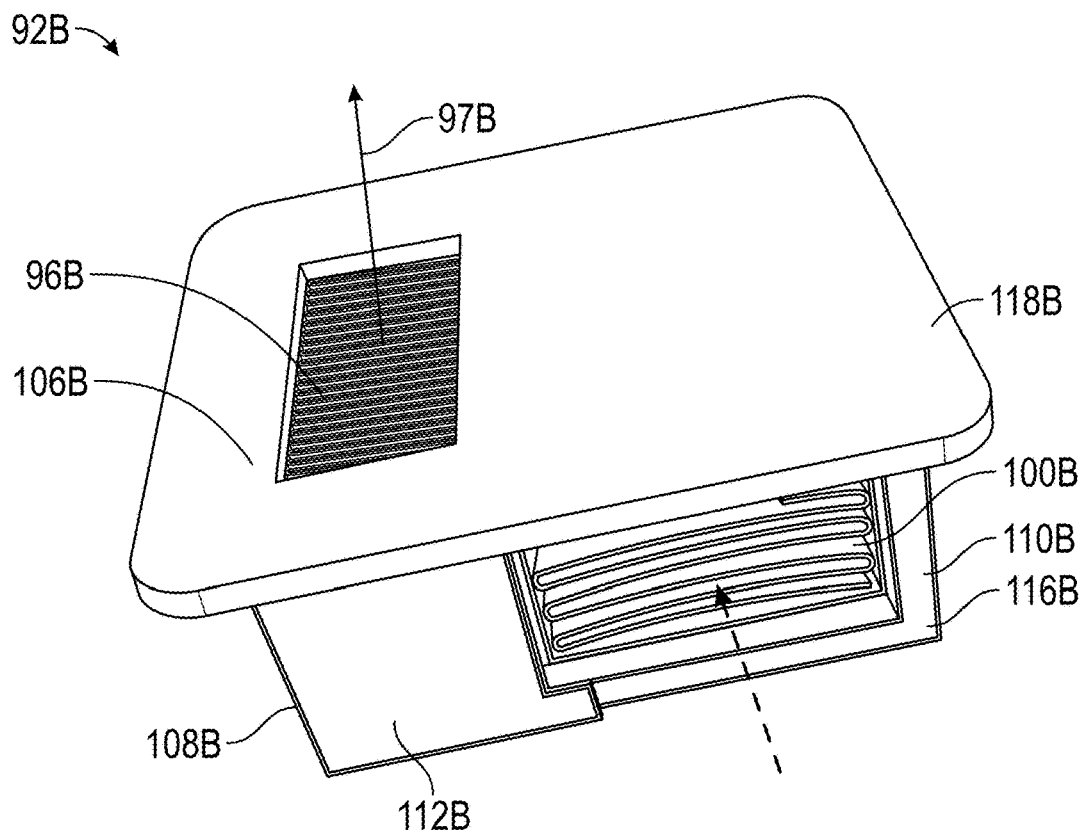
FIG. 9 is a top perspective view of an embodiment of a thermal module with a housing according to the present disclosure.
Figure 10:
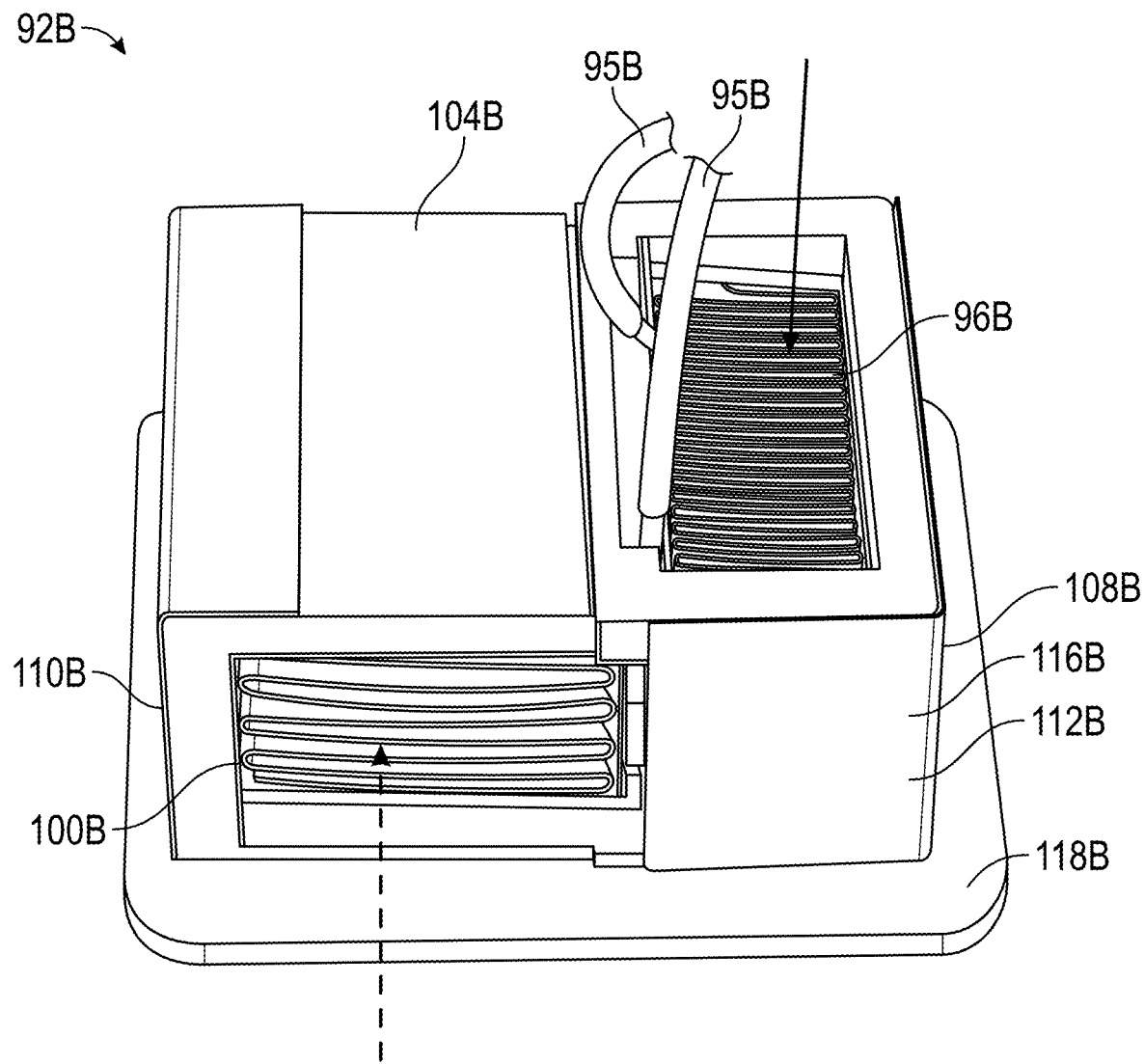
FIG. 10 is a bottom perspective view of the thermal module of FIG. 9.

FIGS. 8-10 illustrate another embodiment of a thermal module 92B having a main heat exchanger 96B and a waste heat exchanger 100B oriented such that the direction of flow through the heat exchangers 96B, 100B are oblique or substantially perpendicular. With reference first to FIG. 8, the internal components of the thermal module 92B are illustrated. As shown in the illustrated embodiment, the main heat exchanger 96B is positioned on a first side of a thermoelectric device (not shown) and the waste heat exchanger 100B is positioned on a second side of the thermoelectric device. Wiring 95B can be used to provide power to operate the thermoelectric device. Insulating material 103B can be included around both the main heat exchanger 96B and the waste heat exchange 100B to reduce heat transfer in undesired directions. Additional materials and/or layers can also be included, such as semi-permeable or impermeable layers, to reduce the likelihood of fluid leakage into undesired locations.

With reference to FIGS. 9 and 10, a thermal module 92B is illustrated disposed within a housing 116B. The housing 116B can include a flange 118B around a top side 106B of the thermal module 92B which can facilitate attachment of the thermal module 92B to the seat assembly 30. In some embodiments, the housing 116B can be made of a durable material to reduce the likelihood that the internal components of the thermal module 92B are damaged during use and/or assembly. In some embodiments, the housing 116B can be made of an insulating material to further reduce heat transfer in undesired directions.

In the illustrated embodiment, the thermal module 92B has a rectangular shape with a bottom side 104B, a top side 106B, a front side 108B, a rear side 110B, a left side 112B and a right side 114B. Fewer or greater number of sides can be used and the thermal module 92B can have any shape as desired. The main heat exchanger 96B can be oriented such that fluid flows into the main heat exchanger 96B through the bottom side 104B and conditioned fluid 97B exits from the opposite, top side 106B. The waste heat exchanger 100B can be oriented such that fluid flows into the waste heat exchanger 100B from the left side 112B and exits from the opposite, right side 114B. Accordingly, flow through the main side heat exchanger 96B can be generally orthogonal to flow through the waste heat exchanger 100B. In some embodiments, the direction of flow through the main heat exchanger 96B and the waste heat exchanger 100B can be less than 90 degrees. For example, flow through the main heat exchanger 96B and the waste heat exchanger 100B can be between about 10 degrees to about 80 degrees, between about 20 degrees to about 70 degrees, between about 30 degrees to about 60 degrees, between about 40 degrees to about 45 degrees, any subrange of angles within these ranges, or any angle within these ranges. This can advantageously allow for more compact packaging of the thermal module 92B. Moreover, although the illustrated embodiment illustrates the flow through the heat exchangers 96B, 100B as being linear, for example from the bottom side 104B to the top side 106B or from the left side 112B to the right side 114B, it is contemplated that the heat exchangers 96B, 100B can be designed to redirect the fluid through the thermal module 92B. For example, fluid can enter the heat exchanger, such as heat exchangers 96B, 100B, from the bottom side 104B and exit from the left side 112B.

Figure 11A:
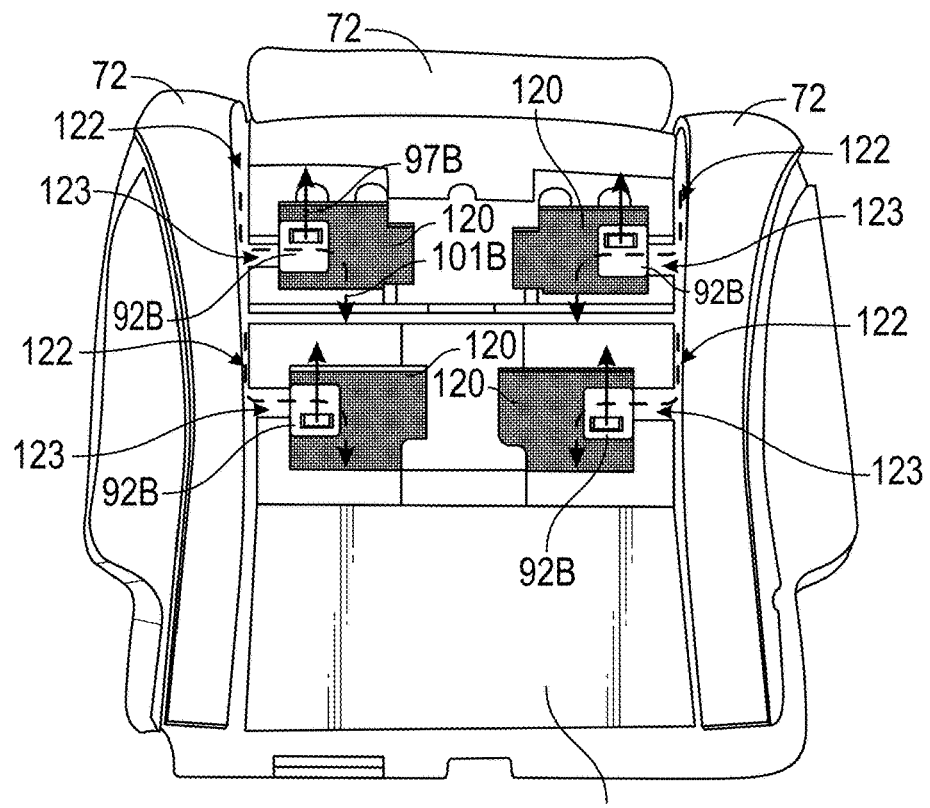
FIG. 11A is a top view of an embodiment of a seat assembly and climate control system having a first configuration of openings according to the present disclosure.
Figure 11B:
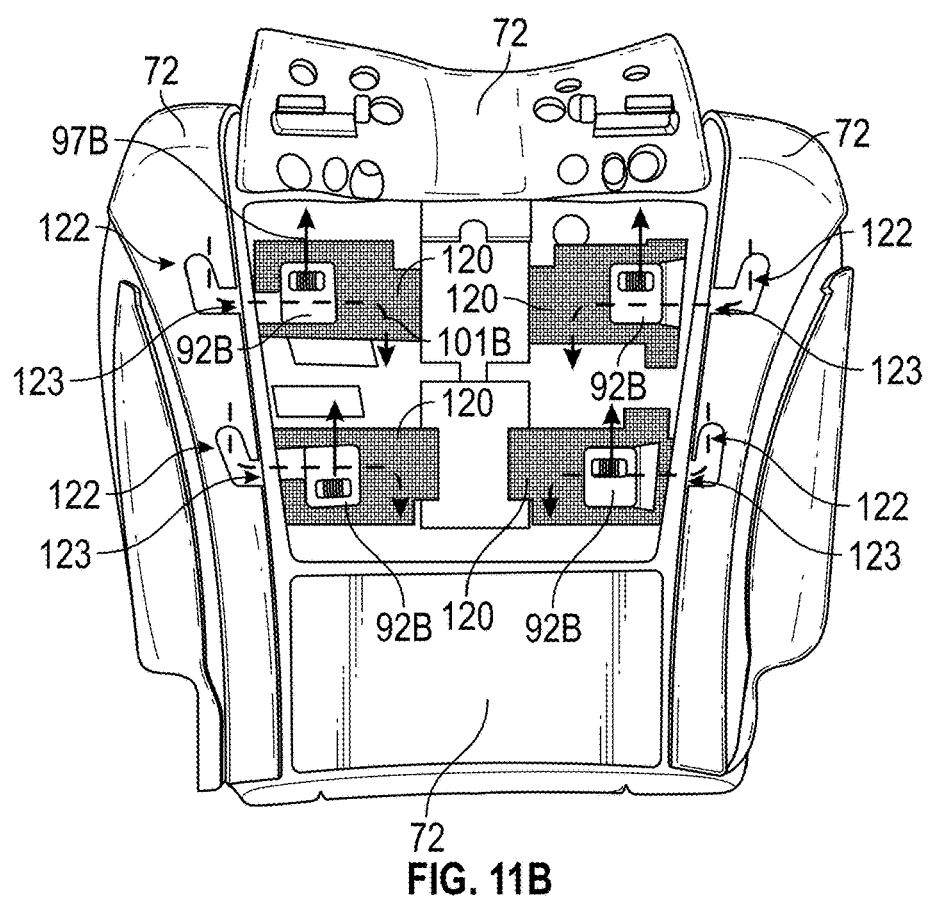
FIG. 11B is a top view of an embodiment of a seat assembly and climate control system having a second configuration of openings according to the present disclosure.
Figure 11C:
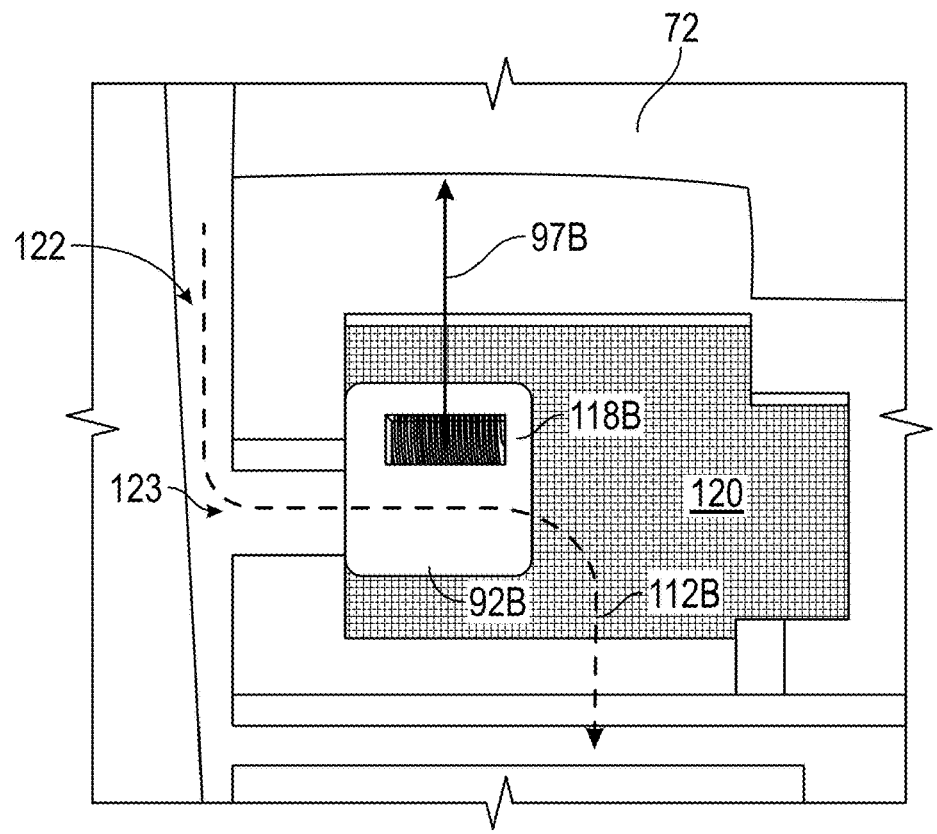
FIG. 11C is a close up view of a thermal module and seat assembly of FIG. 11A.

It should be appreciated that the embodiment described above with reference to FIGS. 8-10 can be used in other types of support assemblies and/or applications and need not be used in combination with the additional embodiments described herein FIGS. 11A-C illustrate another climate controlled seat assembly 30 with portions of cushion 72 and covering material 74 removed to expose the thermal modules 92B contained therein. While the embodiment is described with respect to the seat 32 and components of the seat 32, it should be understood that the system can also be applied to the backrest 34 and components of the backrest 34. In addition, as described above, this embodiment can also be used in other types of support assemblies and other cooling/heating applications. As shown in the illustrated embodiment, the thermal modules 92B can be distributed along the seat 32 at various locations. Any number of thermal modules 92B can be distributed along the seat 32. For example, the seat 32 can include one, two, three, four, five, six, seven, eight, nine, ten, or an even greater number of thermal modules 92B. Moreover, the thermal modules 92B can be distributed along the seat 32 in any pattern as desired. As shown in the illustrated embodiment, a first and second thermal module 92B are positioned along a front portion of the seat 32 whereas a third and fourth thermal module 92B are positioned rearward of the first and second thermal modules. In some embodiments, such as those illustrated in FIGS. 11A-C, an even number of thermal modules 92B can be used. In other embodiments, an odd number of thermal modules 92B can be used. Distribution of a plurality of thermal modules 92B along the seat 32 can advantageously enhance the control over temperature distribution across the top surface 50 of the seat 32. For example, one can program the thermal modules 92B such that certain areas of the seat 32 are heated or cooled to a lesser extent than other areas of the seat 32. Moreover, distribution of a plurality of thermal modules 92B can enhance the efficiency of thermal conditioning system. For example, due to the reduced distance from the point of cooling to the occupant, there are less thermal losses.

In some embodiments, the thermal modules 92B can be positioned proximate locations of the covering material 74 on which the occupant will likely be in contact, for example, the thigh area 42 of the seat 32. This can advantageously reduce the amount of ducting to direct the conditioned fluid 97B towards the occupant. By directing the conditioned fluid 97B towards the occupant, the effects of the conditioned fluid 97B will be more readily apparent to the occupant. This can beneficially reduce the total energy usage to achieve the same conditioning effect. As shown in the illustrated embodiment, the conditioned fluid 97B can be directed vertically towards the occupant whereas the fluid 101B for the waste heat exchanger 100B can be withdrawn from one or more openings 122 proximate the occupant into the channel 123.

As illustrated in FIG. 11A, in some embodiments, such openings 122 can be positioned along crevices of the seat 32. Such crevices can be between the thigh area 42 and the bolsters such as sides 69, 71 of the seat 32. Such crevices can be positioned closer to the occupant such that conditioned air 97B is more likely to be withdrawn into the opening 122 and exhausted. This can advantageously reduce the likelihood of stagnant, conditioned fluid 97B thus ensuring a fresh supply of conditioned fluid 97B to the occupant. In conditioning systems for the backrest 34, such crevices can be between the lumber region 60 and the bolsters such as sides 57, 59 of the backrest 34.

As illustrated in FIG. 11B, in some embodiments, such openings 122 can be positioned further outboard, such as along the bolsters of the seat 32 or backrest 34 as illustrated in FIG. 11B, or further outward towards the outer periphery of the bolsters. The opening 122 can be formed as a groove or channel cut into the cushion 72 to direct the withdrawn air towards channel 123 and into the thermal module 92B. Any shape of groove or channel can be used as desired. A longer groove can result in a greater area from which air is withdrawn whereas a shorter groove can result in more concentrated areas. In some embodiments, more than a single groove or channel can be directed towards a single thermal module 92B. The withdrawn fluid can then be directed away from the top surface 50 of the seat 32 or the front surface 48 of the backrest 34 such that the waste fluid has little to no effect on the conditioned seat assembly 30.

Figure 12A:
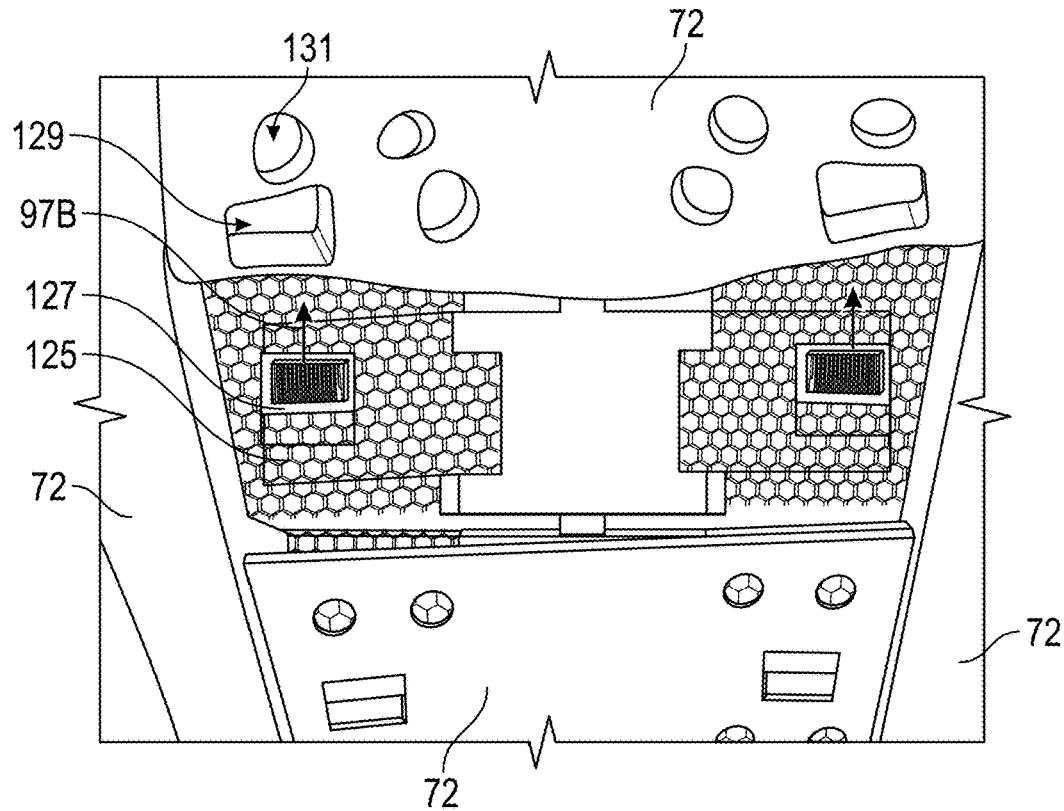
FIG. 12A is a top view of another embodiment of a seat assembly and climate control system according to the present disclosure.
Figure 12B:
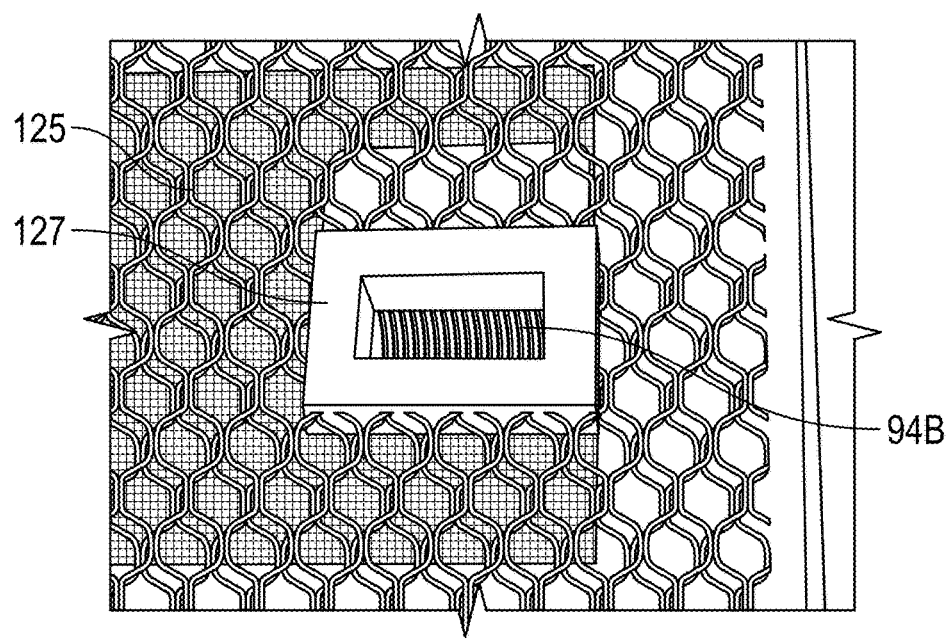
FIG. 12B close up view of a thermal module and seat assembly of FIG. 12A.
Figure 12C:
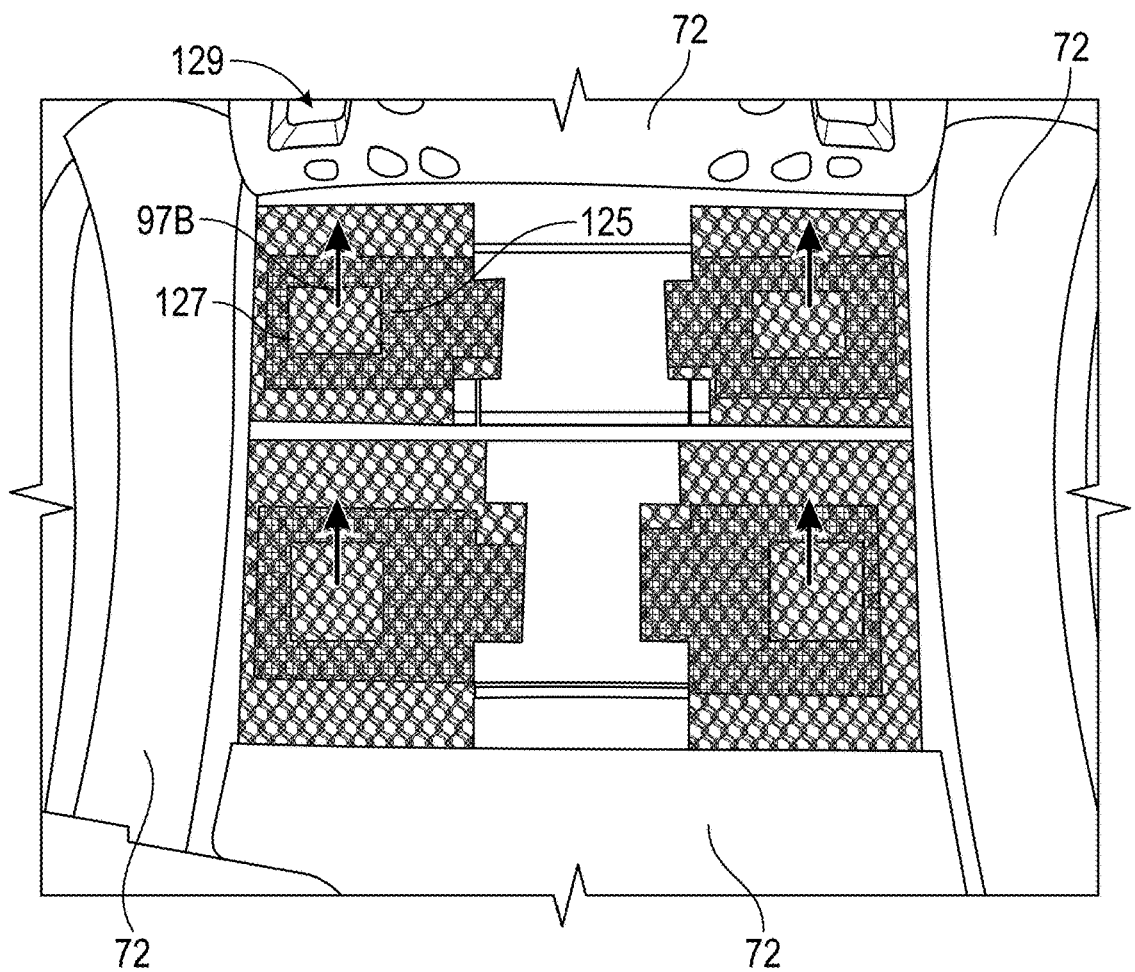
FIG. 12C is a top view of another embodiment of a seat assembly and climate control system according to the present disclosure.
Figure 12D:
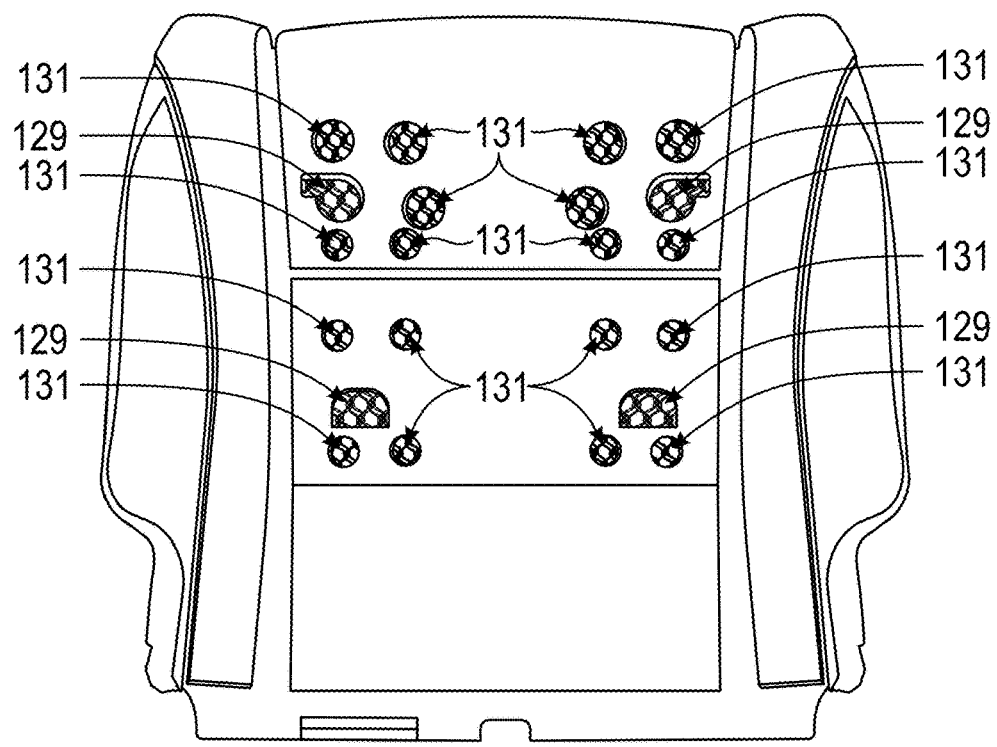
FIG. 12D is a top view of the embodiment of FIG. 12C with cushioning placed over the thermal modules.

It should be appreciated that the embodiment described above with reference to FIGS. 11A-C can be used in other types of support assemblies and/or applications and need not be used in combination with the additional embodiments described herein FIGS. 12A-C illustrate another embodiment of a climate controlled seat assembly 30 with portions of cushion 72 and covering material 74 removed to expose the thermal modules 92B contained therein. As illustrated in FIGS. 12A-C, in some embodiments, a spacer fabric 125 can be included between layer 120 and a component above layer 120. The spacer fabric 125 can be designed to maintain separation between the layer 120 and the component above the layer 120, such as cushion 72, such that a fluid chamber that can allow lateral and/or upward movement of fluid is formed between the layer 120 and the component. The spacer fabric or layer 125 can be formed of a variety of materials such as a honey-combed foam material, material with channels and passages formed therein, 3D spacer fabrics, mesh netting fabrics, spacing plates, etc. As an example, one preferred material is sold under the trade name 3MESH® and is commercially available from Mueller Textil GmbH, Germany or Mueller Textiles, Inc., Rhode Island, USA. Other preferred spacing devices and spacing plates are disclosed in U.S. Pat. No. 8,777,320, the entirety of which is incorporated by reference herein in its entirety.

In some embodiments, the opening from which the conditioned fluid 97B is expelled can include ducting 127. The ducting 127 can be attached to the flange 118B using, for example, an adhesive or other bonding agent to create a relatively leak-free seal at the connection between the flange 118B and the ducting 127. In some embodiments, ducting 127 can be made from a semi-impermeable or impermeable material such that a relatively leak-free seal is achieved. Moreover, the ducting 127 can be designed such that there is relatively little heat transfer from the conditioned fluid 97B to fluid contained in the chamber formed by the spacer fabric 125.

As illustrated in FIGS. 12A and 12B, the ducting 127 can extend from the flange 118B and beyond the spacer fabric 125 such that the conditioned fluid 97B can wholly bypass the chamber formed by the spacer fabric 125. As illustrated in FIG. 12C, in some embodiments, the ducting 127 can extend from the flange 118B and only partially into the spacer fabric 125 such that the conditioned fluid 97B can slightly mix with fluids contained in the chamber formed by the spacer fabric 125. The ducting 127 can be designed such that it directs the conditioned fluid 97B towards or into one or more holes, such as hole 129, in the cushioning 72 or any other component above the spacer fabric 125.

In some embodiments, the chamber formed by the spacer fabric 125 can be in fluid communication with one or more holes, such as holes 131, in the cushioning 72 or any other component above the spacer fabric 125. The chamber formed by the spacer fabric 125 can also be in fluid communication with the openings 122 and/or channel 123 such that fluid within the chamber can be withdrawn through the waste heat exchanger 100B and carried away from the conditioned surface such as top surface 50 of the seat 32. In some embodiments, the holes 131 can be positioned proximate the holes 129. This can be advantageous in ensuring a constant stream of freshly conditioned fluid 97B adjacent the conditioned surface. Of course, the holes 131 can be positioned further from the holes 129 to reduce recycling of conditioned fluid 97B.

It should be appreciated that the embodiment described above with reference to FIGS. 12A-D can be used in other types of support assemblies and/or applications and need not be used in combination with the additional embodiments described herein. With reference now to FIG. 13, in order to reduce mixing of the conditioned fluid 97B and the waste fluid 101B, flange 118B of the thermal module 92B can be placed over a layer 120 thereby forming a waste chamber 124 and a conditioned chamber 126. The flange 118B can be attached to the layer 120 such that a relatively leak-free seal between the flange 118B and layer 120 is achieved. The layer 120 can be a semi-permeable or impermeable layer to reduce the transfer of fluids from the waste chamber 124 to the conditioned chamber 126. Layer 120 can also be an insulating layer to reduce heat transfer across the layer 120 and thus reduce the heat transfer between the waste chamber 124 and the conditioned chamber 126.

The conditioned chamber 124 can be placed in fluidic communication with another layer, such as a cushion 72 and/or distribution layer 86B. A distribution layer 86B can advantageously further distribute the conditioned fluid 97B from the conditioned chamber 124 across the covering 74 thereby reducing the likelihood of significant temperature differentials across the covering 74. Although the embodiment illustrated in FIG. 13 includes a single distribution layer 86B, it should be understood that each conditioned chamber 126 can have its own distribution layer 86B which can be fluidically separated from distribution layers of other conditioned chambers 126. This can be advantageous if one does not desire conditioned fluid 97B from one chamber 126 to mix with conditioned fluid 97B from another chamber 126. This may be particularly beneficial, for example, when different temperatures are desired across different areas of the seat surface. In some embodiments, one or more of the conditioned chambers 126 can be fluidically coupled to one or more fluid distribution components 128. The fluid distribution component 128, such as a plenum or bag 130 (as shown in FIG. 14), can be used to distribute fluid to one or more main heat exchangers 96B. This can advantageously reduce the number of pumping devices 102B used in the system. For example, in some embodiments, a single pumping device 102B can be used for a plurality of thermal modules 92B. In some embodiments, the fluid distribution component 128 can be positioned opposite the occupant. For example, the fluid distribution component 128 can be positioned under the seat 32 opposite the top surface 50 or behind backrest 34 opposite the front surface 48.

Figure 15:
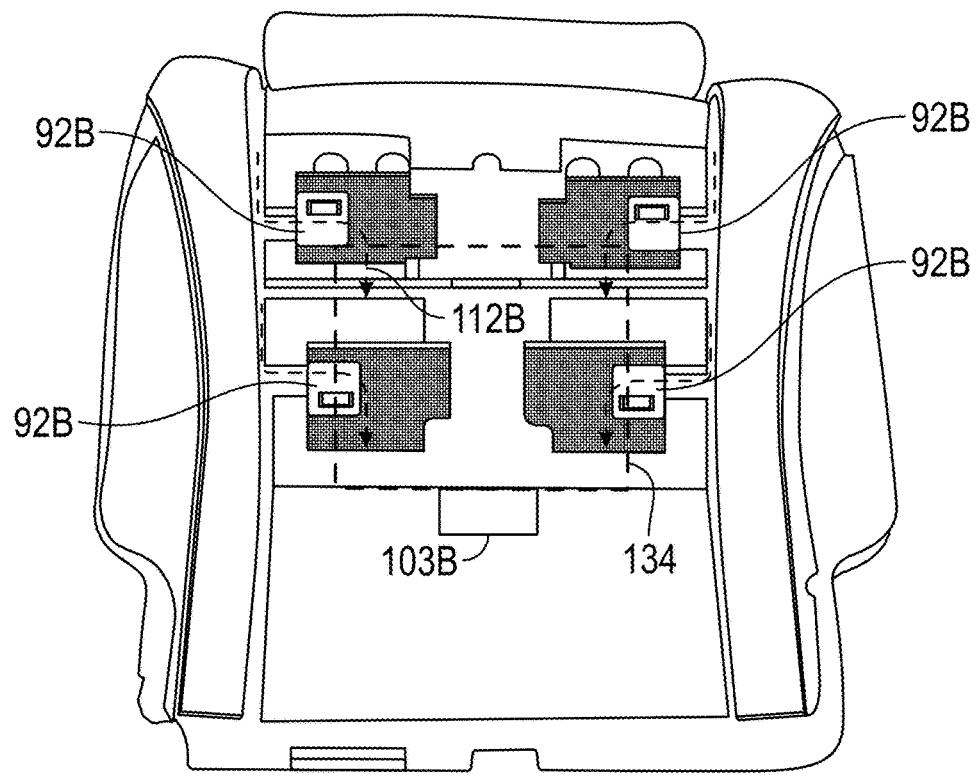
FIG. 15 is a top view of an embodiment of a seat assembly and climate control system having another embodiment of a fluid distribution unit according to the present disclosure.
Figure 16:
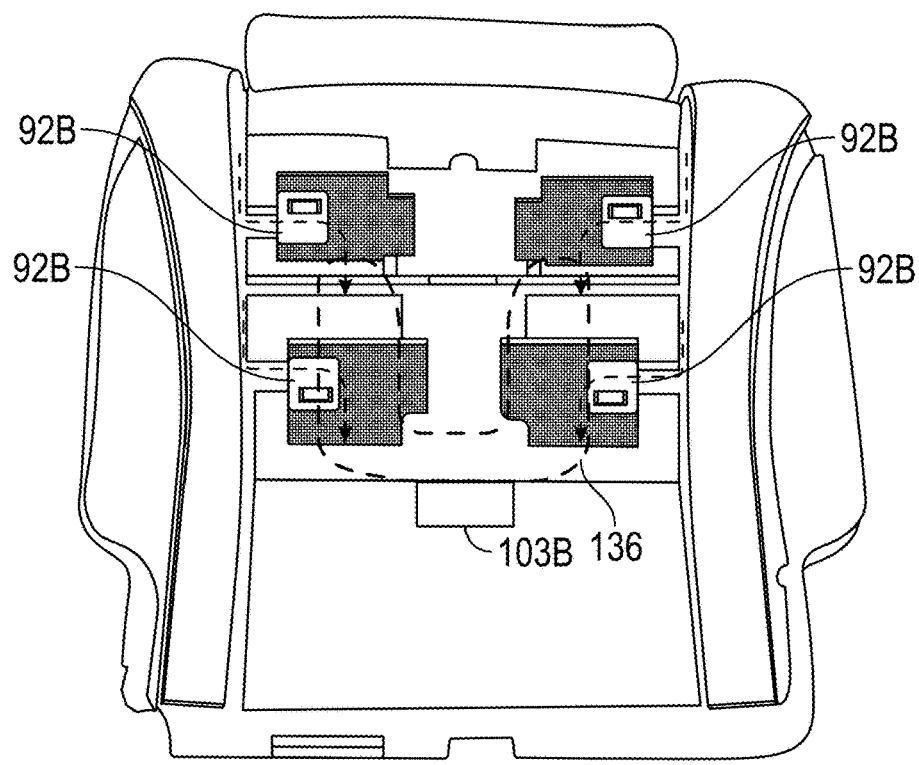
FIG. 16 is a top view of an embodiment of a seat assembly and climate control system having another embodiment of a fluid distribution unit according to the present disclosure.

The waste chamber 124 can be in fluid communication with openings 122 and channel 123. The fluid withdrawn from the openings 122 can be used for heat transfer to the waste heat exchanger 100B. Similar to conditioned chambers 126, in some embodiments the one or more of the waste chambers 124 can be fluidically coupled to one or more fluid distribution component 132. Fluid distribution component 132 can be used to collect and withdraw fluid from one or more waste heat exchangers 100B. In some embodiments, fluid distribution component 132 can be a collection bag 134 (as shown in FIG. 15) or a plenum 136 (as shown in FIG. 16). This can advantageously reduce the number of pumping devices 103B used in the system. For example, in some embodiments, a single pumping device 103B can be used. In some embodiments, the fluid distribution component 132 can be positioned opposite the occupant. For example, the fluid distribution component 132 can be positioned under the seat 32 opposite the top surface 50 or behind backrest 34 opposite the front surface 48.

Figure 17:
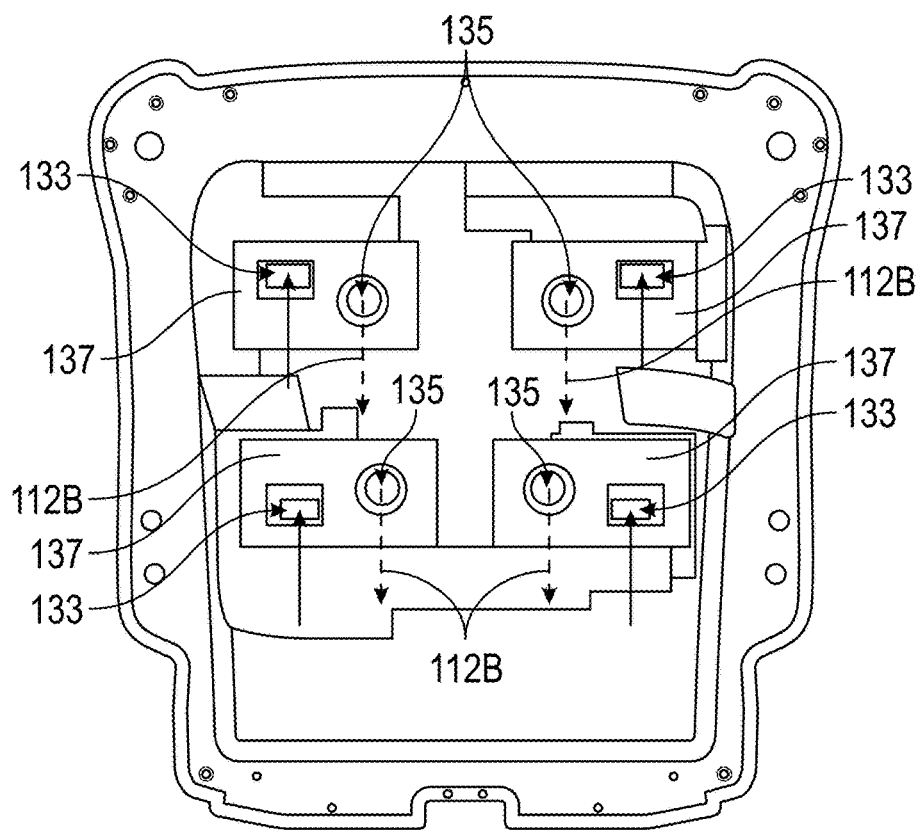
FIG. 17 is a bottom view of an embodiment of a seat assembly and climate control system according to the present disclosure.

It should be appreciated that the embodiment described above with reference to FIGS. 13 and/or 14-16 can be used in other types of support assemblies and/or applications and need not be used in combination with the additional embodiments described herein With reference now to FIG. 17, an embodiment of a bottom side of the seat 32 is illustrated showing a configuration of holes 133 through which fluid to be conditioned, via main heat exchanger 94B can be received for delivery to the conditioned surface and holes 135 through which waste fluid 112b can be expelled away from the conditioned surface. As shown in the illustrated embodiment, the bottom portion of the seat can include one or more gaskets 137 positioned around the holes 133, 135. The gasket 137 can interface with a corresponding surface on another component to provide an additional seal and reduce leakage in undesired directions. In some embodiments, the gasket 137 can be made from a foam, a rubber, or any material as desired.

Figure 18:
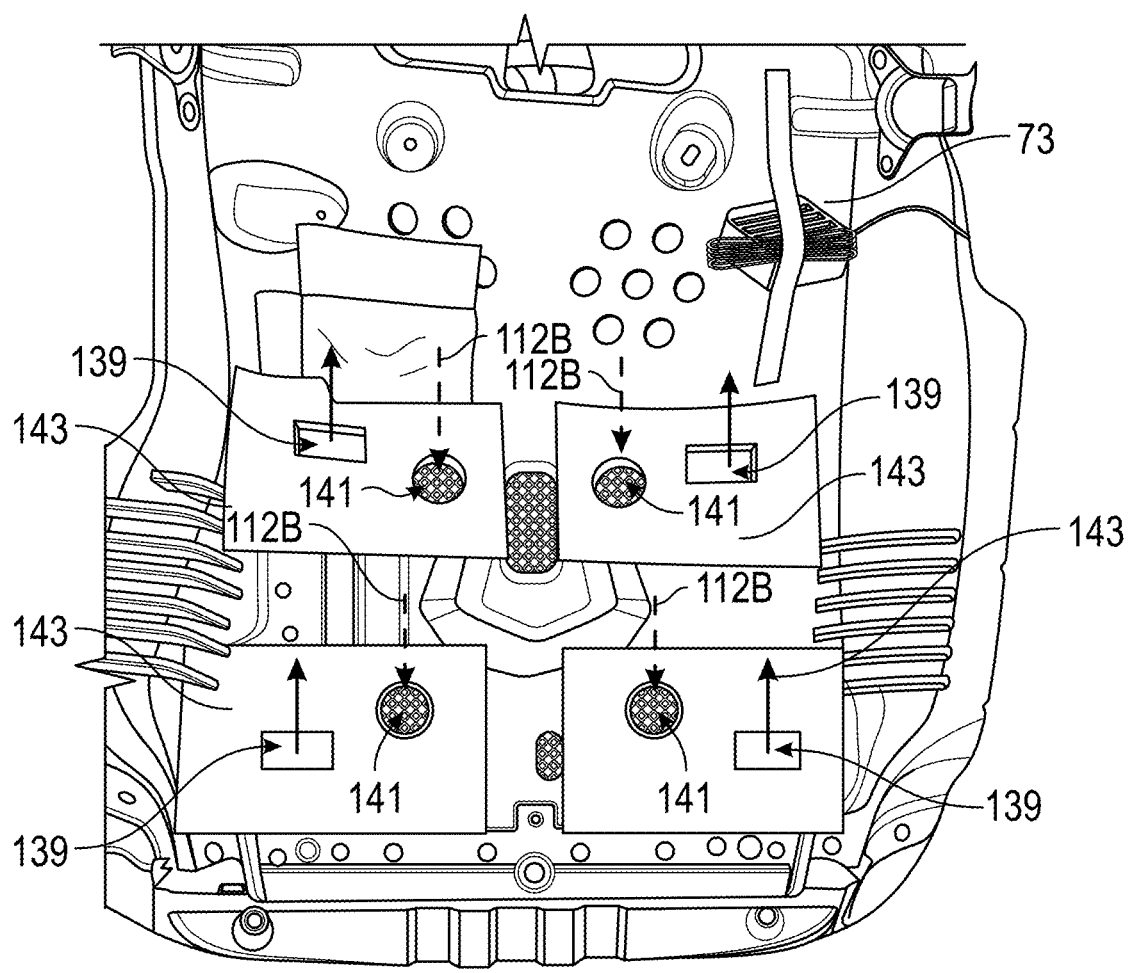
FIG. 18 is a top view of an embodiment of a seat frame according to the present disclosure.

With reference now to FIG. 18, a top side of a frame 73 for a seat assembly 30 is illustrated showing a configuration of holes 139 through which fluid to be conditioned, via main heat exchanger 94B can be received for delivery to the conditioned and holes 141 through which waste fluid 112b can be expelled away from the conditioned surface. In some embodiments, holes 133 can be in fluid communication with holes 139 and holes 135 can be in fluid communication with holes 141. As shown in the illustrated embodiment, the top side of the frame 73 can include one or more gaskets 143 positioned around the holes 139, 141. The gasket 141 can interface with a corresponding surface, such as gasket 137, to provide an additional seal and reduce leakage in undesired directions. In some embodiments, the gasket 141 can be made from a foam, a rubber, or any material as desired.

Figure 19A:
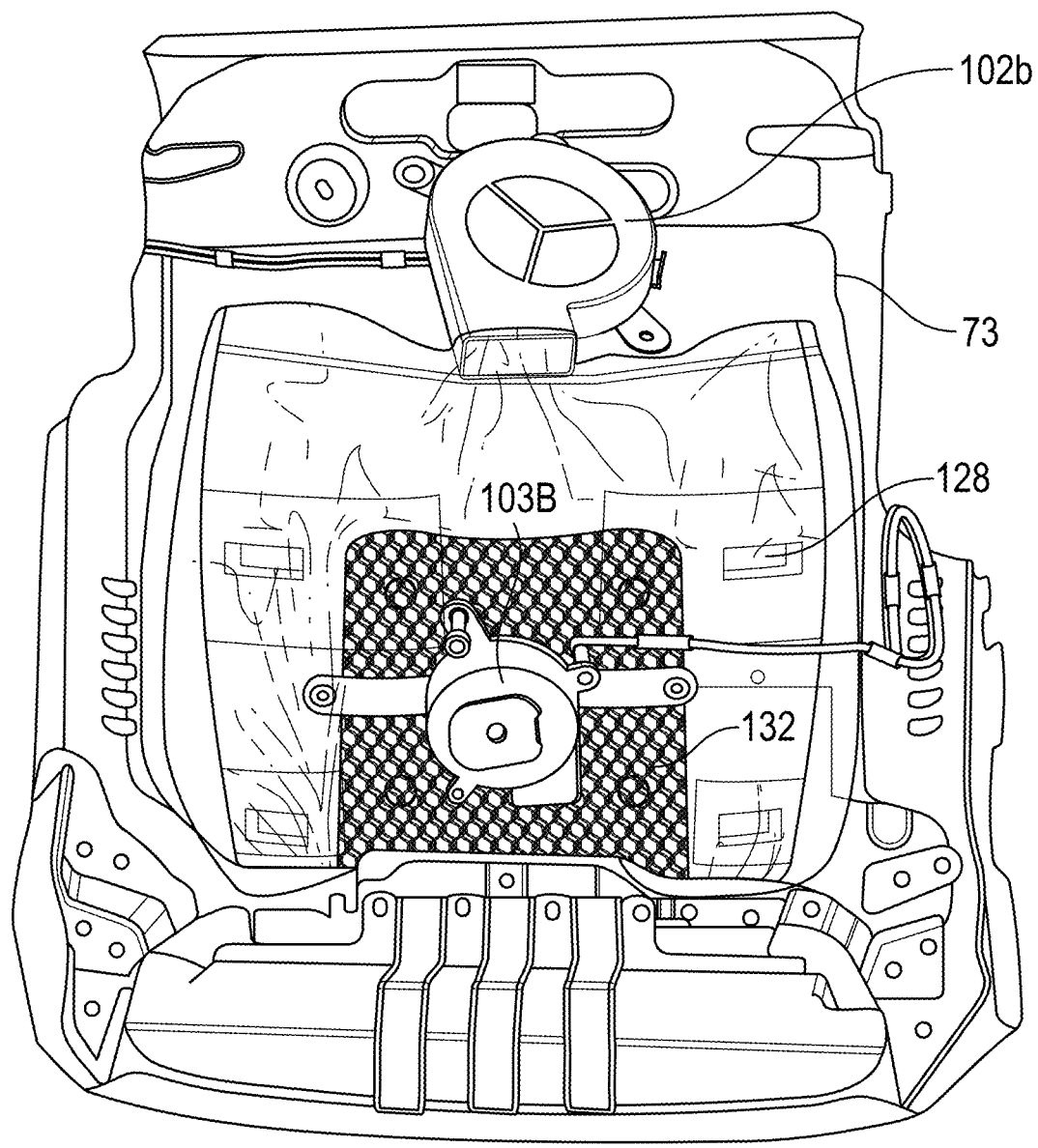
FIG. 19A is a bottom view of an embodiment of a seat frame having an integrally formed first fluid distribution component and second fluid distribution component according to the present disclosure.
Figure 19B:
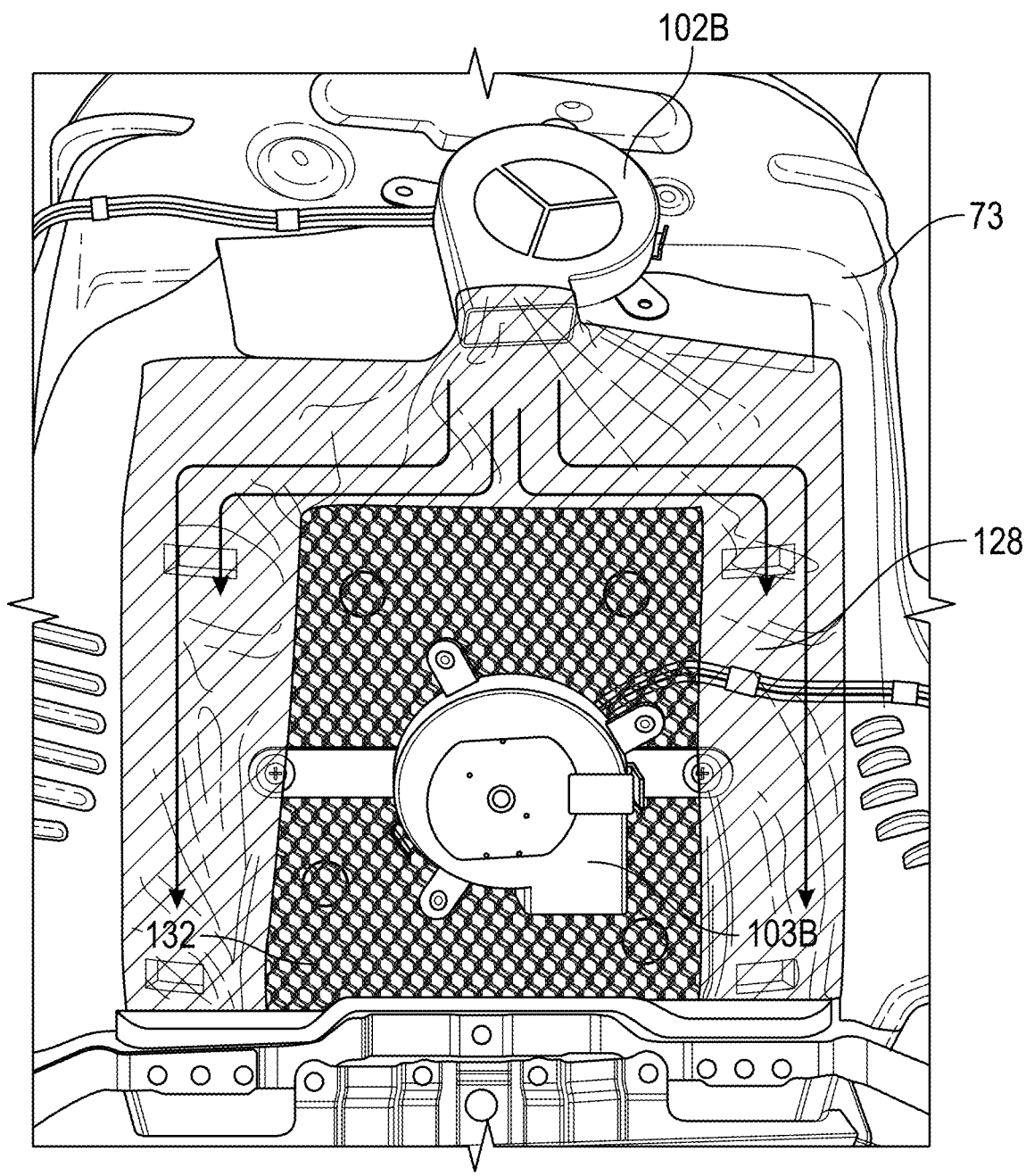
FIG. 19B is a bottom view of the seat frame of FIG. 19A highlighting the first fluid distribution component.
Figure 19C:
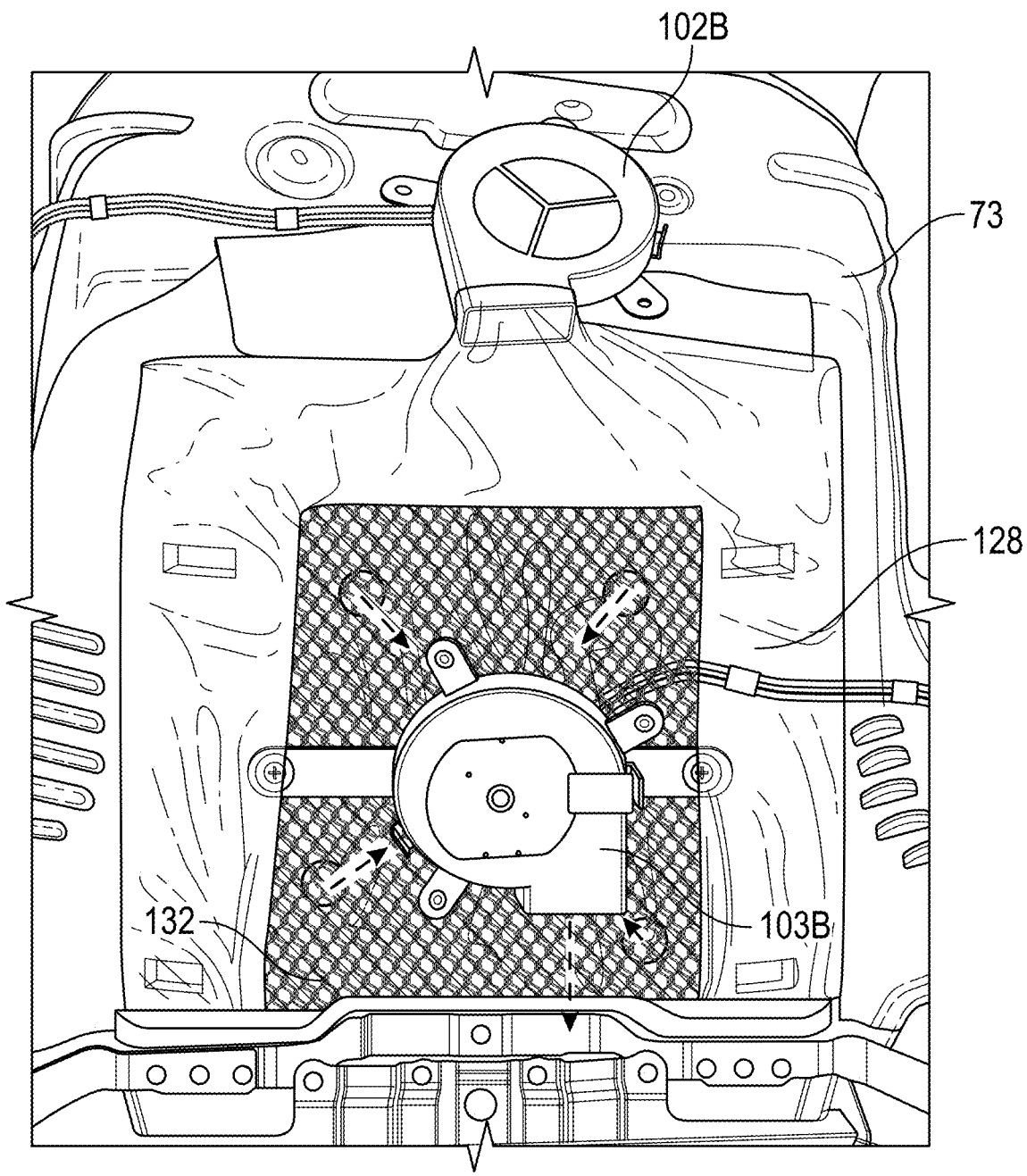
FIG. 19C is a bottom view of the seat frame of FIG. 19A highlighting the second fluid distribution component.

With reference now to FIGS. 19A-C, a bottom side of the frame 73 is illustrated which includes both a fluid distribution component 128 for the main heat exchanger 94B and a fluid distribution component 132 for the waste heat exchanger 134. As shown in the illustrated embodiment, the fluid distribution components 128, 132 are integrally formed as a single bag with the fluid distribution components 128, 132 being separated via seams or welds. As shown more clearly in FIG. 19B, the pumping device 102B can direct fluid into the fluid distribution component 128 and the pumping device 103B can direct waste fluid out of the fluid distribution component 132. The fluid distribution component 128 can be in fluid communication with holes 139 while the fluid distribution component 132 can be in fluid communication with holes 141. To reduce the likelihood that the fluid distribution component 132 collapses due to negative pressure, a structural member can be included within the fluid distribution component 132. In some embodiments, the structure member can be similar to the spacer fabric 125. In some embodiments, the fluid distribution component 132 and/or fluid distribution component 128 can be manufactured from a rigid material. This can reduce the potential of damage to the fluid distribution components 128, 132. Moreover, this can reduce the likelihood that fluid distribution component 132 collapses as a result of negative pressure.

Figure 20A:
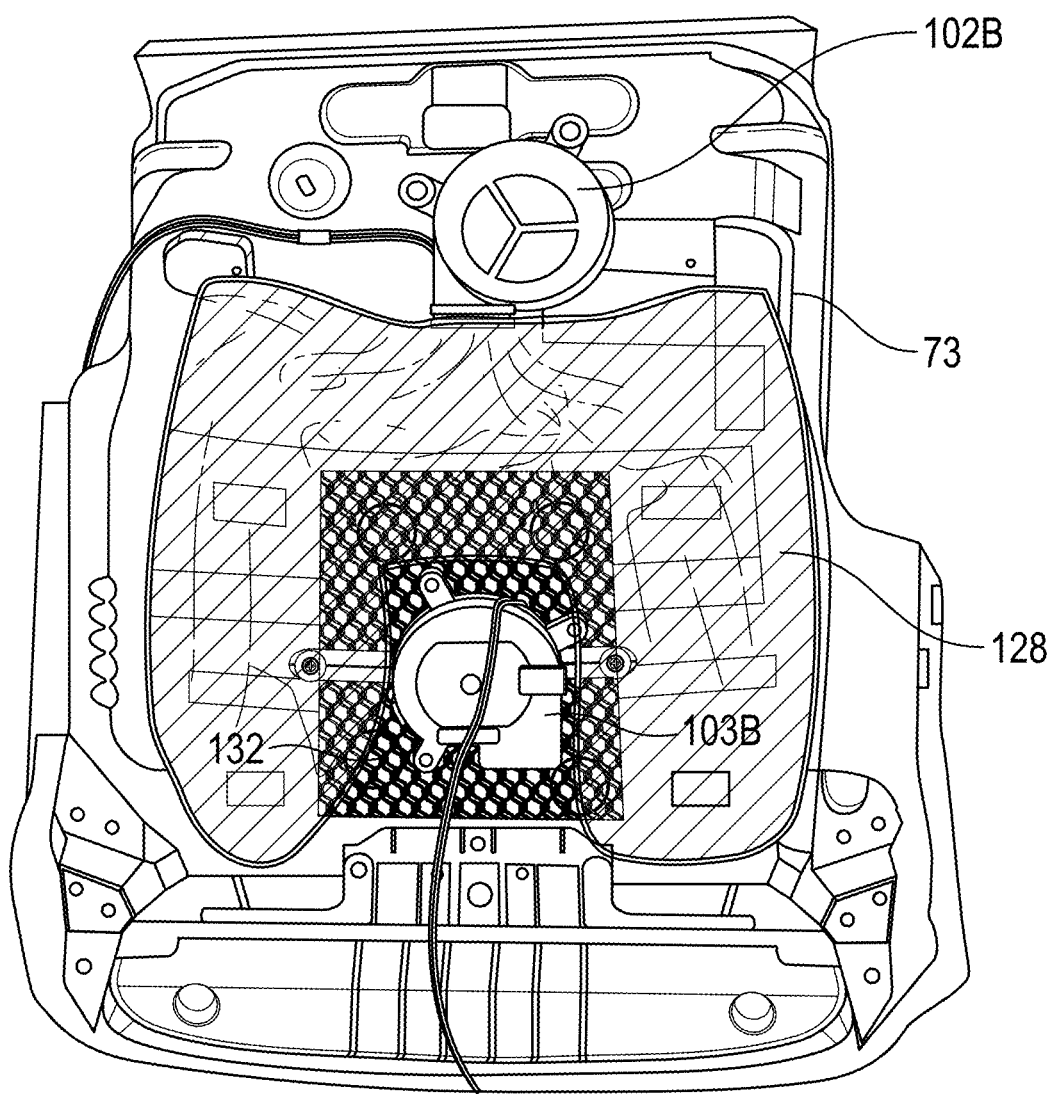
FIG. 20A is a bottom view of an embodiment of a seat frame having a separately formed first fluid distribution component and second fluid distribution component according to the present disclosure with the first fluid distribution component highlighted.
Figure 20B:
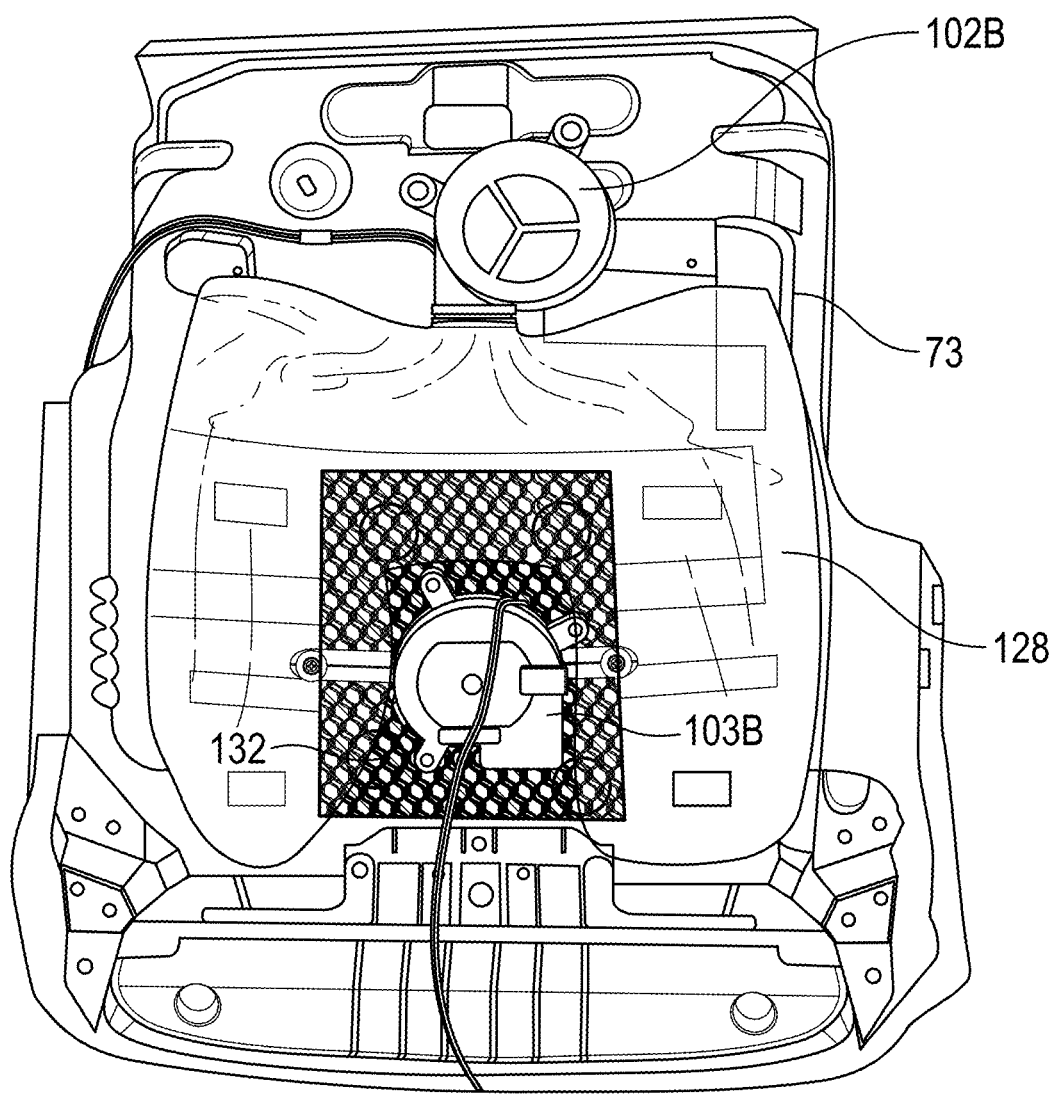
FIG. 20B is a bottom view of the seat frame of FIG. 20A highlighting the second fluid distribution component.

With reference now to FIGS. 20A and 20B, a bottom side of the frame 73 is illustrated which includes both a fluid distribution component 128 for the main heat exchanger 94B and a fluid distribution component 132 for the waste heat exchanger 134. As shown in the illustrated embodiment, the fluid distribution components 128, 132 are separately formed as two bags with the fluid distribution components.

Such an embodiment can be beneficial to reduce the likelihood of leakage from the fluid distribution component 132 to the fluid distribution component 128 or vice versa. The pumping device 102B can direct fluid into the fluid distribution component 128 and the pumping device 103B can direct waste fluid out of the fluid distribution component 132. The fluid distribution component 128 can be in fluid communication with holes 139 while the fluid distribution component 132 can be in fluid communication with holes 141. To reduce the likelihood that the fluid distribution component 132 collapses due to negative pressure, a structural member can be included within the fluid distribution component 132. In some embodiments, the structure member can be similar to the spacer fabric 125. As shown in the illustrated embodiment, there can be some overlap between the two fluid distribution components 128, 132.

Figure 21:
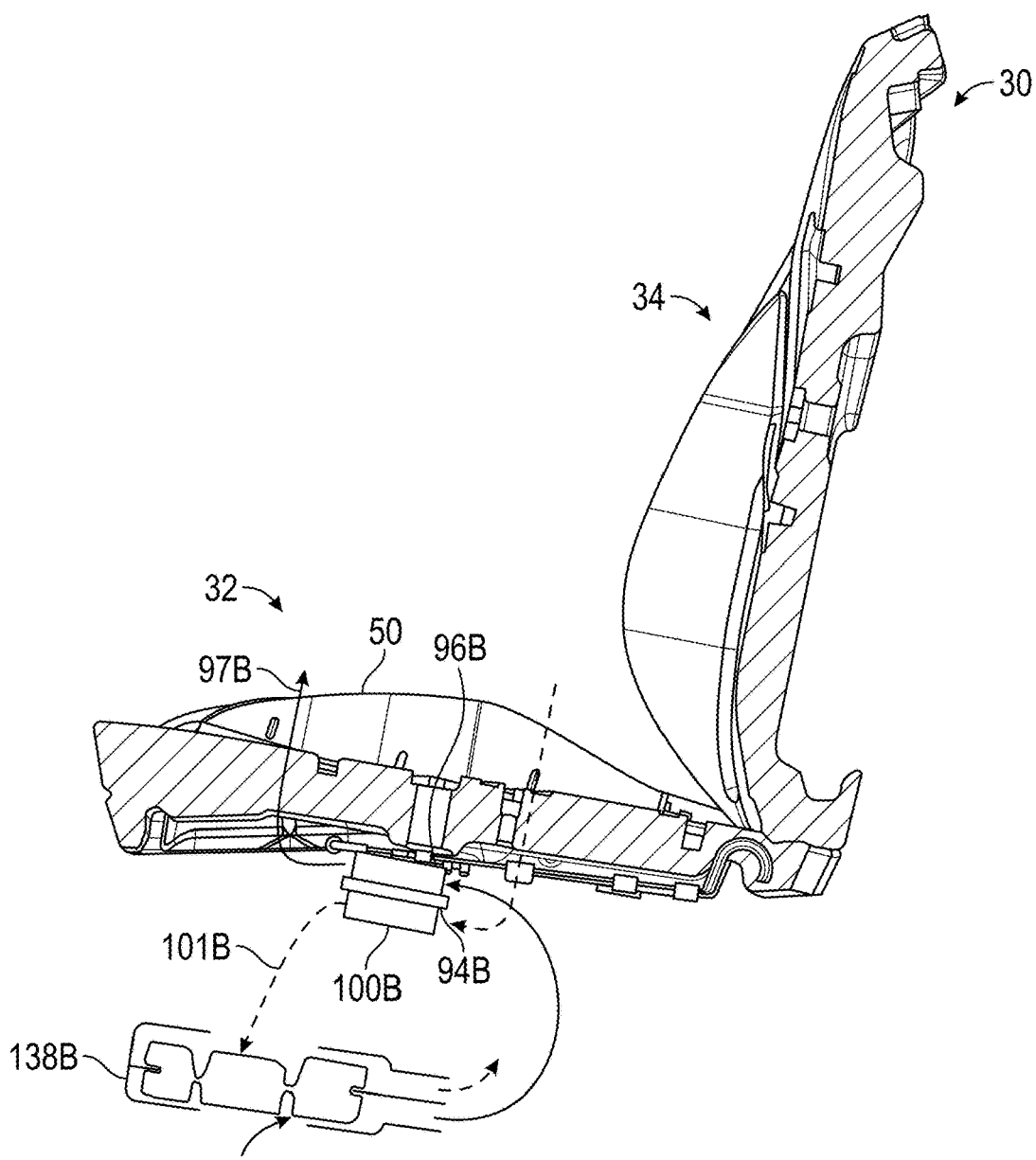
FIG. 21 is a schematic illustration of an embodiment of a vehicle seat assembly and climate control system with a dual-mode pumping device according to the present disclosure.

It should be appreciated that the embodiment described above with reference to FIGS. 17-20B can be used in other types of support assemblies and/or applications and need not be used in combination with the additional embodiments described herein With reference now to FIG. 21, a schematic view of an embodiment of a climate controlled seat assembly 30 is illustrated in which fluid flow through both the main heat exchanger 96B and the waste heat exchanger 100B attached to the thermoelectric device 94B occurs via one or more dual-mode pumping device 138B. While the embodiment is described with respect to the seat 32 and components of the seat 32, it should be understood that the system can also be applied to the backrest 34 and components of the backrest 34. In the illustrated embodiment, the dual-mode pumping device 138B can be designed to simultaneously push air towards main heat exchanger 96B and pull air through waste heat exchanger 100B. With respect to the main heat exchanger 96B, the dual-mode pumping device 138B can direct fluid, such as air, from a location that is spaced from the surface being conditioned (e.g., cooled and/or heated) and/or supporting the occupant such that a majority of the fluid has not been immediately conditioned by the thermal module 92B. The dual-mode pumping device 138B can direct such fluid through a conduit, such as ducting 98B, towards the main heat exchanger 96B. The conditioned fluid 97B from the main heat exchanger 96B can then be directed via a conduit, such as seat distribution system 76B, towards the surface to be cooled or heated. With respect to the waste heat exchanger 100B, the pumping device 103B can direct fluid, such as air, from a location proximate the surface being cooled or heated through a conduit towards the waste heat exchanger 100B where the waste fluid 101B can then be exhausted to the surrounding atmosphere.

Figure 22:
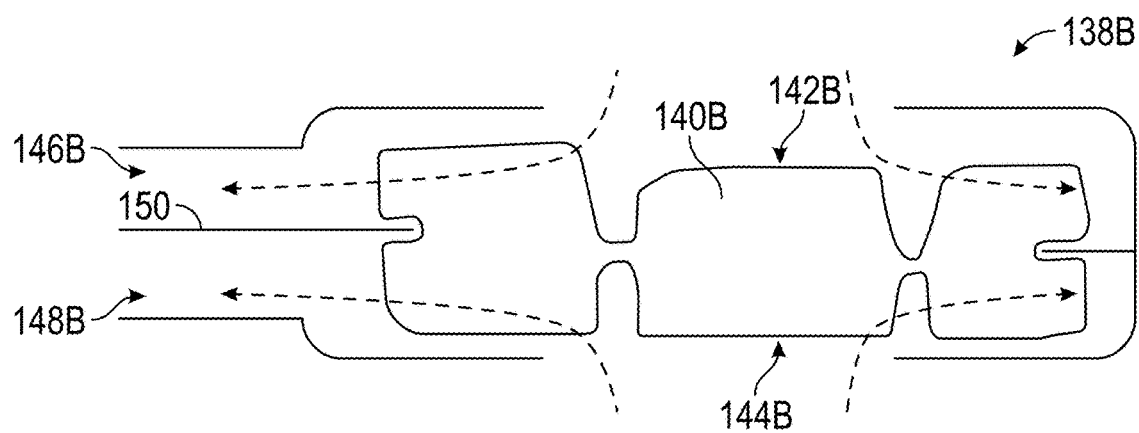
FIG. 22 is a schematic illustration of an embodiment of a dual-mode pumping device according to the present disclosure.

As illustrated in FIG. 22, the dual-mode pumping device 138B can have one or more rotors 140B having a plurality of fins, such as an impeller, for creating a fluid flow through the pumping device 138B. The rotor 140B can be powered by a single motor although a greater number of motors can be used. The impeller 140B can pull fluid, such as air, through a first inlet 142B and a second inlet 144B and expel the fluid through a first outlet 146B and a second outlet 148B. The first inlet 142B and first outlet 146B can be separated from the second inlet 144B and second outlet 148B via a component such as a plate 150. Preferably, the plate is positioned about the impeller such that a generally leak-free seal is achieved to reduce the likelihood of mixing of fluids thereby reducing efficiency of the system.

When used in conjunction with the system described in FIG. 21, the second inlet 144B can pull fluid from the surrounding area and expel said fluid, via the second outlet 148B, into the main heat exchanger 96B whereas the first inlet 142B can pull waste fluid 101B from the waste heat exchanger 100B and expel the waste fluid 101B, via the first outlet 146B, to the surrounding area. In order to reduce the likelihood that a significant amount of waste fluid 101B is reintroduced into the system via second inlet 144B, it can be advantageous to increase the distance between the second inlet 144B and the first outlet 146B or include a shroud around the second inlet 144B and/or first outlet 146B.

It should be appreciated that the embodiment described above with reference to FIGS. 21-22 can be used in other types of support assemblies and/or applications and need not be used in combination with the additional embodiments described herein.

Figure 23:
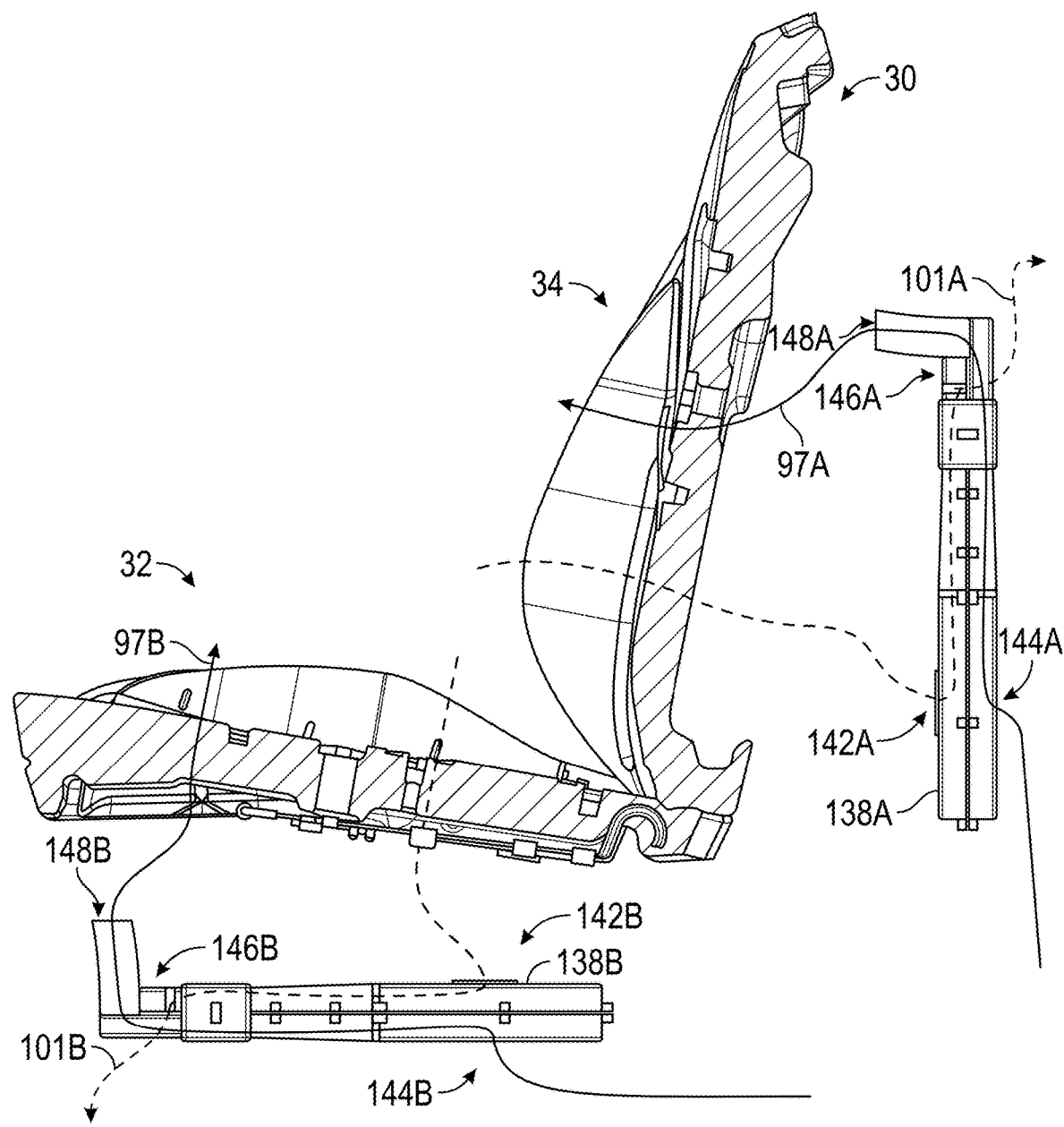
FIG. 23 is a schematic illustration of another embodiment of a vehicle seat assembly and climate control system with a dual-mode pumping device according to the present disclosure.
Figure 24:
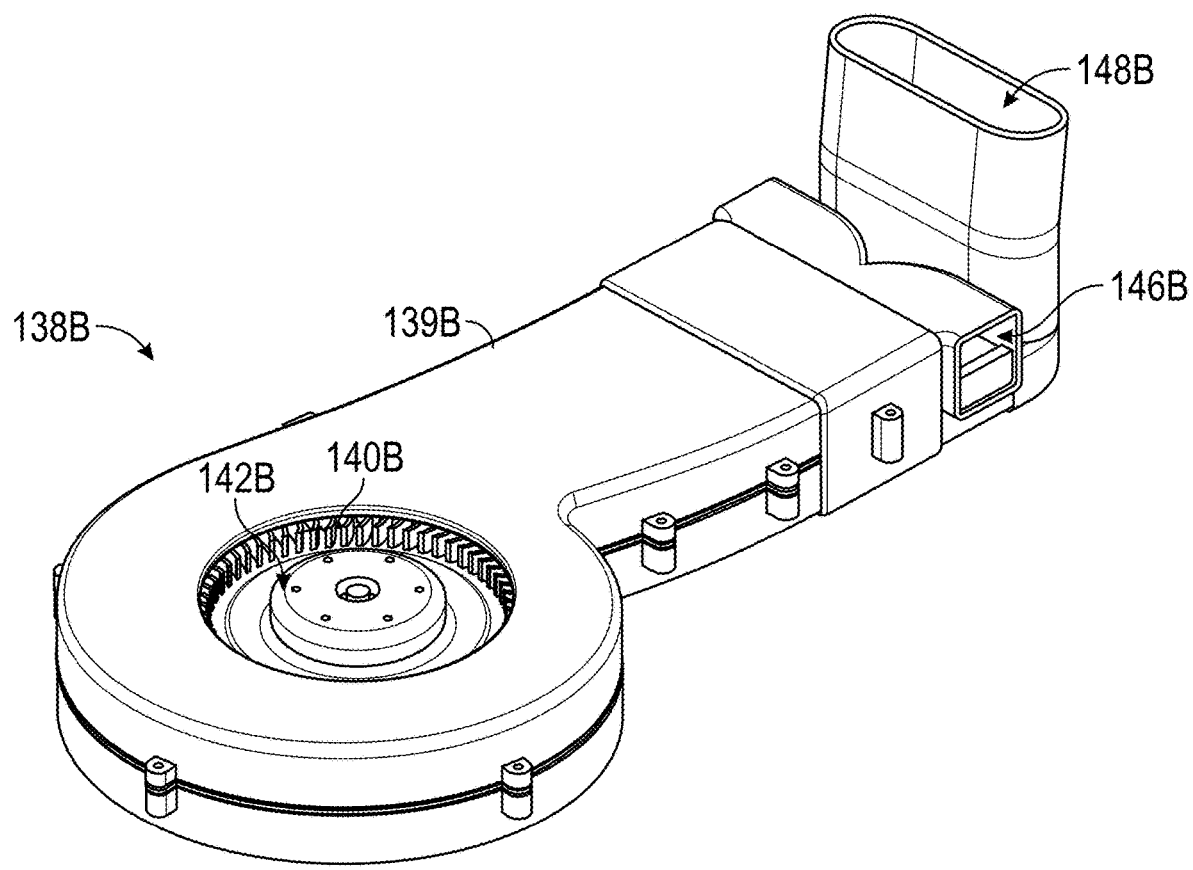
FIG. 24 is a perspective view of an embodiment of a dual-mode pumping device according to the present disclosure.
Figure 25:
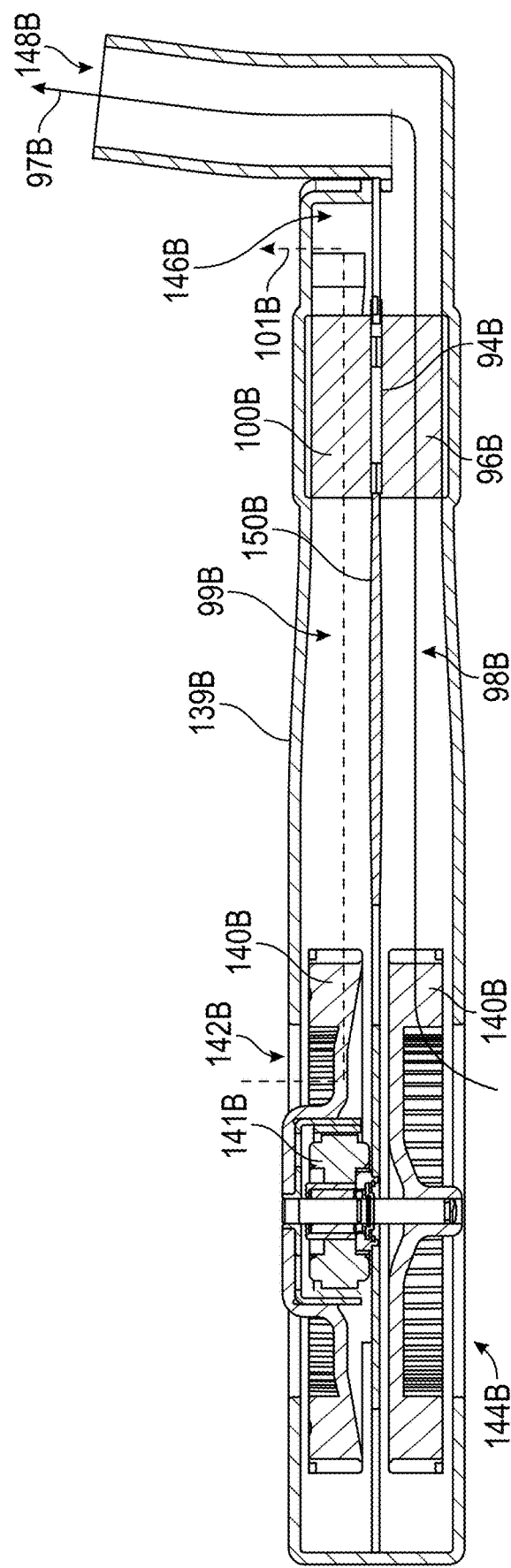
FIG. 25 is a side, cross-sectional view of the dual-mode pumping device of FIG. 24.
Figure 26:
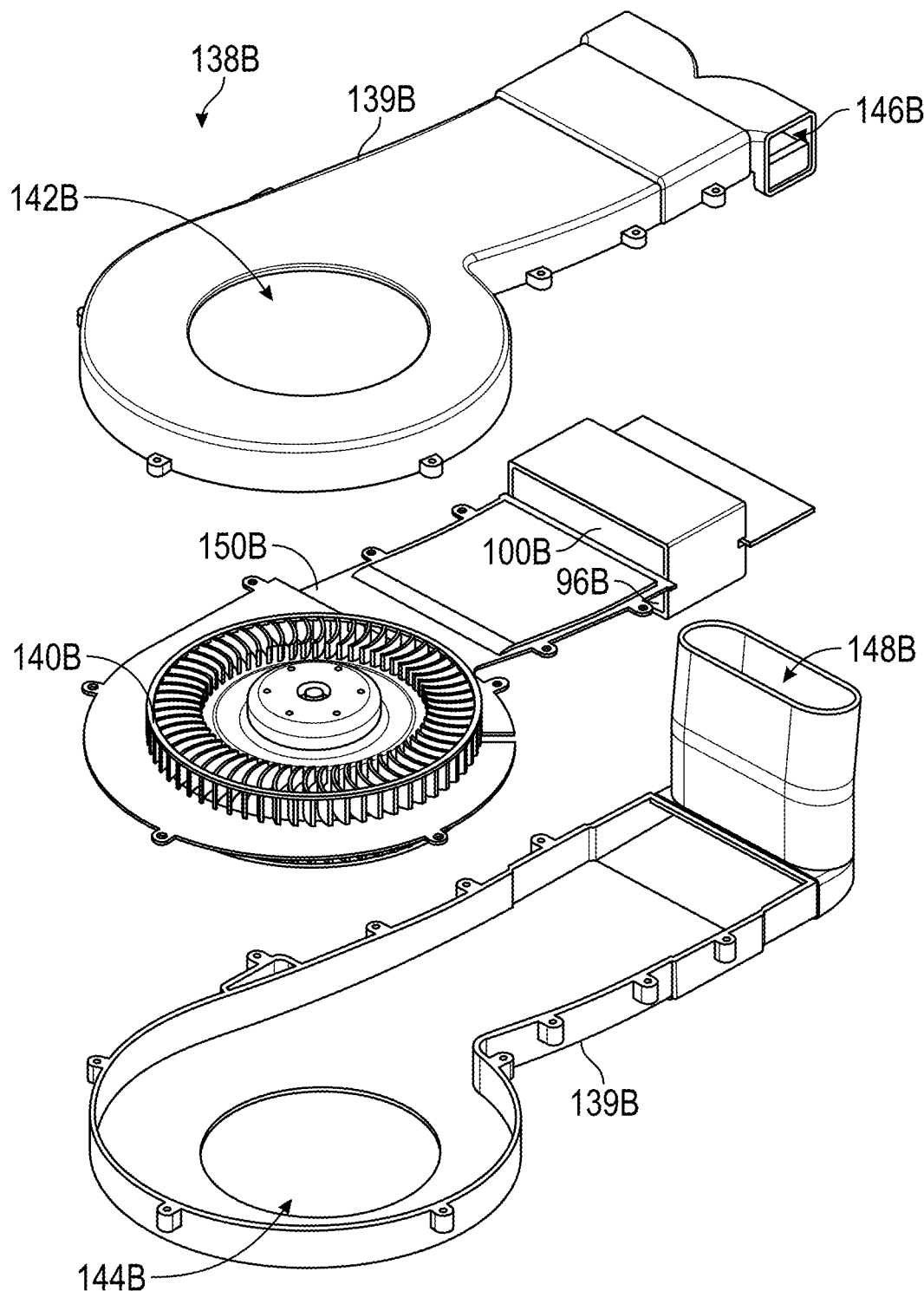
FIG. 26 is a top, exploded view of the dual-mode pumping device of FIG. 24.
Figure 27:
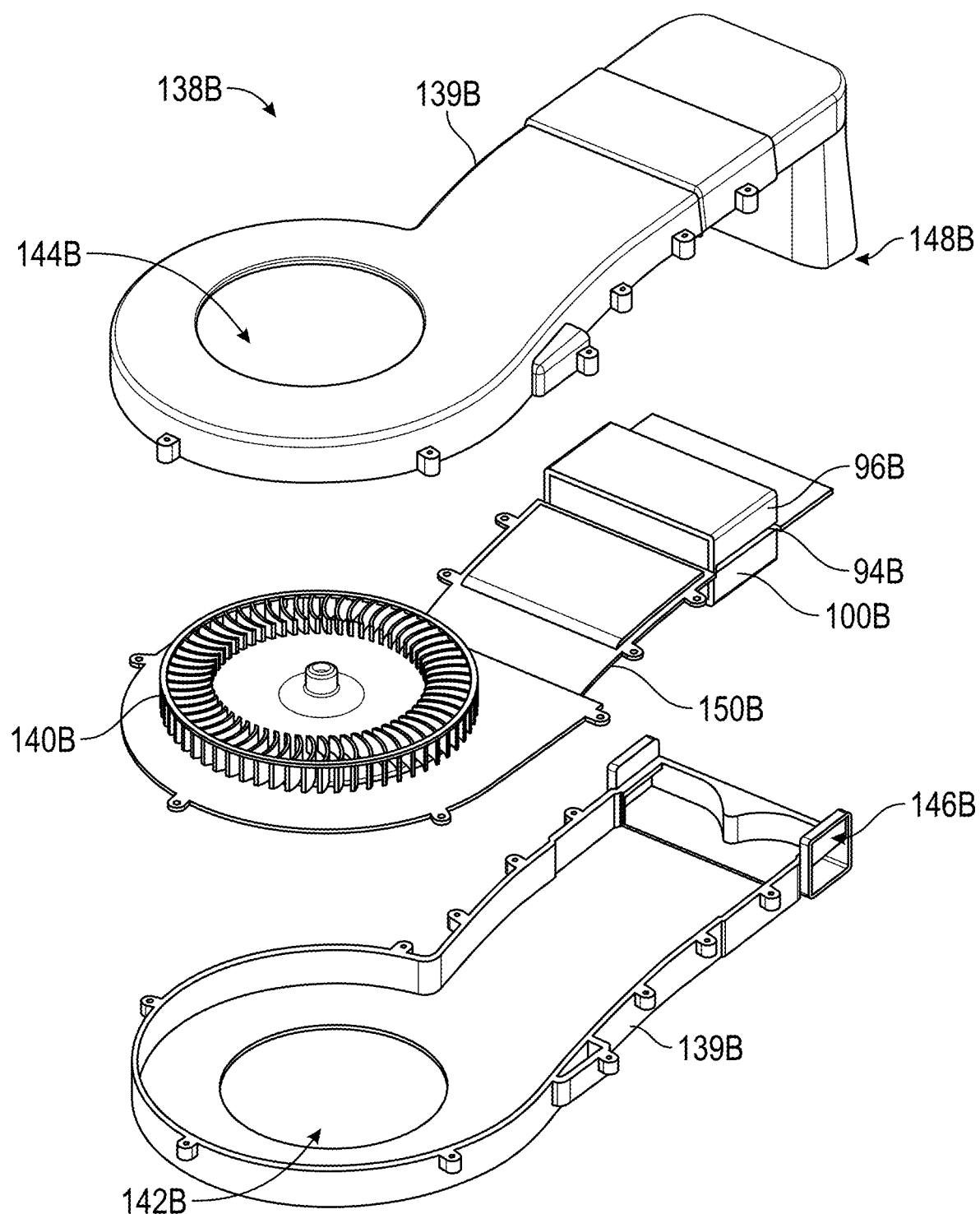
FIG. 27 is a bottom, exploded view of the dual-mode pumping device of FIG. 24.

With reference now to FIG. 23, a schematic view of an embodiment of a climate controlled seat assembly 30 is illustrated in which climate control systems are provided for both the seat 32 and the backrest 34. As shown in the illustrated embodiment, a first dual-mode pumping device 138B controls fluid flow through the seat 32 and a second dual-mode pumping device 138A controls fluid flow through the backrest 34. In the illustrated embodiment, the dual-mode pumping devices 138A, 138B can be designed to simultaneously push air towards main heat exchanger attached to a thermoelectric module and pull air through a waste heat exchanger attached to the thermoelectric module. As will be discussed in further detail in connection with FIGS. 24-27, the dual-mode pumping devices 138A, 138B can be a self-contained unit having one or more thermoelectric modules, one or more main heat exchangers, and/or one or more waste heat exchangers contained therein. This can beneficially improve packaging of the components and can facilitate assembly and maintenance of the climate control system. Although the climate controlled seat assembly 30 described herein illustrates a single dual-mode pumping device for each of the seat 32 and the backrest 34, in some embodiments a greater number of dual-mode pumping devices can be provided for one or both of the seat 32 and the backrest 34. Moreover, in some embodiments, the seat 32 or the backrest 34 may not be provided with a dual-mode pumping device.

With respect to the main heat exchanger, the dual-mode pumping devices 138A, 138B can direct fluid, such as air, from a location that is spaced from the surface being conditioned (e.g., cooled and/or heated) and/or supporting the occupant such that a majority of the fluid has not been immediately conditioned by the thermoelectric device. The dual-mode pumping devices 138A, 138B can direct such fluid through a conduit, such as ducting through the seat 32 and/or the backrest 34, towards the main heat exchanger. The conditioned fluid 97A, 97B from the main heat exchangers of the dual-mode pumping devices 138A, 138B can then be directed via a conduit, such as the seat distribution systems described herein, towards the surface to be cooled or heated. With respect to the waste heat exchangers of the dual-mode pumping devices 138A, 138B, the dual-mode pumping devices 138A, 138B can direct fluid, such as air, from a location proximate the surface being cooled or heated through a conduit towards the waste heat exchangers where the waste fluid 101A, 101B can then be exhausted to the surrounding atmosphere.

With reference now to FIGS. 24-27, various views of an embodiment of a dual-mode pumping device 138B are provided. The dual-mode pumping device 138B can include a housing 139B which can contain components of the dual-mode pumping device 138B such as one or more rotors 140B for creating fluid flow through the dual-mode pumping device 138B, one or more motors 141B for powering the rotors 140B, one or more thermoelectric devices 94B, one or more main heat exchangers 96B, and/or one or more waste heat exchangers 100B. As shown in the illustrated embodiment, the dual-mode pumping device 138B can include two rotors 140B coupled to a single motor 141B, a single thermoelectric device 94B, a single main side heat exchanger 96B, and a single waste side heat exchanger 100B. In some embodiments, the dual-mode pumping device can include a separate motor coupled to each rotor. Moreover, the dual-mode pumping device 94B can include two or more thermoelectric devices 94B, two or more main side heat exchangers 96B, and/or two or more waste side heat exchangers 100B.

As shown in the illustrated embodiment, the rotors 140B can include a plurality of fins, such as an impeller, for creating fluid flow through the housing 139B of the dual-mode pumping device 138B. The dual-mode pumping device 138B can include a first inlet 142B on a first side of the housing 139B and a second inlet 144B on a separate side of the housing 139B. For example, the first inlet 142B can be positioned on a top side of the housing 139B and the second inlet 144B can be positioned on a bottom side of the housing 139B. The rotors 140B can pull fluid, such as air, through a first inlet 142B and a second inlet 144B and expel the fluid through a first outlet 146B and a second outlet 148B respectively. The first inlet 142B and first outlet 146B can be separated from the second inlet 144B and second outlet 148B via a component such as a plate 150B. Preferably, the plate 150B is also positioned about the rotors 140B such that a generally leak-free seal is achieved to reduce the likelihood of mixing of fluids which could thereby reduce efficiency of the system.

As shown in the illustrated embodiment, fluid pulled through the second inlet 144B can pass through ducting 98B formed through the housing 139B and pass through the main side heat exchanger 96B prior to being expelled through the second outlet 148B. Accordingly, fluid passing through the second inlet 144B can be converted into a conditioned fluid 97B prior to exiting the second outlet 148B. Similarly, fluid pulled through the first inlet 142B can pass through ducting 99B formed through the housing 139B and pass through the waste side heat exchanger 100B prior to being expelled through the first outlet 146B. Accordingly, fluid passing through the first inlet 142B can be converted into a waste fluid 101B prior to exiting the first outlet 146B. In order to reduce the likelihood that a significant amount of waste fluid 101B is reintroduced into the system via second inlet 144B, it can be advantageous to increase the distance between the second inlet 144B and the first outlet 146B or include a shroud around the second inlet 144B and/or first outlet 146B.

The flow through the second inlet 144B and/or second outlet 148B can be generally orthogonal to flow through the ducting 98B. The flow through the second inlet 144B and the second inlet 148B can be generally parallel. As shown in the illustrated embodiment, the second inlet 144B can be positioned on a bottom side of the housing 139B and the second outlet 148B can be positioned on a top side of the housing 139B. In the illustrated embodiment, fluid can flow through ducting 98B from a front side to a rear side of the housing 139B.

The flow through the first inlet 142B and/or first outlet 146B can be generally orthogonal to flow through the ducting 99B. The flow through the first inlet 142B and the first outlet 146B can be generally orthogonal. As shown in the illustrated embodiment, the first inlet 142B can be positioned on a top side of the housing 139B and the second outlet 146B can be positioned on a left side and/or right side of the housing 139B. In the illustrated embodiment, fluid can flow through ducting 99B from a front side to a rear side of the housing 139B.

While fluid flow through the inlets 142B, 144B, outlets 146B, 148B, and ducting 98B, 99B has been described above as being generally orthogonal to each other, it is contemplated that other angles can also be used. In some embodiments, the angle formed by the directions of fluid flow can be less than 90 degrees. For example, the angle formed by the directions of fluid flow can be between about 10 degrees to about 80 degrees, between about 20 degrees to about 70 degrees, between about 30 degrees to about 60 degrees, between about 40 degrees to about 45 degrees, any subrange of angles within these ranges, or any angle within these ranges. In some embodiments, the angle formed by the directions of fluid flow can be greater than 90 degrees. For example, the angle formed by the directions of fluid flow can be between about 100 degrees to about 170 degrees, between about 110 degrees to about 160 degrees, between about 120 degrees to about 150 degrees, between about 135 degrees to about 140 degrees, any subrange of angles within these ranges, or any angle within these ranges.

Although only dual-mode pumping device 138B has been described, dual-mode pumping device 138A can include the same or similar features as dual-mode pumping device 138B and/or any of the variations described above in connection with dual-mode pumping device 138B. Accordingly, similar components of the dual-mode pumping device 138A will be referenced in this application with an "A" suffix following the reference numeral.

FIGS. 28-34 illustrate another embodiment of a climate controlled seat assembly 30. While the embodiment is described with respect to the seat 32 and components of the seat 32, it should be understood that the system can also be applied to the backrest 34 and components of the backrest 34. In addition, as described above, this embodiment can also be used in other types of support assemblies and other cooling/heating applications.

Figure 28:
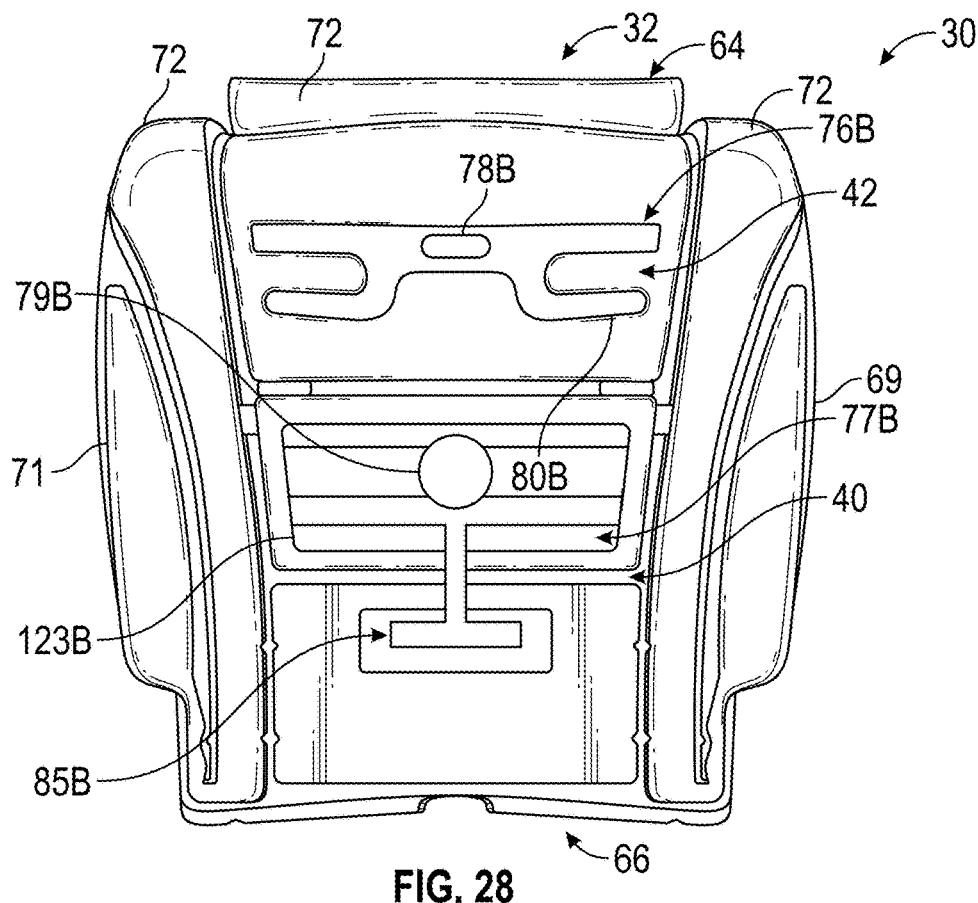
FIG. 28 is a top view of another embodiment of a seat and climate control system according to the present disclosure.

With reference first to FIG. 28, an embodiment of a seat 32 is illustrated with a covering removed thereby exposing cushion 72. Layers of the cushion 72 have also been removed to expose structures underlying these layers. As shown in the illustrated embodiment, the seat 32 can include a fluid distribution system 76B through which conditioned air 97B from a thermal module can be delivered to the seated occupant. The fluid distribution system 76B can be positioned at or proximate a thigh area 42 of the seat 32. The seat 32 can include another fluid distribution system 77B through which fluid can be gathered and distributed towards the waste heat exchanger 100B to generate the waste fluid 101B to be exhausted to the surrounding atmosphere. The fluid distribution system 77B can be positioned at or proximate a central area and/or seat area 40 of the seat 32. Accordingly, in the illustrated embodiment, conditioned air 97B can be delivered to the occupant at or proximate the thigh area 42 and fluid can be gathered and pulled at or proximate a central area and/or seat area 40. It is also contemplated that this arrangement can be reversed such that conditioned air 97B can be delivered to the occupant at or proximate the central area 40 and fluid can be gathered and pulled at or proximate the thigh area 42. In some embodiments, both fluid distribution systems 76B, 77B can be used to deliver conditioned air 97B to the occupant or can be used to gather and pull fluid towards the waste heat exchanger 100B to generate the waste fluid 101B to be exhausted to the surrounding atmosphere.

As shown in the illustrated embodiment, the fluid distribution system 76B can include a passage 78B through which conditioned air 97B from a thermal module can pass. The passage 78B can be in fluid communication with channels 80B. The channels 80B can advantageously distribute the conditioned air 97B over a wider area of the seat 32 such that the cooling or heating effects of the conditioned air 97B is spread over this wider area as opposed to being concentrated at the passage 78B. The channels 80B can extend laterally outward towards the sides 69, 71 of the seat 32 and/or can extend in a frontward/rearward direction towards the front side 64 and/or rear side 66 of the seat 32.

The fluid distribution system 77B can have a construction similar to that of fluid distribution system 76B. As shown in the illustrated embodiment, the fluid distribution system 77B can include a passage 79B through which fluid can be gathered and pulled towards a waste heat exchanger 100B to generate the waste fluid 101B to be exhausted to the surrounding atmosphere. The passage 79B can be in fluid communication with channels 123B. The channels 123B can advantageously allow fluid to be pulled over a wider area of the seat 32 such that the fluid flow is spread over this wider area as opposed to being concentrated at the passage 79B. The channels 123B can extend laterally outward towards the sides 69, 71 of the seat 32 and/or can extend in a frontward/rearward direction towards the front side 64 and/or rear side 66 of the seat 32. For example, the channels 123B can include a portion 85B which is positioned further rearward of a central area of the seat 32.

Figure 29:
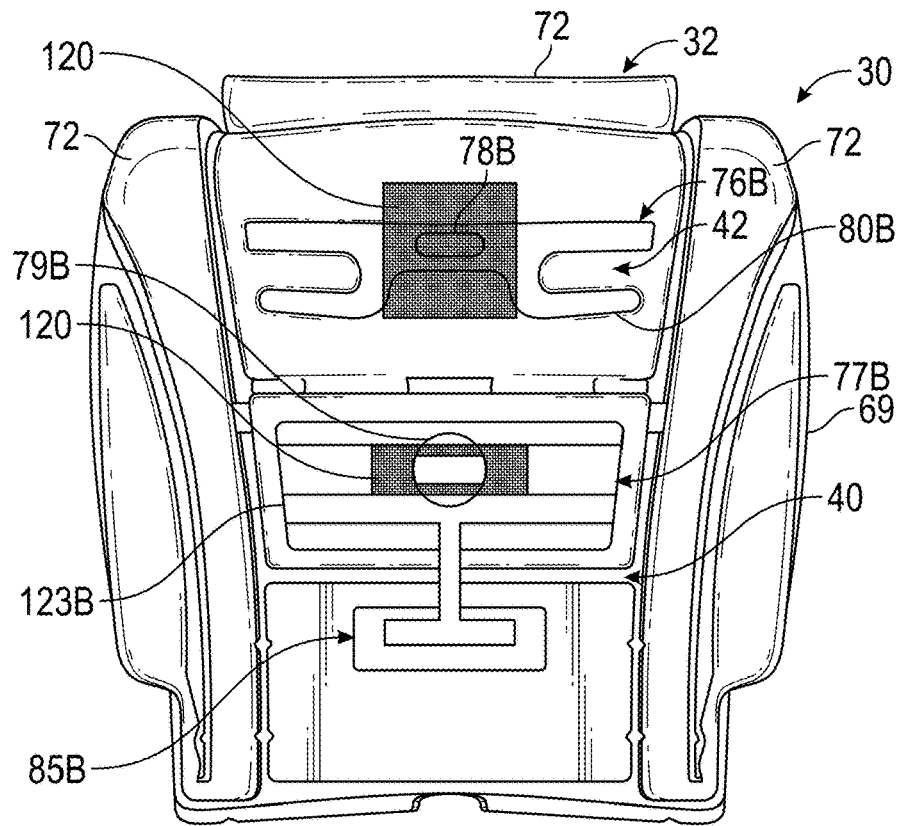
FIG. 29 is a top view of the seat and climate control system of FIG. 28 with a layer included.

With reference next to FIG. 29, one or both of the fluid distribution systems 76B, 77B can include a layer 120 positioned between the channels 80B, 123B and the cushion 72. As shown in the illustrated embodiment, the layer 120 can be positioned over the passages 78B, 79B. Such an arrangement can beneficially maintain a gap between the channels 80B, 123B and an overlying layer, such as the cushion 72. This can reduce the likelihood that the overlying layer collapses onto the passages 78B, 79B and/or portions of the channels 80B, 123B which could potentially restrict flow through the fluid distribution systems 76B, 77B. In some embodiments, the layer 120 can be formed from a material having some degree of flexibility such as a thin plastic film. The layer 120 can be a semi-permeable or impermeable layer to reduce the transfer of fluids from directly above the passages 78B, 79B. Layer 120 can also be an insulating or semi-insulating layer to reduce heat transfer across the layer 120.

Figure 30:
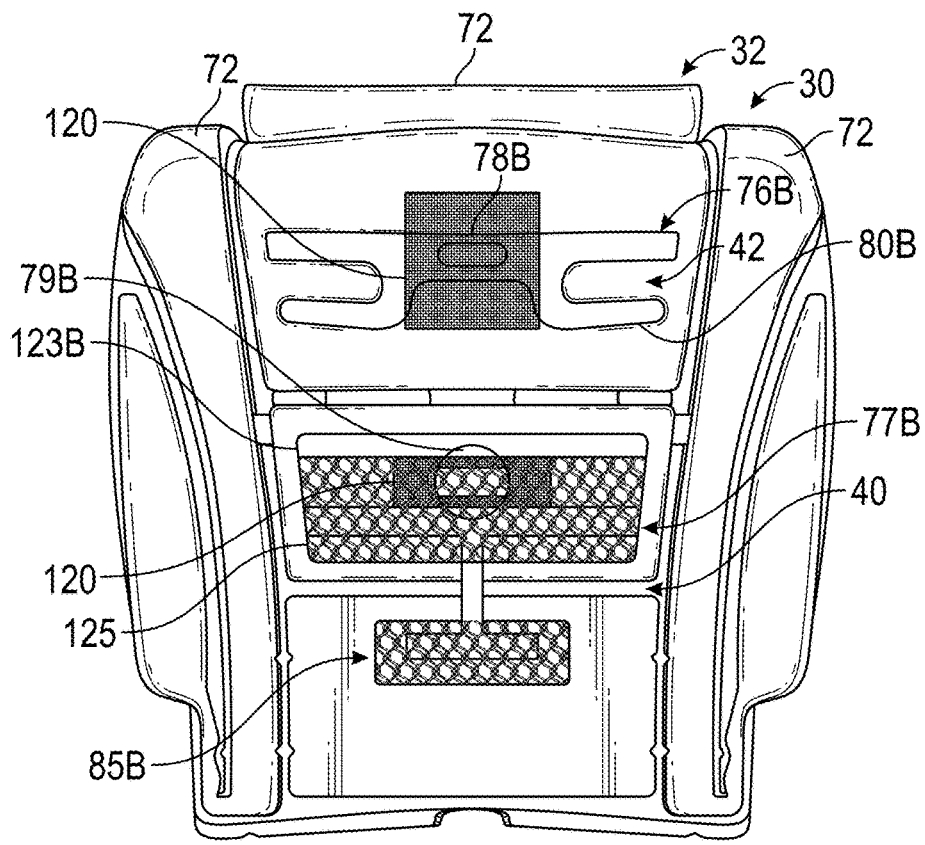
FIG. 30 is a top view of the seat and climate control system of FIG. 29 with a spacer fabric included.

With reference next to FIG. 30, a portion or the entirety of the channels 80B, 123B can be filled with an air permeable material, such as a spacer fabric, that can provide support for the occupant while still allowing the flow of air through the material. As shown in the illustrated embodiment, a spacer fabric 125 is positioned within a portion of the channel 123B, including portion 85B, of the fluid distribution system 77B. The spacer fabric 125 can be designed to maintain separation between the bottoms of the channel 123B as well as layer 120 and components above the channel 123B and/or layer 120, such as cushion 72. This can beneficially maintain a fluid chamber that can allow lateral and/or upward movement of fluid between the channel 123B, layer 120, and the components above channel 123B and layer 120 even when an occupant is seated on the seat 32 which would tend to collapse these chambers and/or when the channel 123B is subject to pressure below atmospheric which would also tend to collapse these chambers.

In the illustrated embodiment, no spacer fabric 125 is positioned within the fluid distribution system 76B. Due to the existence of positive pressure (i.e., pressure above atmospheric pressures) within the fluid distribution system 76B, there is a lower likelihood of collapse of the chambers even when subject to forces from a seated occupant. Moreover, the amount of forces applied to the thigh area 42 is generally lower than the amount of forces applied to the seat area 40 of a seat thereby further reducing the likelihood of the chambers collapsing as compared to fluid distribution system 77B. In some embodiments, a spacer fabric 125 can be positioned in portions or the entirety of channels 80B of the fluid distribution system 76B.

Figure 31:
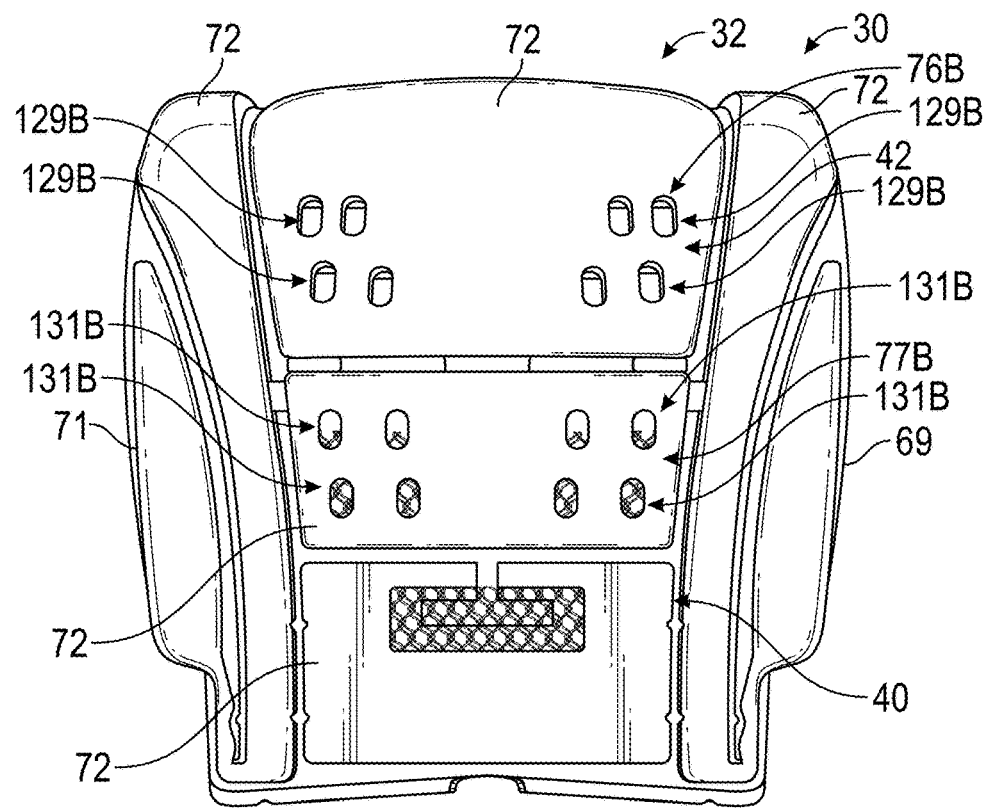
FIG. 31 is a top view of the seat and climate control system of FIG. 30 with additional cushioning.

With reference next to FIG. 31, a cushion 72 can be positioned over the fluid distribution systems 76B, 77B to provide support for the occupant and to reduce the likelihood that the channels 80B, 123B will affect the comfort of the occupant. The cushion 72 can include one or more openings 129B in fluid communication with the fluid distribution system 76B for allowing conditioned air 97B to pass through the cushion 72 and towards the seated occupant. As shown in the illustrated embodiment, the openings 129B can be positioned at or adjacent the general location of an occupant's thighs when seated on the seat 32. By positioning the openings 129B in this manner, the conditioned fluid 97B can be concentrated in areas at or proximate the occupant such that the effects of the conditioned fluid 97B will be more readily apparent to the occupant. This can beneficially reduce the total energy usage to achieve the same conditioning effect. While the illustrated embodiment includes eight openings 129B positioned generally around an area at or adjacent the general location of an occupant's thighs, other arrangements of openings 129B, including the use of a fewer or greater number of openings 129B, are contemplated.

Figure 34:
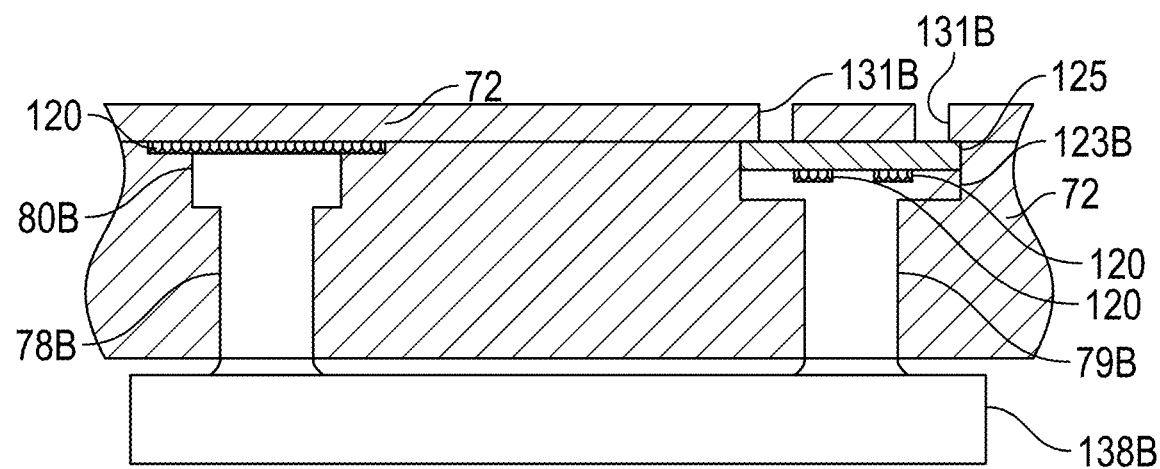
FIG. 34 is a schematic, cross-sectional view of the seat and climate control system of FIG. 31.

The cushion 72 can include one or more openings 131B in fluid communication with the fluid distribution system 77B through which fluid can be gathered and distributed towards the waste heat exchanger 100B to generate the waste fluid 101B to be exhausted to the surrounding atmosphere. As shown in the illustrated embodiment, the openings 131B can be positioned at or adjacent the general location of an occupant's thighs when seated on the seat 32. By positioning the openings 131B in this manner, the withdrawn fluid can be concentrated in areas at or proximate the occupant such that the effects of the withdrawn fluid will be more readily apparent to the occupant. This can beneficially reduce the total energy usage to achieve the same effect. While the illustrated embodiment includes eight openings 131B positioned generally around an area at or adjacent the general location of an occupant's thighs, other arrangements of openings 131B, including the use of a fewer or greater number of openings 131B, are contemplated. A schematic, cross-sectional view of a seat 32 is illustrated in FIG. 34.

Figure 32:
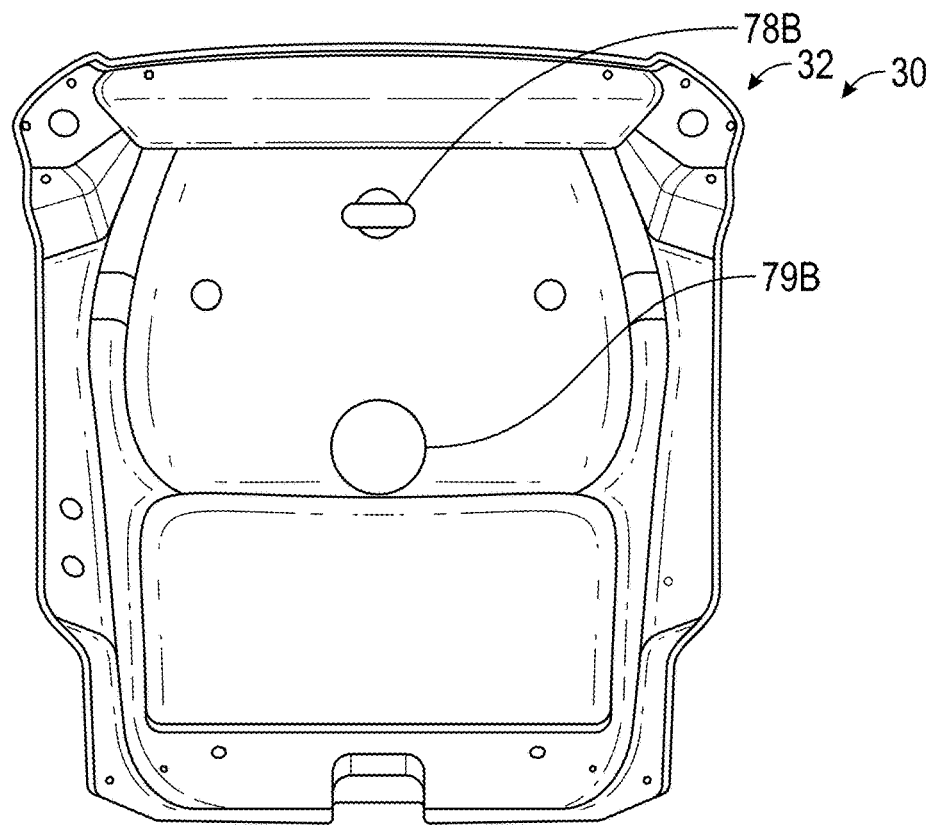
FIG. 32 is a bottom view of the seat and climate control system of FIG. 28.
Figure 33:
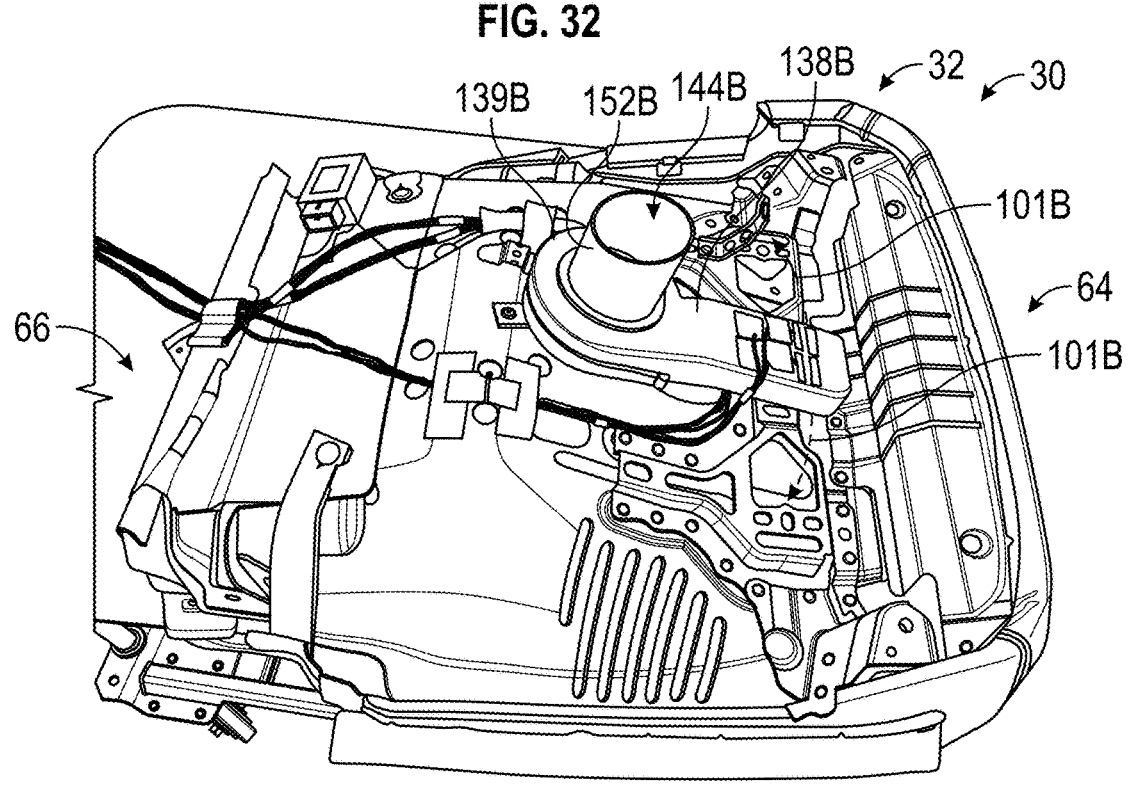
FIG. 33 is a bottom view of the seat and climate control system of FIG. 28 with additional components.

With reference next to FIG. 32, an underside of seat 32 is illustrated showing a location of passages 78B, 79B. With reference next to FIG. 33, a pumping device, such as dual-mode pumping device 138B can be attached to the underside of a seat frame 73 used to support the cushion 72 and other portions of the seat 32. As shown in the illustrated embodiment, the dual-mode pumping device 138B can include a first inlet (e.g., 142B of FIG. 25) positioned in fluid communication with passage 79B such that fluid can be pulled through passage 79B, into housing 139B and through a waste side heat exchanger (e.g., 100B of FIG. 25), where a waste fluid 101B can be generated and expelled out of the housing 139B. In some embodiments, the waste fluid 101B can be expelled towards the underside of the seat frame 73. The dual-mode pumping device 138B can include a second inlet 144B with a second outlet (e.g., 148B of FIG. 25) positioned in fluid communication with passage 78B such that fluid can be pulled through second inlet 144B, into housing 139B and through a main side heat exchanger (e.g., 96B of FIG. 25), where a conditioned fluid (e.g., 97B of FIG. 25) can be generated and introduced into passage 78B where it can be distributed through portions of the seat 32 via the fluid distribution system 76B. As shown in the illustrated embodiment, the second inlet 144B can include extended ducting 152B to allow the dual-mode pumping device 138B to pull air from a location which is less likely to have mixed with waste fluid 101B.

FIGS. 35-38 illustrate another embodiment of a climate controlled seat assembly 30. While the embodiment is described with respect to the backrest 34 and components of the backrest 34, it should be understood that the system can also be applied to the seat 32 and components of the seat 32. In addition, as described above, this embodiment can also be used in other types of support assemblies and other cooling/heating applications.

Figure 35:
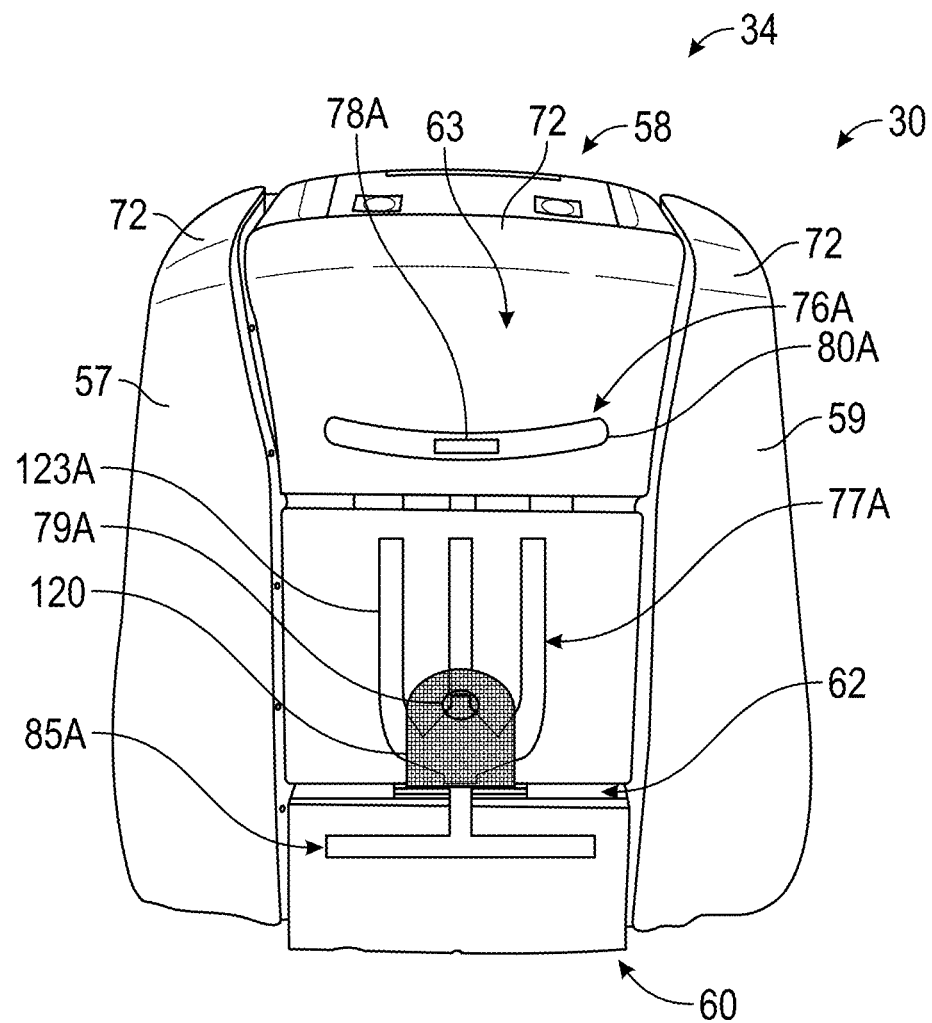
FIG. 35 is a front view of another embodiment of a backrest and climate control system according to the present disclosure.

With reference first to FIG. 35, an embodiment of a backrest 34 is illustrated with a covering removed thereby exposing cushion 72. Layers of the cushion 72 have also been removed to expose structures underlying these layers. As shown in the illustrated embodiment, the backrest 34 can include a fluid distribution system 76A through which conditioned air 97A from a thermal module can be delivered to the seated occupant. The fluid distribution system 76A can be positioned at or proximate an upper back area 63 of the backrest 34. The backrest 34 can include another fluid distribution system 77A through which fluid can be gathered and distributed towards the waste heat exchanger 100A to generate the waste fluid 101A to be exhausted to the surrounding atmosphere. The fluid distribution system 77A can be positioned at or proximate a lumbar region 62 of the backrest 34. Accordingly, in the illustrated embodiment, conditioned air 97A can be delivered to the occupant at or proximate the upper back area 63 and fluid can be gathered and pulled from a the lumbar region 62. It is also contemplated that this arrangement can be reversed such that conditioned air 97A can be delivered to the occupant at or proximate the lumbar region 62 and fluid can be gathered and pulled at or proximate the upper back area 63. In some embodiments, both fluid distribution systems 76A, 77A can be used to deliver conditioned air 97A to the occupant or can be used to gather and pull fluid towards the waste heat exchanger 100A to generate the waste fluid 101A to be exhausted to the surrounding atmosphere.

As shown in the illustrated embodiment, the fluid distribution system 76A can include a passage 78A through which conditioned air 97A from a thermal module can pass. The passage 78A can be in fluid communication with channels 80A. The channels 80A can advantageously distribute the conditioned air 97A over a wider area of the backrest 34 such that the cooling or heating effects of the conditioned air 97A is spread over this wider area as opposed to being concentrated at the passage 78A. The channels 80A can extend laterally outward towards the sides 57, 59 of the backrest 34 and/or can extend in a upwards/downwards direction towards the top side 58 or bottom side 60 of the backrest 34.

The fluid distribution system 77A can have a construction similar to that of fluid distribution system 76A. As shown in the illustrated embodiment, the fluid distribution system 77A can include a passage 79A through which fluid can be gathered and pulled towards a waste heat exchanger 100A to generate the waste fluid 101A to be exhausted to the surrounding atmosphere. The passage 79A can be in fluid communication with channels 123A. The channels 123A can advantageously allow fluid to be pulled over a wider area of the backrest 34 such that the fluid flow is spread over this wider area as opposed to being concentrated at the passage 79A. The channels 123A can extend laterally outward towards the sides 57, 59 of the backrest 34 and/or can extend in a upwards/downwards direction towards the top side 58 or bottom side 60 of the backrest 34. For example, the channels 123A can include a portion 85A which is positioned further downward towards the bottom side 60 of the backrest 34.

One or both of the fluid distribution systems 76A, 77A can include a layer 120 positioned between the channels 80A, 123A and the cushion 72. As shown in the illustrated embodiment, the layer 120 can be positioned over the passage 79A. Such an arrangement can beneficially maintain a gap between the channels 123A and an overlying layer, such as the cushion 72. This can reduce the likelihood that the overlying layer collapses onto the passage 79A and/or portions of the channels 123A which could potentially restrict flow through the fluid distribution systems 77A. In some embodiments, the layer 120 can be formed from a material having some degree of flexibility such as a thin plastic film. The layer 120 can be a semi-permeable or impermeable layer to reduce the transfer of fluids from directly above the passage 79A. Layer 120 can also be an insulating or semi-insulating layer to reduce heat transfer across the layer 120. Although not shown, a portion or the entirety of the channels 80A, 123A can be filled with an air permeable material, such as a spacer fabric, that can provide support for the occupant while still allowing the flow of air through the material.

Figure 36:
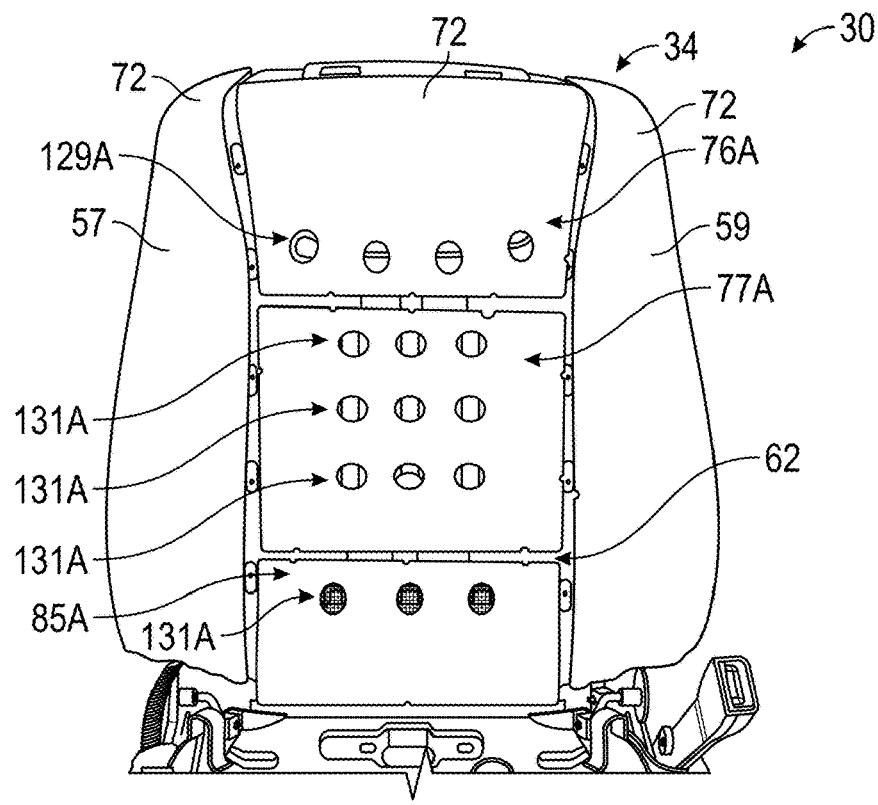
FIG. 36 is a front view of the backrest and climate control system of FIG. 35 with additional cushioning.

With reference next to FIG. 36, a cushion 72 can be positioned over the fluid distribution systems 76A, 77A to provide support for the occupant and to reduce the likelihood that the channels 80A, 123A will affect the comfort of the occupant. The cushion 72 can include one or more openings 129A in fluid communication with the fluid distribution system 76A for allowing conditioned air 97A to pass through the cushion 72 and towards the seated occupant. As shown in the illustrated embodiment, the openings 129A can be positioned at or adjacent the general location of an occupant's upper back when seated on the backrest 34. By positioning the openings 129A in this manner, the conditioned fluid 97B can be concentrated in areas at or proximate the occupant such that the effects of the conditioned fluid 97A will be more readily apparent to the occupant. This can beneficially reduce the total energy usage to achieve the same conditioning effect. While the illustrated embodiment includes four openings 129A positioned generally around an area at or adjacent the general location of an occupant's upper back, other arrangements of openings 129A, including the use of a fewer or greater number of openings 129A, are contemplated.

The cushion 72 can include one or more openings 131A in fluid communication with the fluid distribution system 77A through which fluid can be gathered and distributed towards the waste heat exchanger 100A to generate the waste fluid 101A to be exhausted to the surrounding atmosphere. As shown in the illustrated embodiment, the openings 131A can be positioned at or adjacent the general location of an occupant's lower back or lumbar region when seated on the backrest 34. By positioning the openings 131A in this manner, the withdrawn fluid can be concentrated in areas at or proximate the occupant such that the effects of the withdrawn fluid will be more readily apparent to the occupant. This can beneficially reduce the total energy usage to achieve the same effect. While the illustrated embodiment includes twelve openings 131A positioned generally around an area at or adjacent the general location of an occupant's lower back, other arrangements of openings 131A, including the use of a fewer or greater number of openings 131A, are contemplated.

Figure 37:
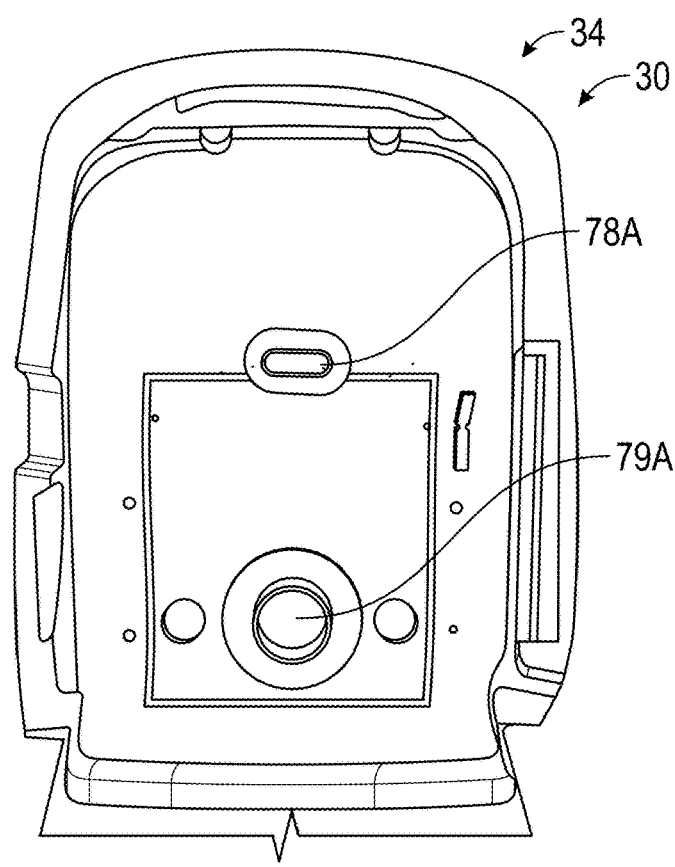
FIG. 37 is a rear view of the backrest and climate control system of FIG. 35.
Figure 38:
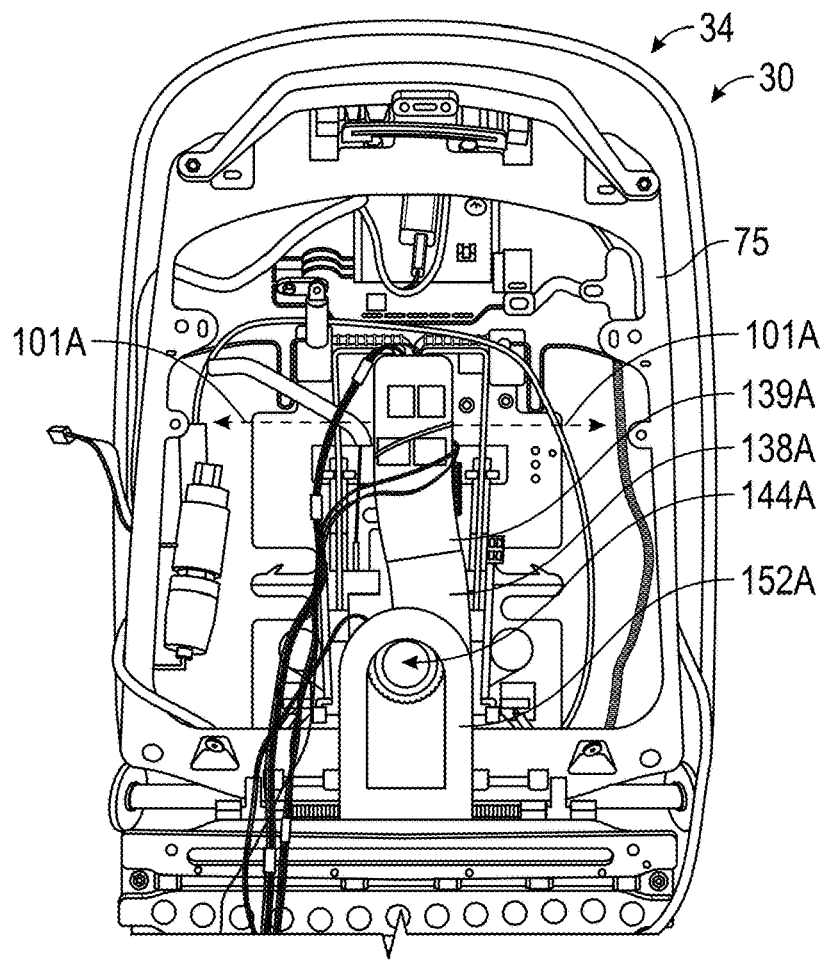
FIG. 38 is a rear view of the backrest and climate control system of FIG. 37 with additional components.

With reference next to FIG. 37, an rear view of backrest 34 is illustrated showing a location of passages 78A, 79A. With reference next to FIG. 38, a pumping device, such as dual-mode pumping device 138A can be attached to the rear side of a backrest seat frame 75 used to support the cushion 72 and other portions of the backrest 34. As shown in the illustrated embodiment, the dual-mode pumping device 138A can include a first inlet positioned in fluid communication with passage 79A such that fluid can be pulled through passage 79A, into housing 139A and through a waste side heat exchanger, where a waste fluid 101A can be generated and expelled out of the housing 139A. In some embodiments, the waste fluid 101A can be expelled towards the rear side of the backrest frame 75. The dual-mode pumping device 138A can include a second inlet 144A with a second outlet positioned in fluid communication with passage 78A such that fluid can be pulled through second inlet 144A, into housing 139A and through a main side heat exchanger, where a conditioned fluid can be generated and introduced into passage 78A where it can be distributed through portions of the backrest 34 via the fluid distribution system 76A. As shown in the illustrated embodiment, the second inlet 144A can include ducting 152A to allow the dual-mode pumping device 138A to pull air from a location which is less likely to have mixed with waste fluid 101A.

Figure 39:
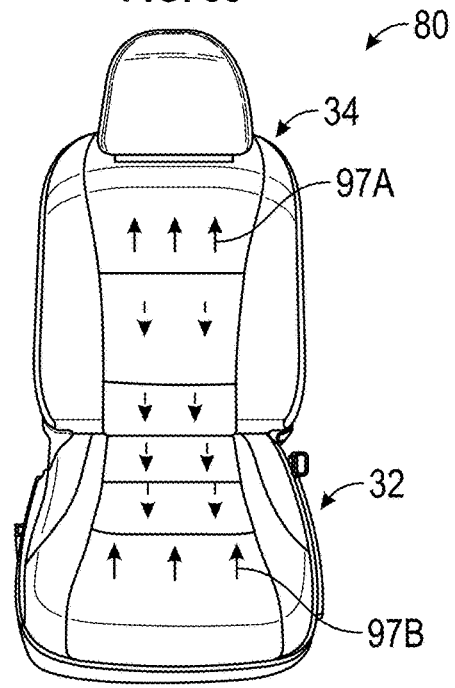
FIG. 39 is a front, view of another embodiment of a seat assembly and climate control system.

With reference to FIG. 39, a climate controlled seat assembly 30 having a seat 32 and backrest 34. As shown in the illustrated embodiment, the seat 32 can include areas where conditioned fluid 97B is directed towards the occupant and areas where fluid is drawn away from the occupant. Moreover, the backrest 34 can include areas where conditioned fluid 97A is directed towards the occupant and areas where fluid is drawn away from the occupant. This embodiment could use the systems described in connection with FIGS. 28-38 above.

It should be appreciated that the embodiment described above with reference to FIGS. 28-39 can be used in other types of support assemblies and/or applications and need not be used in combination with the additional embodiments described herein To assist in the description of the disclosed embodiments, words such as top, bottom, front, rear, left, right, sides, above, and below may have been used describe the accompanying figures. Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. It will be appreciated, however, that the illustrated embodiments can be located and oriented in a variety of desired positions.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A climate controlled seat assembly comprising:
 a first fluid path configured to direct a first fluid stream to a seating surface configured to contact an occupant;
 a second fluid path configured to direct a second fluid stream from a location proximate and at least partially through the seating surface away from the seating surface via a conduit, the conduit configured to provide fluid communication with the location proximate the seating surface; and
 a first pumping device fluidically coupled to at least one of the first fluid path or the second fluid path, the first pumping device comprising:
  a rotor comprising a plurality of fins;
  a motor coupled to the rotor;
  a first inlet in fluid communication with a first outlet; and
  a second inlet in fluid communication with a second outlet,
  wherein the first inlet and the first outlet of the first pumping device are fluidically coupled to the first fluid path, and the second inlet and the second outlet are fluidically coupled to the second fluid path.

2. The climate controlled seat assembly of claim 1, wherein the first fluid path draws the first fluid stream from a location spaced from the seating surface.

3. The climate controlled seat assembly of claim 1, wherein the second fluid path exhausts the second fluid stream to a location spaced from the seating surface.

4. The climate controlled seat assembly of claim 1, further comprising:
 a thermoelectric device comprising a main side and a waste side;
 a main heat exchanger coupled to the main side of the thermoelectric device for generating a conditioned fluid stream from the first fluid stream, the first fluid path configured to direct the conditioned fluid stream to the seating surface; and
 a waste heat exchanger coupled to the waste side of the thermoelectric device for generating a waste fluid stream from the second fluid stream.

5. The climate controlled seat assembly of claim 4, wherein the main heat exchanger is positioned between the first inlet and the first outlet.

6. The climate controlled seat assembly of claim 4, wherein the waste heat exchanger is positioned between the second inlet and the second outlet.

7. The climate controlled seat assembly of claim 4, further comprising a housing, wherein the first pumping device and the thermoelectric device are positioned in the housing.

8. The climate controlled seat assembly of claim 1, further comprising a plate positioned about the fins of the rotor, the plate separating the first inlet and outlet from the second inlet and outlet.

9. The climate controlled seat assembly of claim 1, wherein the first pumping device comprises a ducting fluidically coupling the first inlet and the first outlet, wherein a direction of flow through the first outlet is generally orthogonal to a direction of flow through the ducting.

10. The climate controlled seat assembly of claim 1, further comprising a second pumping device, wherein the first pumping device is fluidically coupled to the first fluid path and the second pumping device is fluidically coupled to the second fluid path.

11. The climate controlled seat assembly of claim 10, wherein the second pumping device comprises a plurality of fins connected to the rotor of the first pumping device, the plurality of fins of the first pumping device separate from the plurality of fins of the second pumping device.

12. The climate controlled seat assembly of claim 10, further comprising a plate positioned about the rotor, the plate separating the first inlet and outlet from the second inlet and outlet, and the plate extending toward the motor between the plurality of fins of the first pumping device and the plurality of fins of the second pumping device.

13. The climate controlled seat assembly of claim 10, wherein the second pumping device comprises a ducting fluidically coupling the second inlet and the second outlet, wherein a direction of flow through the second outlet is generally orthogonal to a direction of flow through the ducting.

14. The climate controlled seat assembly of claim 1, wherein the first pumping device comprises a ducting fluidically coupling the second inlet and the second outlet, wherein a direction of flow through the second outlet is generally orthogonal to a direction of flow through the ducting.

15. A pumping device assembly for a climate controlled assembly, the pumping device assembly comprising:
   a housing comprising:
      a first inlet in fluid communication with a first outlet;
      a second inlet in fluid communication with a second outlet;
   a first fluid path configured to direct a first fluid stream to an occupant surface of the climate controlled assembly through the first outlet; and
   a second fluid path configured to direct a second fluid stream from a location proximate the occupant surface through the second inlet away from the occupant surface via a conduit of the climate controlled assembly, the conduit configured to provide fluid communication between the second inlet and the location proximate the occupant surface, wherein a direction of flow through the second outlet is generally orthogonal to a direction of flow proximate the second outlet,
   wherein the first inlet and the first outlet are fluidically coupled to the first fluid path, and the second inlet and the second outlet are fluidically coupled to the second fluid path;
   a rotor comprising a plurality of fins, the plurality of fins fluidically coupled to at least one of the first fluid path or the second fluid path; and
   a motor coupled to the rotor.

16. The pumping device assembly of claim 15, further comprising an other rotor comprising a plurality of other fins, wherein the motor is coupled to the rotor and the other rotor, and wherein the plurality of fins of the rotor is fluidically coupled to the first fluid path and the plurality of other fins of the other rotor is fluidically coupled to the second fluid path.

17. The pumping device assembly of claim 16, further comprising a plate positioned about the rotor, the plate separating the first and second fluid paths, the plate extending toward the motor between the plurality of fins of the rotor and the plurality of other fins of the other rotor.

18. The pumping device assembly of claim 15, further comprising:
   a thermoelectric device comprising a main side and a waste side;
   a main heat exchanger coupled to the main side of the thermoelectric device for generating a conditioned fluid stream from the first fluid stream, the first fluid path configured to direct the conditioned fluid stream to the occupant surface; and
   a waste heat exchanger coupled to the waste side of the thermoelectric device for generating a waste fluid stream from the second fluid stream.

19. The pumping device assembly of claim 15, further comprising a plate positioned about the fins of the rotor, the plate separating the first and second fluid paths.

20. The pumping device assembly of claim 15, wherein the first fluid path comprises a ducting fluidically coupling the first inlet and the first outlet, wherein a direction of flow through the first outlet is generally orthogonal to a direction of flow through the ducting.

21. The pumping device assembly of claim 15, wherein the second fluid path comprises a ducting fluidically coupling the second inlet and the second outlet, wherein a direction of flow through the second outlet is generally orthogonal to a direction of flow through the ducting.

* * * * *